(12) United States Patent
Takagi et al.

(10) Patent No.: US 7,847,850 B2
(45) Date of Patent: Dec. 7, 2010

(54) IMAGE DISPLAYING APPARATUS, IMAGE DISPLAYING METHOD, AND NON-TRANSITORY COMPUTER-READABLE STORAGE MEDIUM

(75) Inventors: Yousuke Takagi, Tokyo (JP); Hiroaki Yoshino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 11/851,059

(22) Filed: Sep. 6, 2007

(65) Prior Publication Data
US 2008/0068469 A1 Mar. 20, 2008

(30) Foreign Application Priority Data
Sep. 14, 2006 (JP) .............................. 2006-249756

(51) Int. Cl.
H04N 5/225 (2006.01)

(52) U.S. Cl. .............................. 348/333.02; 348/333.05

(58) Field of Classification Search ............ 348/333.01, 348/333.02, 333.05, 333.11
See application file for complete search history.

(56) References Cited

U.S. PATENT DOCUMENTS

| | | | | |
|---|---|---|---|---|
| 6,513,035 | B1 * | 1/2003 | Tanaka et al. ................... | 707/3 |
| 7,437,358 | B2 * | 10/2008 | Arrouye et al. ................. | 707/4 |
| 2003/0033296 | A1 * | 2/2003 | Rothmuller et al. ............ | 707/3 |
| 2003/0088546 | A1 * | 5/2003 | Brown et al. .................... | 707/3 |
| 2005/0024513 | A1 * | 2/2005 | Hayashi et al. ........ | 348/333.01 |
| 2006/0023100 | A1 * | 2/2006 | Chosa .................... | 348/333.01 |
| 2006/0055805 | A1 * | 3/2006 | Stockton et al. ........ | 348/333.01 |
| 2006/0173918 | A1 * | 8/2006 | Nakase et al. ............ | 707/104.1 |
| 2007/0185826 | A1 * | 8/2007 | Brice et al. ..................... | 707/1 |
| 2008/0235275 | A1 * | 9/2008 | Tanaka et al. ............ | 348/222.1 |

FOREIGN PATENT DOCUMENTS

| | | |
|---|---|---|
| JP | 2003-67722 A | 3/2003 |
| JP | 2005354134 A * | 12/2005 |

* cited by examiner

Primary Examiner—Jason Whipkey
(74) Attorney, Agent, or Firm—Canon USA Inc IP Division

(57) ABSTRACT

An apparatus designates a key for searching for an image, and acquires attribute information based on the designated key and image information on an image having the attribute information. The apparatus displays an amount of images classified into a group corresponding to the attribute information based on the acquired attribute information and the acquired image information.

14 Claims, 45 Drawing Sheets

FIG.12

| | |
|---|---|
| Header | ~1201 |
| ∗0 Sound | ~1202 |
| #0 Frame | ~1203 |
| #1 Frame | ~1204 |
| #2 Frame | ~1205 |
| ⋮ | |
| #Rate-1 Frame | ~1206 |
| ∗0 Sound | |
| #0 Frame | |
| #1 Frame | |
| #2 Frame | |
| ⋮ | |
| #Rate-1 Frame | |
| ⋮ | |
| ∗N-1 Sound | |
| #0 Frame | |
| #1 Frame | |
| #2 Frame | |
| ⋮ | |
| #Rate-1 Frame | |
| Index | ~1218 |

FIG.39

| PROCESSING MODE | IMAGE FEEDING TARGETS | UNSELECTION CONDITIONS |
|---|---|---|
| SLIDE SHOW | ALL IMAGES | NO CONTENTS |
| ERASING | UNPROTECTED IMAGES | ONLY PROTECTED IMAGES OR NO CONTENTS |
| PROTECTION | ALL IMAGES | NO CONTENTS |
| PRINTING | STILL IMAGES | ONLY STILL IMAGES OR NO CONTENTS |
| TRANSMISSION | UNTRANSMITTED IMAGES | ONLY UNTRANSMITTED IMAGES OR NO CONTENTS |

FIG.44

[RELIABILITY VERIFICATION INFORMATION]: ~3201
• MEDIA RELIABILITY INFORMATION
  · MINIMUM FILE NUMBER
  · MAXIMUM FILE NUMBER
  · TOTAL SUM OF FILE NUMBERS
  · TOTAL SUM OF TIME STAMPS
  · TOTAL SUM OF FILE SIZES
  · TOTAL NUMBER OF FILES

• MANAGEMENT FILE RELIABILITY INFORMATION ~3202
  · MANAGEMENT FILE VERSION
  · MANAGEMENT FILE SIZE
  · MANAGEMENT FILE CHECKSUM

[MINIMUM FILE INFORMATION]: ~3203
  · CLASSIFICATION INFORMATION
  · PHOTOGRAPHING INFORMATION
  · SUBJECT INFORMATION

[(MAXIMUM FILE +1) - INFORMATION]: ~3204
  · CLASSIFICATION INFORMATION
  · PHOTOGRAPHING INFORMATION
  · SUBJECT INFORMATION

⋮

[(MAXIMUM FILE -1) - INFORMATION]: ~3205
  · CLASSIFICATION INFORMATION
  · PHOTOGRAPHING INFORMATION
  · SUBJECT INFORMATION

[MAXIMUM FILE INFORMATION]: ~3206
  · CLASSIFICATION INFORMATION
  · PHOTOGRAPHING INFORMATION
  · SUBJECT INFORMATION

IMAGE DISPLAYING APPARATUS, IMAGE DISPLAYING METHOD, AND NON-TRANSITORY COMPUTER-READABLE STORAGE MEDIUM

BACKGROUND OF THE INVENTION

1. Field of the Invention

The present invention relates to an image reproducing apparatus (e.g., digital camera) for reproducing (e.g., displaying) image data representing a desired image among a plurality of images, to an image reproducing method therefor, and to a computer-readable storage medium.

2. Description of the Related Art

With recent popularization of digital cameras, a dramatic increase in capacity of recording media for storing captured images has progressed. This has enabled storage of large-volume image data in storage media mounted in digital cameras and personal computers (PCs).

Image data stored in storage media can be reproduced by various image reproducing apparatuses provided in digital cameras and PCs in order to view, edit, and organize images. However, due to increase in recording capacity, large-volume image data can be stored in storage media. Accordingly, a search screen, on which target image data can efficiently and quickly be accessed, is needed.

Such a conventional technique is discussed in Japanese Patent Application Laid-Open No. 2003-67722 as a method for classifying image data, which is stored in a folder, into several groups and storing the image data, which is classified into each of the groups, in an associated subfolder.

However, according to the conventional technique discussed in Japanese Patent Application Laid-Open No. 2003-67722, image data classified into one group is stored in one subfolder. Accordingly, images of the same group cannot be classified according to, for example, a photographing date and to a file format. That is, images of the same group cannot be classified according to a plurality of classification criteria. Consequently, image data cannot be flexibly searched.

Additionally, according to the conventional technique discussed in Japanese Patent Application Laid-Open No. 2003-67722, when image data is searched, information on image data stored in each subfolder is not displayed. Thus, it is difficult to know at a glance what image data is stored in each subfolder. Consequently, users may be required to perform time consuming operations to access target image data.

SUMMARY OF THE INVENTION

According to an aspect of the present invention, an apparatus (e.g., digital camera) includes a key designating unit configured to designate a key for searching for an image, an acquiring unit configured to acquire attribute information based on the designated key and image information on an image having the attribute information, a group information display unit configured to display an amount of images classified into a group corresponding to the attribute information based on the acquired attribute information and the acquired image information, a group designating unit configured to designate at least one of groups into which images are classified, and an image display unit configured to, when a group is designated by the group designating unit, automatically display at least one of images belonging to the designated group, wherein the group information display unit displays a amount of images belonging to each of a plurality of groups within one display screen.

According to another aspect of the present invention, a method includes designating a key for searching for at least one image, acquiring attribute information based on the designated key and information on an image having the attribute information, displaying an amount of images classified into a group corresponding to the attribute information based on the acquired attribute information and the acquired image information, and displaying a number of images belonging to each of a plurality of groups within one display screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of a configuration of a moving image file recorded on a recording medium.

FIG. 39 is a table illustrating a list of objects, on which a selection operation is performed, in each processing mode by the digital camera.

FIG. 44 illustrates an example of a structure of a search management file recorded on a recording medium.

DETAILED DESCRIPTION OF THE EMBODIMENTS

Exemplary embodiments, features, and aspects of the invention will be described in detail below with reference to the attached drawings.

In an exemplary embodiment, features of the present invention are applied to an imaging apparatus, more particularly, a digital camera which can capture still images and moving images.

Figure 1:
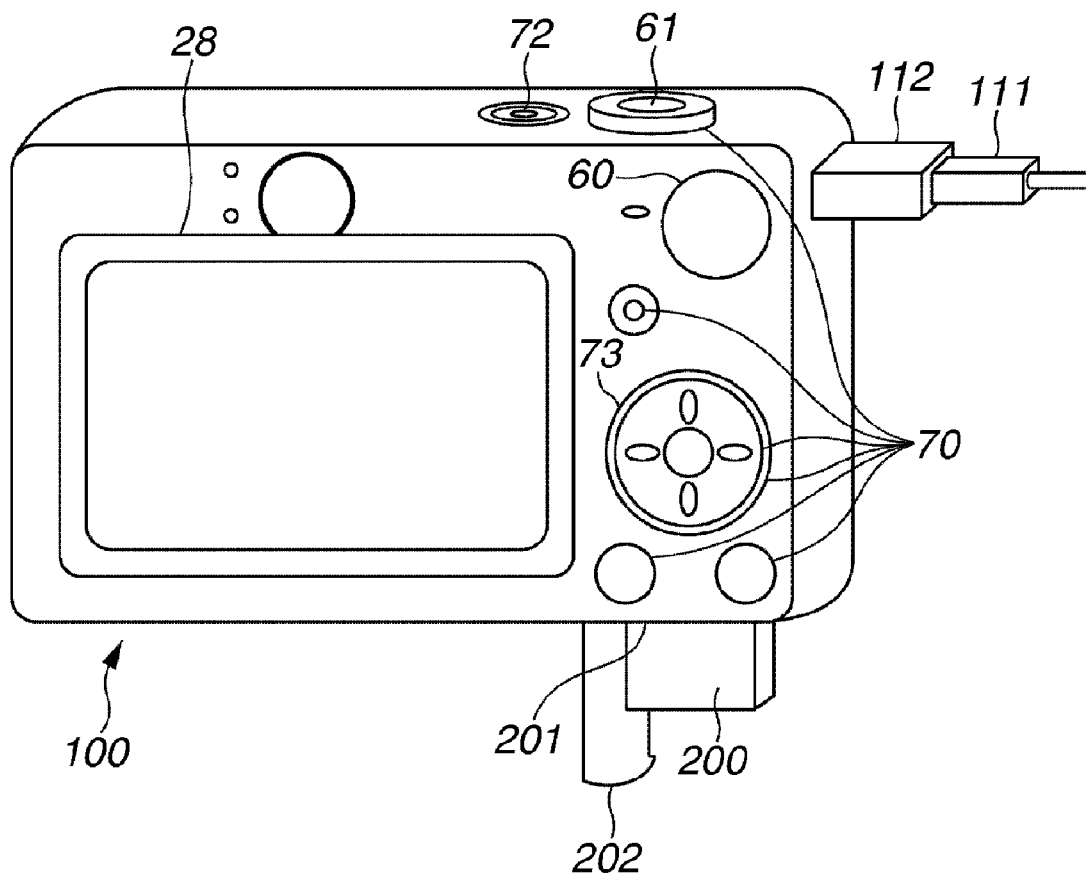
FIG. 1 is an external view illustrating a digital camera serving as an imaging apparatus according to an exemplary embodiment of the present invention.

FIG. 1 is an external view illustrating the digital camera 100 according to an exemplary embodiment of the present invention. An image display section 28 displays images and various types of information. A power supply switch 72 turns on and off a power supply. A shutter button 61 opens a shutter of the digital camera 100 when pressed. A mode change over switch 60 switches among various modes, such as a still image recording mode, a moving image recording mode, and a reproduction mode, of the digital camera 100. A connecting cable 111 connects the digital camera 100 to an external device. A connector 112 connects the connecting cable 111 to the digital camera 100.

An operation unit 70 accepts various users' operations. As illustrated in FIG. 1, the operation unit 70 has various buttons and operating members, such as a touch panel, provided on a screen of the image display section 28. More particularly, the various buttons of the operation unit 70 include, for example, an erasing button, a menu button, a SET button, crisscross-arranged four direction buttons (i.e., atop button (up button), a bottom button (down button), a right button, and a left button), and a wheel 73. A recording medium 200 is, for example, a memory card or a hard disk. A recording medium slot 201 stores the recording medium 200. The recording medium 200 stored in the recording medium slot 201 can communicate with the digital camera 100. The recording medium slot 201 is covered by a cover 202.

Figure 2:
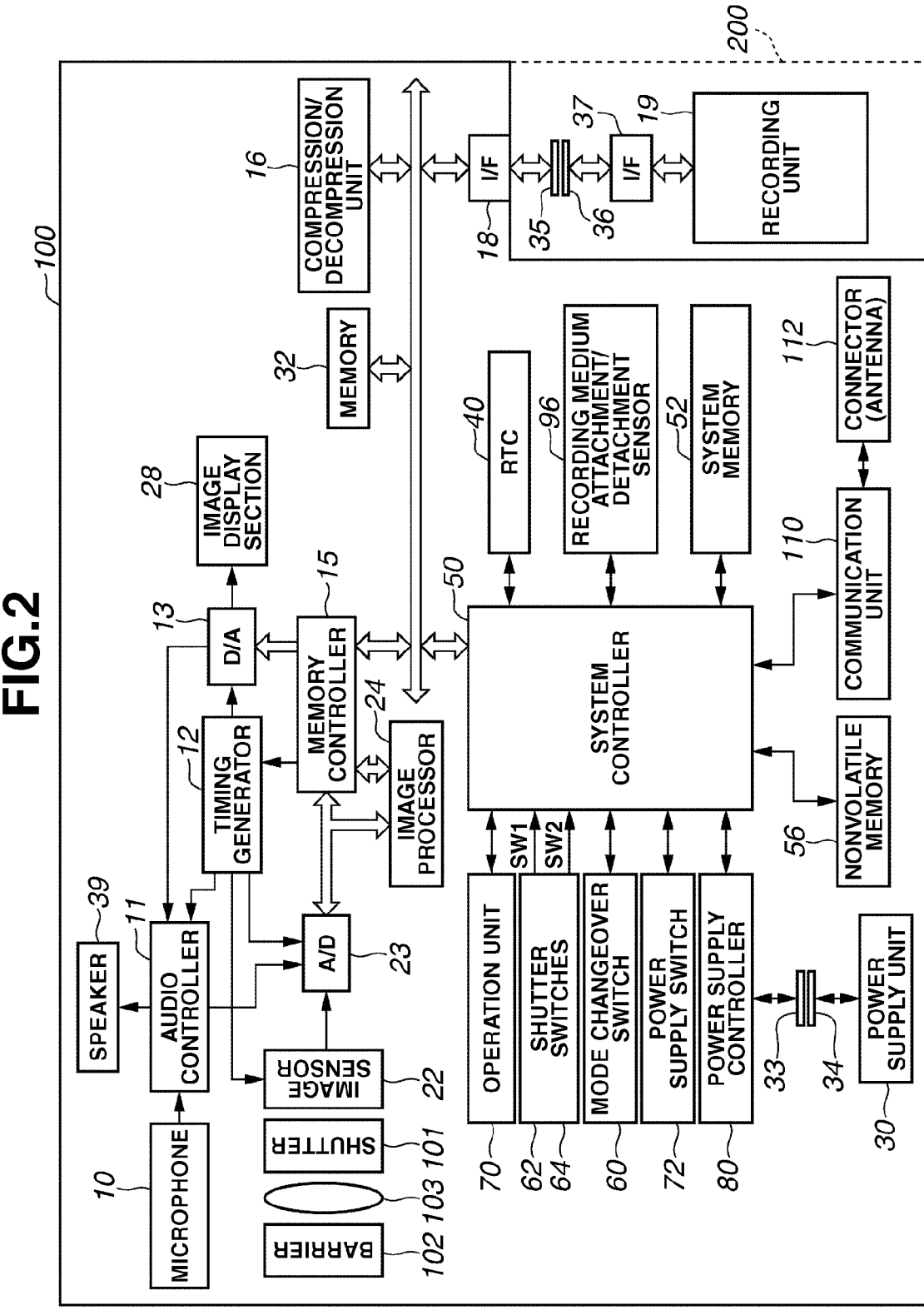
FIG. 2 is a block diagram illustrating a configuration of the digital camera according to an exemplary embodiment.

FIG. 2 is a block diagram illustrating an example of a configuration of the digital camera 100 according to an exemplary embodiment. As illustrated in FIG. 2, the digital camera 100 includes a photographic lens 103, a shutter button 101 having a diaphragm function, an image sensor 22, an analog-to-digital (A/D) converter 23, and a barrier 102. The image sensor 22 includes a charge-coupled device (CCD) or a complementary metal oxide semiconductor (CMOS) device, which converts an optical image into an electrical signal. The A/D converter 23 is used in a case where an analog signal output from the image sensor 22 is converted into a digital signal, or where an analog signal output from an audio controller 11 is converted into a digital signal. The barrier 102 covers an imaging system that includes the lens 103 of the digital camera 100, thus preventing the imaging system, which includes the photographic lens 103, the shutter button 101, and the image sensor 22, from being soiled and damaged.

The digital camera 100 further includes a timing generator 12 which supplies clock signals and control signals to the image sensor 22, the audio controller 11, the A/D converter 23, a digital-to-analog (D/A) converter 13. The timing generator 12 is controlled by a memory controller 15 and a system controller 50. An image processor 24 performs predetermined resizing processing, such as pixel interpolation and reduction, and color conversion on data received from the A/D converter 23 or the memory controller 15. In the image processor 24, predetermined computation processing is performed using captured image data. The system controller 50 performs exposure control and ranging control according to a result of the computation processing. Thus, through-the-lens (TTL) auto-focus (AF) processing, auto exposure (AE) processing, and electronic flash pre-emission (EF) are performed. The image processor 24 performs additional predetermined computation processing using captured image data. The image processor 24 further performs TTL auto white balance (AWB) processing according to a result of this computation processing.

Output data from the A/D converter 23 is written to a memory 32 through the image processor 24 and the memory controller 15 or directly through the memory controller 15. The memory 32 stores image data, which is obtained by the image sensor 22 and is converted into digital data by the A/D converter 23, and image data to be displayed on the image display section 28. The memory 32 is also used to store audio data recorded by a microphone 10, still images, moving images, and file headers of image files. Accordingly, the memory 32 has storage capacity sufficient to store a predetermined number of still images, a moving image of a predetermined time, or audio data of a predetermined time.

The compression/decompression unit 16 compresses and decompresses image data by using adaptive discrete cosine transform (ADCT). The compression/decompression unit 16 reads captured image data stored in the memory 32 using press on the shutter button 101 as a trigger. Then, the compression/decompression unit 16 compresses the read image data and writes the compressed image data to the memory 32. Also, the compression/decompression unit 16 decompresses the compressed image data having been read from a recording unit 19 of the recording medium 200 to the memory 32. Subsequently, the compression/decompression unit 16 writes the decompressed image data to the memory 32. A file section of the system controller 50 converts image data, which has been written to the memory 32 by the compression/decompression unit 16, into files, which are recorded on the recording medium 200 via an interface 18. The memory 32 serves also as a memory for image display (i.e., a video memory). The D/A converter 13 converts data for image display, which has been stored in the memory 32, into an analog signal and supplies the analog signal to the image display section 28. The image display section 28 displays an image on a display device, such as a liquid crystal display (LCD), according to the analog signal supplied from the A/D converter 13. Thus, the image data for image display, which has been written to the memory 32, is displayed by the image display section 28 via the D/A converter 13.

An audio signal output from the microphone 10 is supplied to the A/D converter 23 via the audio controller 11, which includes an amplifier. After the audio signal is converted by the A/D converter 23 into a digital signal, the digital signal is stored in the memory 32 via the memory controller 15. Meanwhile, audio data recorded on the recording medium 200 is converted by the D/A converter 13 into an analog signal after being read to the memory 32. The audio controller 11 drives a speaker 39 according to the analog signal to output audio sound.

A nonvolatile memory 56 is an electrically erasable/recordable nonvolatile memory. For example, an electrically erasable programmable read-only memory (EEPROM) is used as the nonvolatile memory 56. The nonvolatile memory 56 stores constants and programs for operations of the system controller 50. The term "program" designates a program for executing various flowcharts, which will be described below in the following description of the present embodiment.

The system controller 50 controls the digital camera 100. The system controller 50 implements each processing according to the present exemplary embodiment by executing the programs recorded in the nonvolatile memory 56. A random access memory (RAM) is used as a system memory 52. Constants, variables, and the programs, which are read from the nonvolatile memory 56, for operations of the system controller 50 are loaded into the system memory 52.

A mode changeover switch 60, a first shutter switch 62, a second shutter switch 64, and the operation unit 70 are operation units for inputting various operating instructions to the system controller 50.

The mode changeover switch 60 can change an operating mode of the system controller 50 to one of the still image recording mode, the moving image recording mode, and the reproduction mode. The first shutter switch 62 is turned on by halfway depression (i.e., half press) of the shutter button 61 provided in the digital camera 100 to generate a first shutter switch signal SW1. The system controller 50 starts operations, such as AF processing, AE processing, EF, and AWB processing, in response to the first shutter switch signal SW1.

The second shutter switch 64 is turned on by complete depression (i.e., full press) of the shutter button 61 to generate a second shutter switch signal SW2. The system controller 50 starts a sequence of steps of a photographing operation from a step of reading a signal from the image sensor 22 to a step of writing image data to the recording medium 200, in response to the second shutter switch signal SW2.

An appropriate function corresponding to each situation is assigned to each of the operating members of the operation unit 70 with various function icons displayed on the image display section 28. Thus, the operating members of the operation unit 70 act as various function buttons, for example, a finish button, a back button, image feed buttons, a jump button, a defining button, and an attribute change button. When, for instance, a menu button is pressed, a menu screen, in which various setting can be performed, is displayed on the image display section 28. Users can intuitively perform various setting, using the menu screen displayed on the image display section 28, the four direction buttons, and the SET button. The power supply switch 72 switches between an on-state and an off-state of power to the digital camera 100.

A power supply controller 80 includes a battery detecting circuit, a direct-current-to-direct-current (DC-DC) converter, and a switch circuit for changing a block to be entergized. The power supply controller 80 detects a battery mounted in the digital camera 100, a type of the battery, and a remaining battery power level. The power controller 80 controls the DC-DC converter according to results of the detection and to instructions from the system controller 50. The power controller 80 supplies a necessary voltage to each of components, including the recording medium 200, for a necessary period time.

A power supply unit 30 includes primary batteries, such as an alkaline battery or a lithium battery, or secondary batteries, such as a nickel-cadmium (NiCd) battery, a nickel-metal hydride (NiMH) battery, or a lithium (Li) battery, and an alternating current (AC) adapter. Connectors 33 and 34 connect the power supply unit 30 and the power supply controller 80 to each other.

A real time clock (RTC) 40 measures date and time. The RTC 40 internally holds a power supply section that is provided in the digital camera 100 separately from the power supply unit 30. Even in a case where the power supply unit 30 is turned off, a timekeeping state is continued. The system controller 50 sets a system timer using date and time obtained from the RTC 40 at start-up. Thus, the system controller 50 controls various components based on the system timer.

An interface 18 interfaces with the recording medium 200, such as a memory card or a hard disk. A connector 35 connects the recording medium 200 to the interface 18. A recording medium attachment/detachment sensor 98 detects whether the recording medium 200 is attached to the connector 35.

The recording medium 200, such as a memory card or a hard disk, includes the recording unit 19, which includes a semiconductor memory or a magnetic disk, an interface 37 interfacing with the digital camera 100, and a connector 36 which connects the recording medium 200 to the digital camera 100.

A communication unit 110 performs various communication processing among RS-232-C devices, universal serial bus (USB) devices, Institute of Electrical and Electronics Engineers (IEEE) 1394 devices, parallel (P) 1284 devices, small computer system interface (SCSI) devices, modems, local area network (LAN) devices, and wireless communication devices. A connector (or an antenna in the case of wireless communication) 112 connects the digital camera 100 to another device via the communication unit 110.

Figure 3:
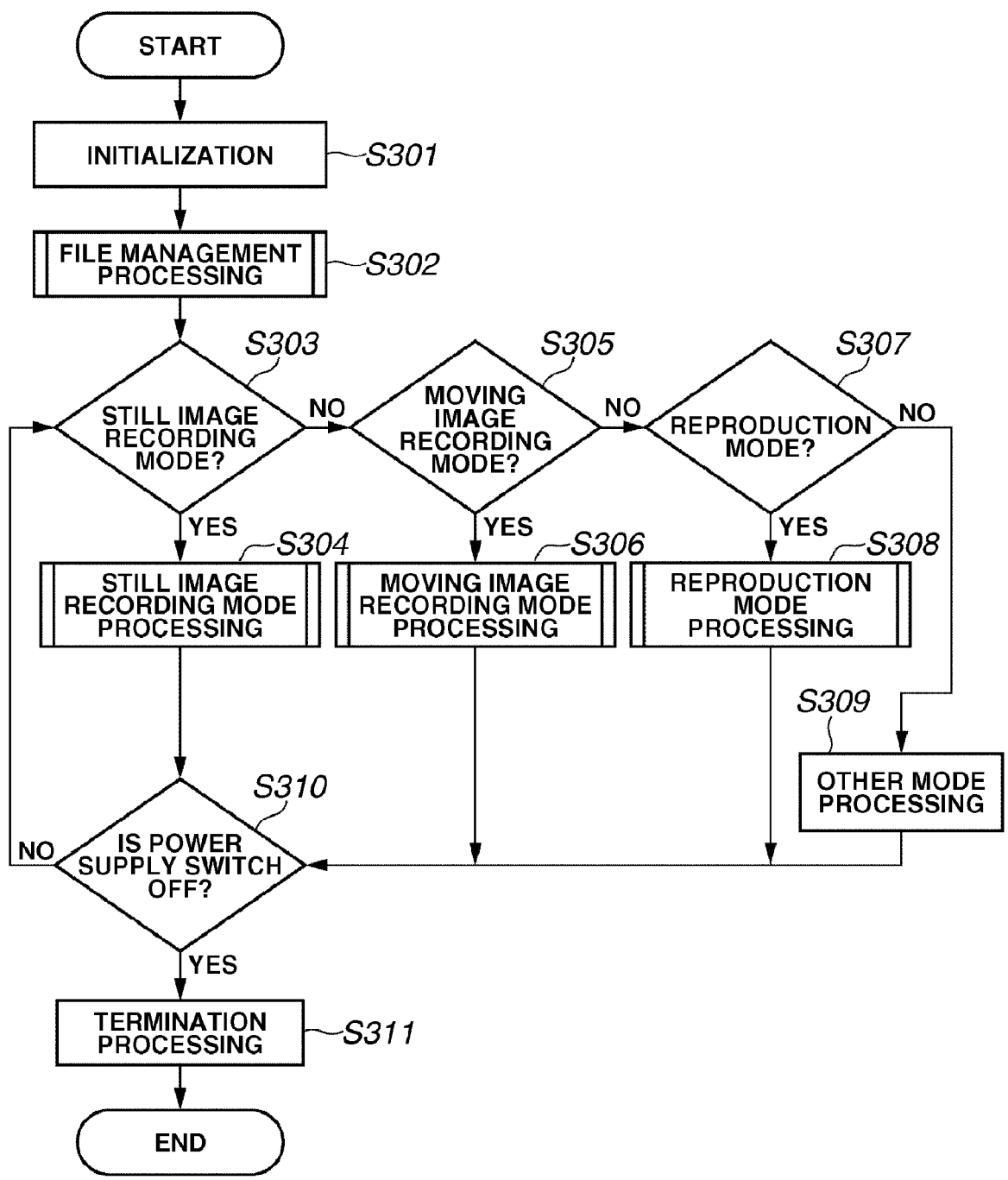
FIG. 3 is a flowchart illustrating a general operation of the digital camera according to an exemplary embodiment.

FIG. 3 is a flowchart illustrating a general operation of the digital camera 100 according to an exemplary embodiment.

When power to the digital camera 100 is turned on by operating the power supply switch 72, the system controller 50 initializes flags and control variables in step S301. Subsequently, the system controller 50 starts management processing concerning files recorded on the recording medium 200 in step S302. The file management processing to be performed in step S302 will be described below with reference to FIG. 40A.

Next, the system controller 50 determines a position, in which the mode changeover switch 60 is set, in steps S303, S305, and S307. In a case where the mode changeover switch 60 is set to a still image recording mode, the process proceeds from step S303 to step S304, in which still image recording mode processing is performed. The still image recording mode processing to be performed in step S304 will be described below in detail with reference to FIG. 4. In a case where the mode changeover switch 60 is set to a moving image recording mode, the process proceeds from step S303 and step S305 to step S306, in which moving image recording mode processing is performed. The moving image recording mode processing to be performed in step S306 will be described below with reference to FIG. 11. In a case where the mode changeover switch 60 is set to a reproduction mode, the process proceeds from step S303, step S305, and step S307 to step S308, in which reproduction mode processing is performed. The reproduction mode processing to be performed in step S308 will be described below with reference to FIG. 15.

In a case where the mode changeover switch 60 is set to one of other modes, the process advances to step S309, in which the system controller 50 performs processing corresponding to the selected mode. The processing corresponding to one of other modes includes, for example, transmission mode processing for transmitting a file stored on the recording medium 200, and reception mode processing for receiving a file from an external device and storing the received file on the recording medium 200. The reception mode processing will be described below with reference to FIG. 14.

After the processing corresponding to the mode set by the mode changeover switch 60 is performed in an associated one of steps S304, S306, S308, and S309, the process proceeds to step S310, in which the system controller 50 determines a position to which the power supply switch 72 is set. In a case where the power supply switch 72 is set to a power supply ON position, the process returns to step S303. Conversely, in a case where the power supply switch 72 is set to a power supply OFF position, the process proceeds from step S310 to step S311, in which the controller 50 performs termination processing, which includes, for example, the following processing. That is, a display performed on the image display section 28 is put into a termination state. Then, the imaging unit is protected by closing the lens barrier 102. Parameters including the flags and the control variables, the set value, and the set mode are recorded in the nonvolatile memory 56. Also, the supply of electric power to portions needing no power supply thereto is interrupted. Upon completion of the termination processing in step S311, the general operation ends. The power supply is brought into an OFF-state.

Figure 4:
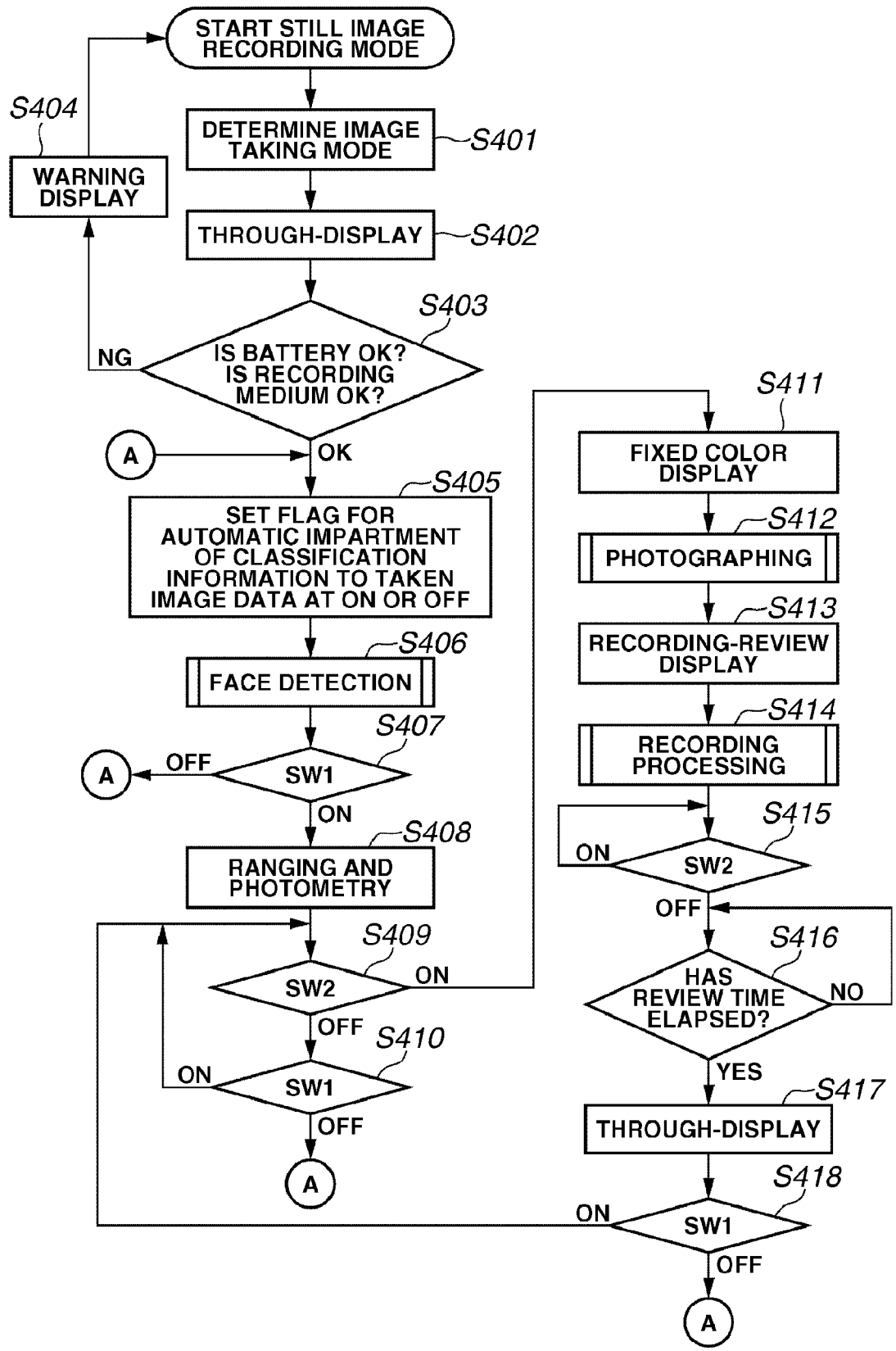
FIG. 4 is a flowchart illustrating a sequence of processing in a still image recording mode of the digital camera.

FIG. 4 is a flowchart illustrating a sequence of processing in a still image recording mode of the digital camera 100 performed in step S304 illustrated in FIG. 3. The still image recording mode processing illustrated in FIG. 4 is finished by interruption processing in a case where the still image recording mode is changed by the mode changeover switch 60 to another mode, and where the power supply switch 72 is set to the OFF position.

When starting the still image recording mode, the system controller 50 determines an image taking mode in step S401. The image taking mode is determined by the following operation (1) or (2).

(1) The system controller 50 acquires an image taking mode that has been set at termination of the last still image recording mode from the nonvolatile memory 56. Then, the system controller 50 stores the acquired image taking mode in the system memory 52.

(2) In a case where a user operates the operation unit 70 to input and set an image taking mode, the system controller 50 stores the input image taking mode in the system memory 52. The image taking mode is implemented by combining a shutter speed, an aperture value, a flash emission condition, and sensitivity setting, which are suitable for an image-taking scene. The digital camera 100 according to the present embodiment has the following image taking modes.

Auto Mode: a mode in which various parameters of the digital camera 100 are automatically determined according to a measured exposure value by a program incorporated in the digital camera 100.

Manual Mode: a mode in which various parameters of the digital camera 100 can freely be changed by a user.

Scene Mode: a mode in which a combination of a shutter speed, an aperture value, a flash emission condition, and sensitivity setting, which are suitable for an image-taking scene, is automatically set.

The scene mode includes the following modes.

Portrait Mode: a mode specialized for taking an image of a person by blurring a background so as to emphasize the person.

Night Scene Mode: a mode specialized for taking an image of a night scene by flashing a person and recording a background at a low shutter speed.

Landscape Mode: a mode specialized for taking an image of a broad landscape.

Night Snap Mode: a mode suitable for taking a clear image of a night scene and a person without a tripod.

Kids-AND-Pets mode: a mode in which an image of children and pets, which bustle around, can be taken without missing a photo opportunity.

Fresh-Verdure-and-Crimson-Foliage Mode: a mode suitable for taking an image of verdure and crimson foliages of foliages of trees vividly.

Party Mode: a mode in which an image of an object is taken with accurate color under a fluorescent lamp or an electric bulb with reduced camera shake.

Snow Mode: a mode in which an image of a person can be taken against a snow landscape without being dark and bluish.

Beach Mode: a mode in which an image of a person can be taken on a seawater surface and a sand beach under strong reflected sunlight without being dark.

Firework Mode: a mode for taking an image of a firework brilliantly at optimum exposure.

Aquarium Mode: a mode in which a sensitivity, a white balance, and a color suitable for taking an image of fishes in an indoor aquarium are set.

Underwater Mode: a mode in which a white balance most suitable for taking an image underwater is set, and in which an image is taken in color that tones down blue.

If the image taking mode is determined in step S401, the system controller 50 performs through-display of image data output from the image sensor 22 in step S402. Then, in step S403, the system controller 50 determines, with the power supply controller 80, a remaining power level of the power supply unit 30, which is constituted by a battery, and the presence/absence or remaining capacity of the recording medium 200, and determines whether the remaining power level of the power supply unit 30 or the presence/absence or remaining capacity of the recording medium 200 adversely affects an operation of the digital camera 100. If it adversely affects an operation of the digital camera 100, a predetermined warning display is performed in step S404 by an image or an audio message. Then, the process returns to step S401

If an operation of the digital camera 100 is not adversely affected by the state of the power supply unit 30 or the recording medium 200, the system controller 50 sets a flag for automatic impartment of classification information to taken image data at ON or OFF in step S405. A user can optionally set the automatic impartment at ON or OFF by pressing a menu button included in the operation unit 70 via a menu screen (not illustrated) displayed on the image display section 28. The flag for automatic impartment of classification information is set at ON or OFF according to a scene mode and to an object condition. A set value (i.e., ON or OFF value) of the flag is stored in the system memory 52. Consequently, classification information unintended by a user can be prevented, as an occasion demands, from being imparted to taken image data. The classification information will be described below.

Subsequently, in step S406, the system controller 50 performs face detection processing to detect whether faces of persons are present in an image, which is represented by an image signal and is displayed by a through-display. The face detection processing will be described below with reference to FIG. 5. In a case where a face of each person is detected by performing the face detection processing, the system controller 50 causes the system memory 52 to store face information representing position coordinates, sizes (i.e., widths and heights), the number of detected faces, and reliability coefficients of the faces detected in the image represented by the image signal. In a case where no faces are detected by the face detection processing, a value of "0" is set in storage regions in the system memory 52, which respectively correspond to the position coordinates, sizes (i.e., widths and heights), the number of detected faces, and the reliability coefficients of the detected faces.

Subsequently, the system controller 50 determines in step S407 whether a first shutter-switch signal SW1 is in an ON-state. If the first shutter-switch signal SW1 is in an OFF-state, the process returns to step S405. Then, the system controller 50 iteratively performs the processing to be performed in steps S405 and S406. Conversely, if the first shutter-switch signal SW1 is in an ON-state, the process proceeds to step S408. In step S408, the system controller 50 performs ranging so as to adjust a focus of the photographic lens 103 on an object, and performs photometry so as to determine an aperture value and a shutter time (or a shutter speed). In the photometry, flash is set, if necessary. At that time, if a face is detected in step S406, ranging can be performed within a range of the detected face.

Next, the system controller 50 determines the ON/OFF state of the second shutter switch signal SW2 and the first shutter switch signal SW1 in steps S409 and S410, respectively. If the second shutter switch signal SW2 is put into an ON-state in a state in which the first shutter switch signal SW1 is in an ON-state, the process proceeds from step S409 to step S411. If the first shutter switch signal SW1 is put into an OFF-state (i.e., in a case where the second shutter switch signal SW2 is not put into an ON-state, and where the ON-state of the first shutter switch signal SW1 is canceled), the process returns from step S410 to step S405. While the first shutter switch signal SW1 is in an ON-state, and the second shutter switch signal SW2 is in an OFF-state, the processing to be performed in steps S409 and S410 is iteratively performed.

When the second shutter switch 64 (SW2) is pressed, the system controller 50 changes a display state of the image display section 28 from the through-display to a fixed color state in step S411. Then, the system controller 50 performs photographing, which includes exposure processing and development processing, in step S412. In the exposure processing, image data obtained via the image sensor 22 and the A/D converter 23 is written to the memory 32 through the image processor 24 and the memory controller 15 or directly through the memory controller 15 from the A/D converter 23. In the development processing, the system controller 50 reads the image data written to the memory 32 using the memory controller 15 and, if necessary, the image processor 24, and performs various processing thereon. The photographing processing will be described below with reference to FIG. 6.

Then, in step S413, the system controller 50 performs recording-review display of the image data, which is obtained by the photographing, on the image display section 28. The recording-review processing is to display image data on the image display section 28 for a predetermined time (i.e., a predetermined reviewing time) so as to check the photographed image before image data representing the photographed image is recorded on the recording medium 200. After the recording-review, the system controller 50 performs recording processing in step S414 to write the image data obtained by the photographing to the recording medium 200 as an image file. The recording processing will be described below in detail with reference to FIG. 7.

Upon completion of the recording processing in step S414, the system controller 50 determines the ON/OFF state of the second shutter switch signal SW2 in step S415. In a case where the second shutter switch signal SW2 is in an ON-state, the system controller 50 repeats the determination in step S415. Then, the system controller 50 waits for a change of the state of the second shutter switch signal SW2 into an OFF-state. During this period, the recording-review display is continued. That is, when the recording processing in step S414 is finished, the recording-review display on the image display section 28 is continued until the second shutter switch signal SW2 changes to an OFF-state. With this configuration, a user can carefully check image data representing a photographed image utilizing recording-reviewing while continuing a full press state of the shutter button 61.

After the user takes an image by bringing the shutter button 61 into a full press state, when the user cancels the full press state of the shutter button 61 by releasing his hand from the shutter button 61, the process proceeds from step S415 to step S416. In step S416, the system controller 50 determines whether a predetermined reviewing time has elapsed. If the predetermined reviewing time has elapsed, the process advances to step S417. In step S417, the system controller 50 changes a display state on the image display section 28 from the recording-review display state to the through-display state. Thus, the recording-review display state, which is provided for confirmation of captured image data, is automatically changed to the through-display state, which is provided to continuously display image data output from the image sensor 22 to prepare for a next photographing operation.

Then, the system controller 50 determines the ON/OFF state of the first shutter switch signal SW1 in step S418. If the first shutter switch signal SW1 is in an ON-state, the process proceeds to step S409. If the first shutter switch signal SW1 is in an OFF-state, the process returns to step S405. That is, in a case where a half press state of the shutter button 61 is continued (i.e., the first shutter switch signal SW1 is in an OFF-state), the system controller 50 waits for the next photographing in step S409. Conversely, in a case where the shutter button 61 is in a released state (i.e., the first shutter switch signal SW1 is in an OFF-state), the system controller 50 finishes a sequence of steps of the photographing process and returns to a photographing standby state in step S405.

Figure 5:
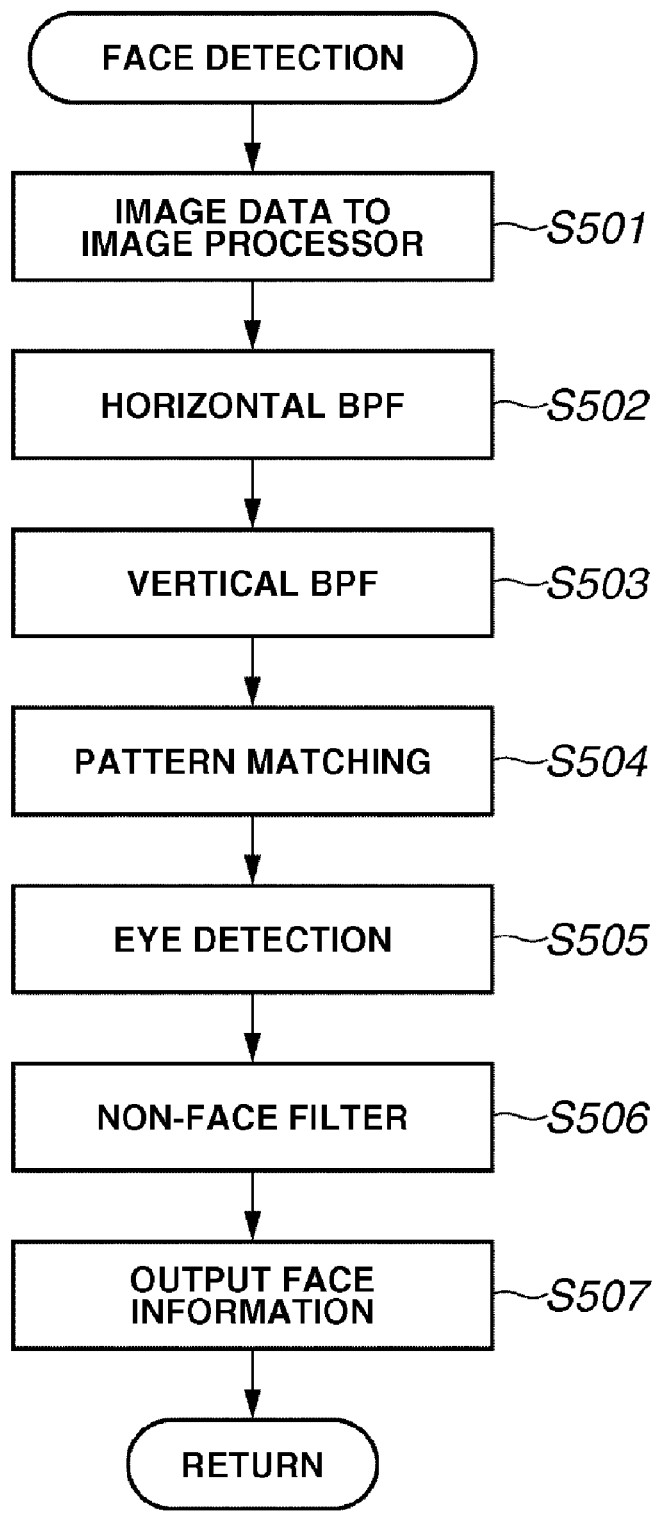
FIG. 5 is a flowchart illustrating face detection processing.

Next, an example of the face detection processing in step S406 illustrated in FIG. 4 is described below with reference to FIG. 5. In step S501, the system controller 50 supplies image data representing an image, from which a face is to be detected, to the image processor 24. In step S502, the image processor 24 causes a horizontal band pass filter (BPF) to act on the image data under the control of the system controller 50. Then, in step S503, the image processor 24 causes a vertical BPF to act on the image data processed in step S502 under the control of the system controller 50. Edge components are detected from the image data with the horizontal BPF and the vertical BPF.

Subsequently, the system controller 50 performs pattern matching on the detected edge components in step S504. Thus, the system controller 50 extracts groups of candidates for eyes, a nose, a mouth, and ears. Then, in step S505, the system controller 50 determines candidates, which meet preset conditions (e.g., a distance between two eyes and inclination of each eye), as a pair of eyes among the groups of the candidates for eyes, which are extracted in step S504. In step S506, the system controller 50 defines only the candidates, which are determined to be pairs of eyes, as a group of candidates for eyes in step S505. Then, the system controller 50 associates groups of candidates for other corresponding parts (i.e., a nose, a mouth, and ears) of each face with the defined group of candidates for eyes. Also, the associated groups of candidates are caused to pass through a preset non-face filter to detect each face. Thus, in step S507, the system controller 50 outputs face information according to a result of the detection of each face, which is performed in step S506, and finishes the face detection processing.

Accordingly, object information can be detected by extracting a feature quantity of an image represented by image data using image data displayed with the through-display. Although the face information has been exemplified as the object information in the description of the present embodiment, various information, such as information for determination of red eyes, can be used as object information.

Figure 6:
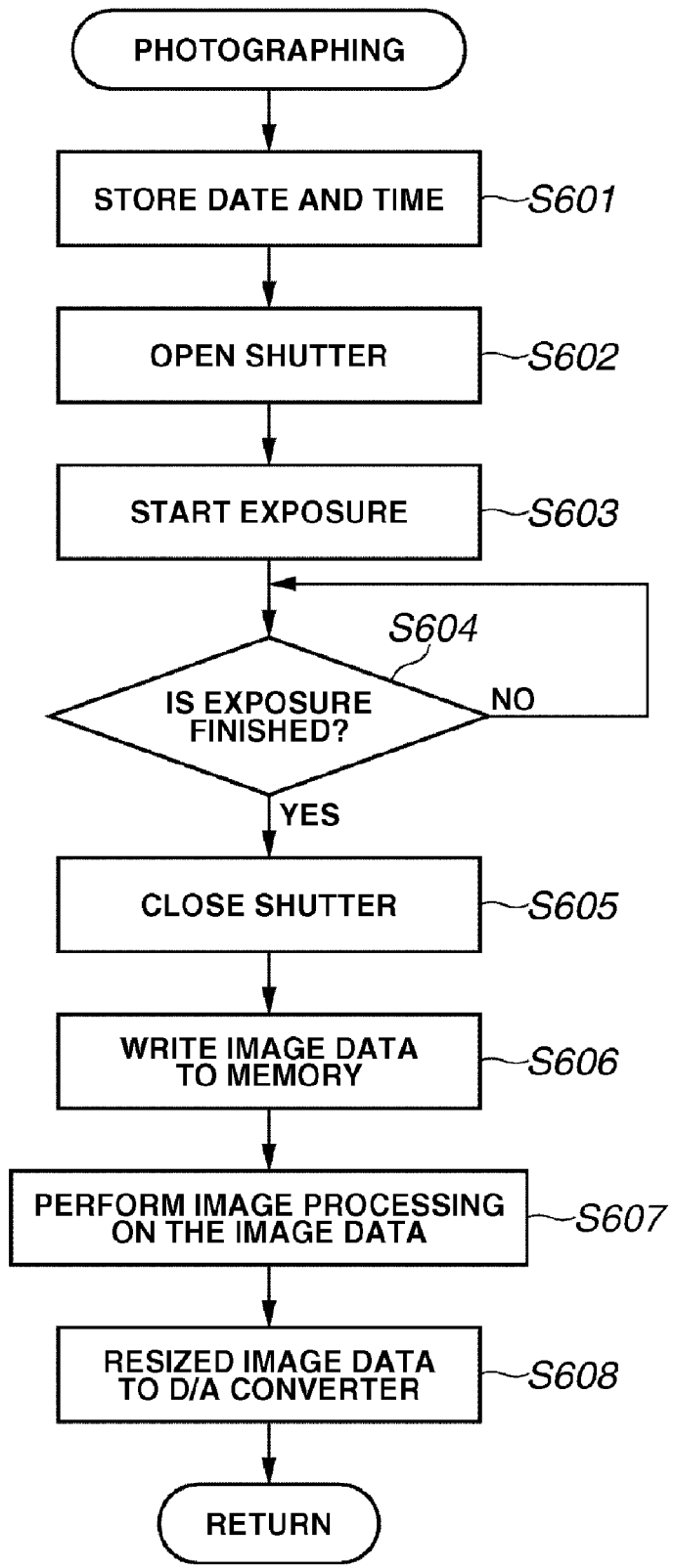
FIG. 6 is a flowchart illustrating photographing by the digital camera.

FIG. 6 is a flowchart illustrating the photographing processing to be performed in step S412 illustrated in FIG. 4.

In step S601, the system controller 50 acquires photographing start date and time from the system timer at the time of start of photographing processing. The system controller 50 causes the system memory 52 to store the acquired date and time. Subsequently, the system controller 50 releases the shutter 101 having a diaphragm function according to an aperture value and to photometry data stored in the system memory 52 in step S602. Thus, the exposure of the image sensor 22 is started in step S603.

In step S604, the system controller 50 waits for completion of the exposure of the image sensor 22 according to the photometry data. When the digital camera 100 reaches an exposure completion time, the system controller 50 closes the shutter 101 in step S605. Then, the system controller 50 reads a charge signal from the image sensor 22 in step S606. Subsequently, image data represented by the charge signal is written to the memory 32 through the A/D converter 23, the image processor 24, and the memory controller 15, or directly through the memory controller 15 from the A/D converter 23. The processing performed in steps S601 to S606 correspond to the exposure processing.

Subsequently, in step S607, the system controller 50 reads the image data written to the memory 32, using the memory controller 15 and also using, if necessary, the image processor 24. Then, the system controller 50 performs image processing on the image data sequentially read therefrom. This image processing includes, for example, white balance processing and compression processing performed using the compression/decompression unit 16. The processed image data is written to the memory 32. Subsequently, the system controller 50 reads image data from the memory 32 in step S608. Then, the system controller 50 decompresses the read image data, using the compression/decompression unit 16, so as to resize the decompressed image data to display an image on the image display section 28. The resized image data is transferred to the D/A converter 13 through the memory controller 15 so as to display the resized image data on the image display section 28. Upon completion of performing a sequence of steps of the processing, the photographing processing ends.

Figure 7:
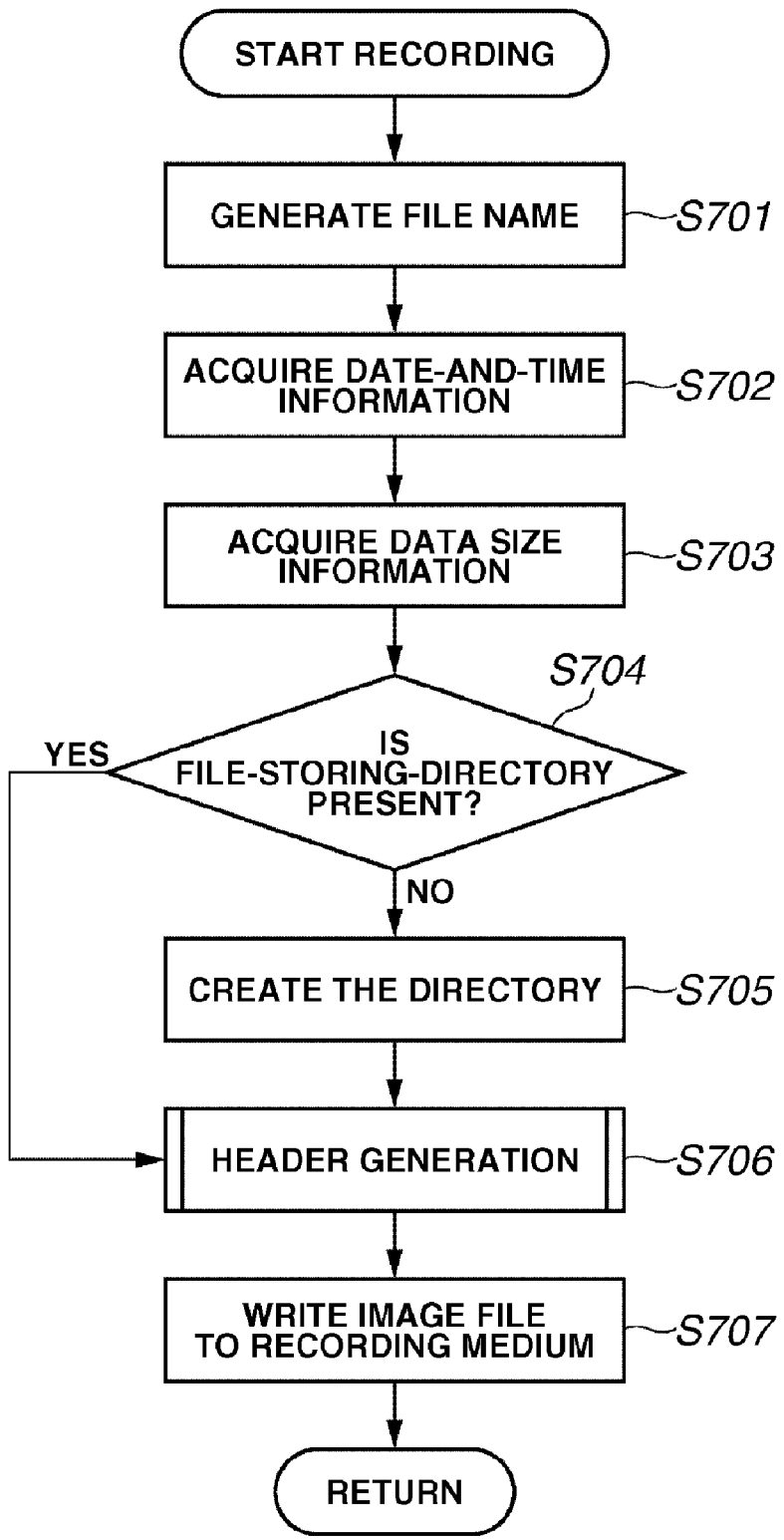
FIG. 7 is a flowchart illustrating recording performed on a recording medium mounted in the digital camera.

FIG. 7 is a flowchart illustrating recording processing of image data generated in the sequence of the photographing processing in step S414 illustrated in FIG. 4.

When starting recording processing, the system controller 50 generates a file name corresponding to the image data, which is an object to be recorded, according to a file name generation rule, which will be described below with reference to FIG. 9, in step S701. Next, in step S702, the system controller 50 acquires date-and-time information stored in the system memory 52 in step S601. Subsequently, in step S703, the system controller 50 acquires a data size of the image data to be recorded.

In step S704, the system controller 50 determines whether a directory in which an image file generated from the image data is to be stored is present in the recording medium 200. If this directory is not present therein, the process proceeds to step S705, in which the system controller 50 creates the directory in which the image file is to be stored. A directory name creation rule will be described below with reference to FIG. 9. In the present embodiment, "100XXX" as indicated by reference numeral 502 in FIG. 9 is created.

Subsequently, in step S706, the system controller 50 generates a file header that includes photographing date and time and photographing conditions and corresponds to the image data stored in the memory 32 in step S607 in the photographing processing illustrated in FIG. 6. Header generation processing will be described below with reference to FIG. 8. Also, the configuration of an image file generated in the above-described manner will be described below with reference to FIG. 9. Upon completion of generation of the header, in step S707, the system controller 50 generates a directory entry from the file name acquired in step S701 and from the date-and-time information acquired in step S702. Then, the system controller 50 records the image file on the recording medium 200. The recording processing then ends.

Figure 8:
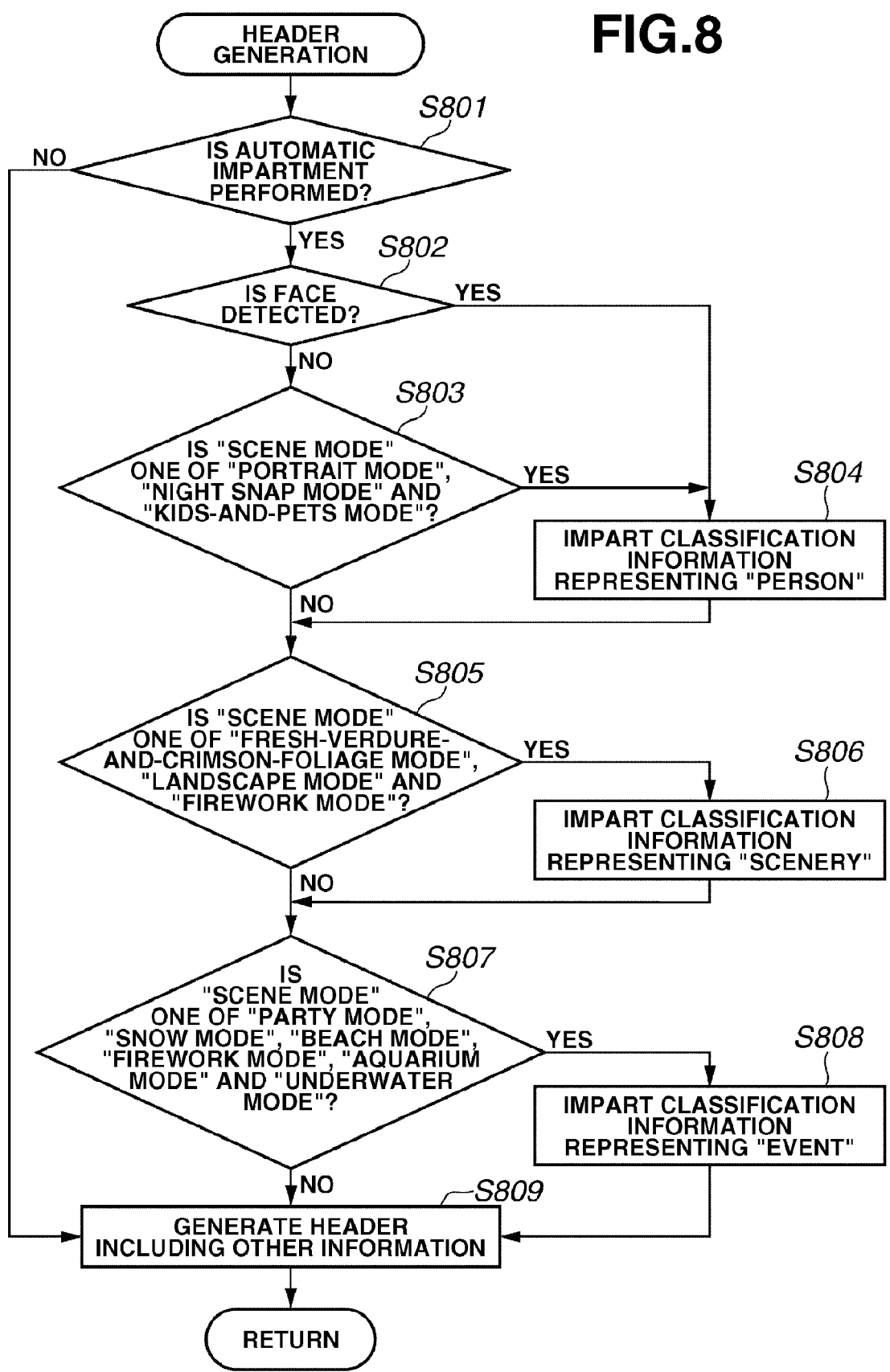
FIG. 8 is a flowchart illustrating header generation processing by the digital camera.

FIG. 8 is a flowchart illustrating the header generation processing performed in step S706 illustrated in FIG. 7.

When starting the header generation processing, the system controller 50 acquires a set value of the flag for automatic impartment of classification information, which is set in step S405 illustrated in FIG. 4, from the system memory 52 in step S801. Thus, the system controller 50 determines whether classification information is automatically imparted to image data representing a photographed image. If the set value of the flag for automatic impartment of classification information is "OFF", so that the automatic impartment of classification information is not performed, the process proceeds to step S809.

If the set value of the flag for automatic impartment of classification information is "ON" in step S801, so that the automatic impartment of classification information is determined to be performed, the process proceeds to step S802, in which the system controller 50 reads the face information stored in the system memory 52 by the face detection processing performed in step S406, and in which the system controller 50 determines whether a face is detected. If it is determined according to the face information that a face is detected, the process advances to step S804, in which classification information representing "person" is imparted to the photographed image. If it is not determined in step S802 that a face is detected, the process proceeds to step S803, in which the system controller 50 refers to a scene mode at the photographing of the image, which is stored in the system memory 52. In step S803, the system controller 50 determines whether the scene mode corresponds to one of "Portrait Mode", "Night Snap Mode", and "Kids & Pet Mode", in each of which an image of a person is assumed to be taken. If so, the process advances to step S804, in which the system controller 50 imparts the classification information representing "person" to the image data. In a case where the classification information representing "person" is imparted to the image data in step S804, and where it is determined in step S803 that the scene mode corresponds to none of "Portrait Mode", "Night Snap Mode", and "Kids & Pet Mode", the process proceeds to step S805.

As described above, in steps S802 through S804, the same classification information representing "person" is imparted to the image data according to the face information, which is object information on an object to be photographed, and to the scene mode representing a condition in which the digital camera 100 at the photographing of an image is set. The object information and the condition, in which the digital camera 100 at the photographing of the image is set, are different parameters at the photographing of the image. However, after the photographing of the image, sometimes, the object information and the scene mode have the same meaning. In the above-described case, the object information and the scene mode have the same meaning that a person is assumed to be photographed. Accordingly, convenience of an operation, such as a search operation, subsequent to the photographing of an image is enhanced. That is, the same classification information is imparted to the image data, using both of the specific object information and the specific condition, in which the digital camera 100 at the photographing of the image is set. Consequently, classification information suitable for an operation, such as a search operation, subsequent to the photographing of an image, which differs from that corresponding to the parameters at the photographing of the image, can be imparted to the image data. Thus, the convenience of an operation subsequent to the photographing of an image can be improved.

According to the above-described classification information impartment processing, the same classification information is imparted to image data, corresponding to a plurality of different scene modes, which are "Portrait Mode", "Night Snap Mode", and "Kids & Pets Mode". Although a camera setting condition at the photographing of the image varies with the different scene modes, sometimes, the camera setting conditions, in each of which the digital camera 100 is set after the image is photographed, corresponding to the different scene modes, respectively, have the same meaning. The exemplified scene modes, that is, "Portrait Mode", "Night Snap Mode", and "Kids & Pets Mode" have the same meaning that the digital camera 100 is assumed to photograph a person. Accordingly, the convenience of operations, such as a search operation, subsequent to the photographing of an image can be enhanced by imparting the same classification information thereto. That is, corresponding to a plurality of specific setting conditions among the setting conditions in which the digital camera 100 at the photographing of an image is set, the same classification information is imparted to the image. Thus, classification information suitable for an operation, such as a search operation, subsequent to the photographing of an image, which differs from that corresponding to the parameters at the photographing of the image, can be imparted to the image data. Consequently, the convenience of an operation subsequent to the photographing of an image can be improved.

In step S805, the system controller 50 determines whether the scene mode corresponds to one of "Fresh-Verdure-and-Crimson-Foliage Mode", "Landscape Mode", and "Firework Mode", in each of which an image of a landscape is assumed to be taken. If so, the process advances to step S806, in which the system controller 50 imparts the classification information representing "landscape" to the image data. In a case where the classification information representing "landscape" is imparted to the image data in step S806, and where it is determined in step S805 that the scene mode corresponds to none of "Fresh-Verdure-and-Crimson-Foliage Mode", "Landscape Mode", and "Firework Mode", the process proceeds to step S807. Then, in step S807, the system controller 50 determines whether the scene mode corresponds to one of "Party Mode", "Snow Mode", "Beach Mode", "Firework Mode", "Aquarium Mode", and "Underwater Mode", in each of which an image of an event is assumed to be taken. If so, the process advances to step S808, in which the system controller 50 imparts the classification information representing "event" to the image data.

In the above-described processing, two types of classification information respectively representing "landscape" and "event" are imparted to the image data representing an image taken in "Firework Mode". That is, a plurality of classification information is imparted to the same image data corresponding to one scene mode. Even in the same setting condition (or scene mode) for the digital camera 100 at the photographing of an image, sometimes, the scene mode may have a plurality of meanings. An example of such a scene mode is the "Firework Mode". In such a case, the system controller 50 imparts a plurality of types of classification information, which respectively corresponds to the meanings obtained after the photographing of an image, to the same image data. Thus, classification information suitable for an operation, such as a search operation, subsequent to the photographing of an image, which differs from that corresponding to the parameters at the photographing of the image, can be imparted to the image data. Consequently, the convenience of an operation subsequent to the photographing of an image by the digital camera 100 can be improved.

In other scene modes, such as "Auto Mode" and "Manual Mode", which are not objects of the determinations in steps S803, S805, and S807, no classification information is imparted to the image data.

Thus, upon completion of imparting classification information to the header, the process proceeds to step S809, in which the system controller 50 generates header information using the classification information, and a photographing set value of photographing-date-and-time information. Then, the header generation processing is completed. If it is determined in step S801 that the set value of the flag for automatic impartment of classification information is "OFF", the setting of the classification information in steps S802 to S808 is skipped. Consequently, header information including no classification information is generated.

As described above, image data can be immediately classified in a reproduction mode by automatically imparting classification information to image data at the photographing of an image, without performing a conventional sorting operation of classifying image files while watching a reproduced image. Because a concept indicated by classification information is created from both of the setting condition, in which the digital camera 100 at the photographing of an image is set, and object information, classification information suitable for the concept at an operation, such as an image search, which is performed subsequent to the photographing of the image, can be generated.

Several scene modes have been described as examples of the setting condition, in which the digital camera 100 at the photographing of an image is set, for automatically imparting classification information to the image. The setting condition, in which the digital camera 100 at the photographing of an image is set, is not limited thereto. Another example of impartment of classification information according to the setting condition, in which the digital camera 100 at the photographing of an image is set, is that in a case where an image of a distant landscape is taken in the manual mode, classification information representing "landscape" can be imparted to the image by assuming that a landscape is photographed. Alternatively, in a case where an image is taken using a self-timer, at least classification information representing "person" or classification information representing "event" can be imparted to the image. Although the face information has been described as an example of the object information, the object information is not limited thereto. Red-eye determination information can be employed as the object information. For example, in a case where a red eye is detected, classification information representing "person" can be imparted to an image thereof. As long as the classification information to be automatically imparted to an image can conveniently be utilized after a user takes the image, the classification information is not limited to three types of classification information respectively representing "person", "event", and "landscape".

Figure 9:
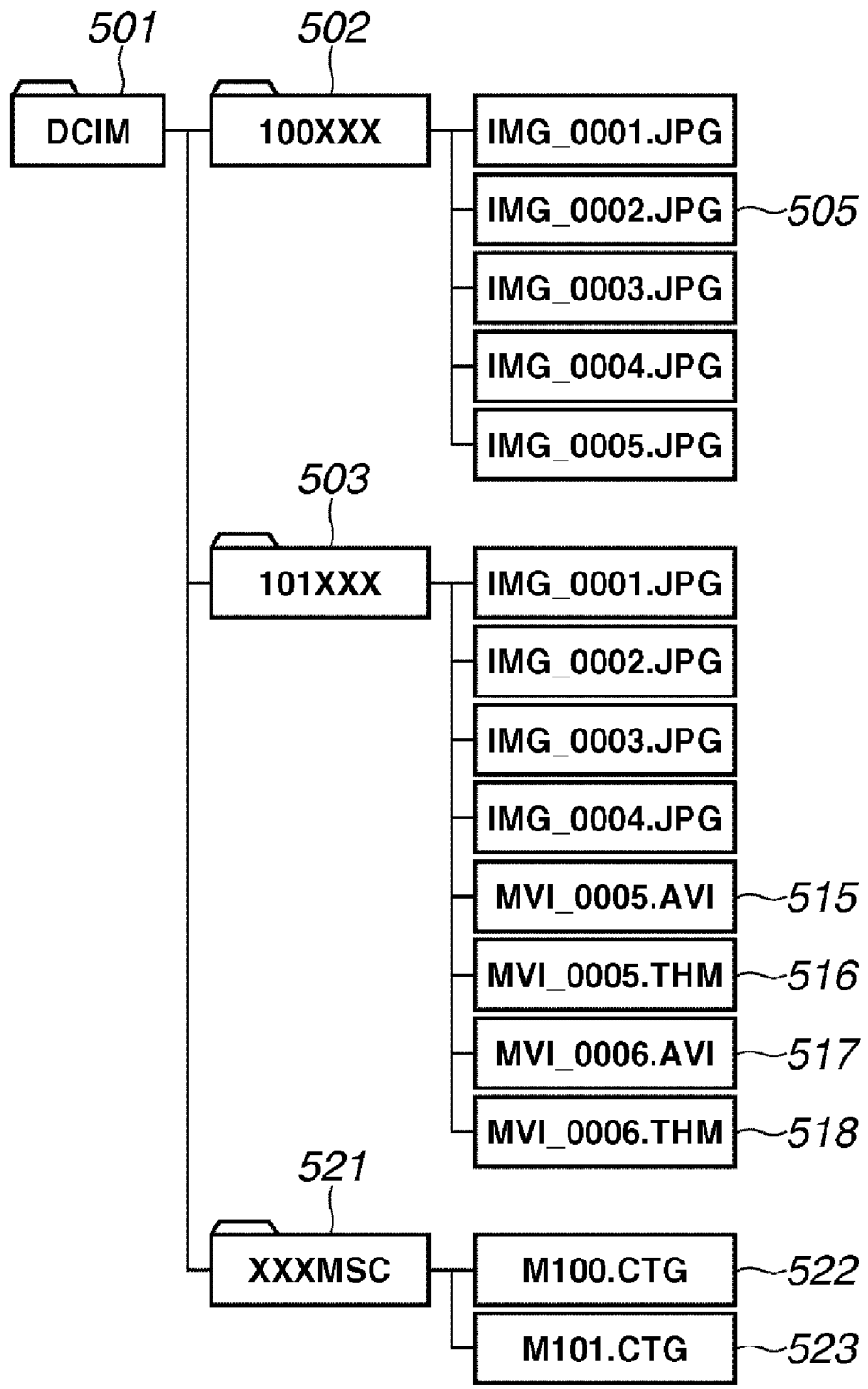
FIG. 9 illustrates an example of a structure of files recorded on a recording medium.

FIG. 9 illustrates an example of a configuration of directories recorded on the recording medium 200 as a result of the recording processing. Hereinafter, a directory name creation rule and a file name generation rule are described with reference to FIG. 9.

A DCIM directory 501 is recorded in a root directory. A subdiretory having a name of eight characters is generated in the directory 501. Leading three characters of a subdirectory name held by the subdirectory are numerals. A value designated by the leading three characters starts with "100" and is then incremented by "1" at each generation of a directory. FIG. 9 illustrates subdirectories "100XXX" 502 and "101XXX" 503. Files belonging to the subdirectory 502 are created by the digital camera 100. An extended name of each of the created files includes an eight-character file name and a three-character extension name that designates the type of each of the files. A value represented by the last four characters of the file name starts with "0001" and is incremented by "1" at each photographing in the still image recording mode. Hereinafter, a number designated by the last four characters of the file name is referred to as a "file number". In the case of a still image, "JPG" is given thereto as an extension name. Further, "AVI" is given as an extension name to a recorded moving image file to be recorded in the moving image recording mode. Additionally, "THM" is given as an extension name to a thumbnail file in which management information is recorded.

Figure 10:
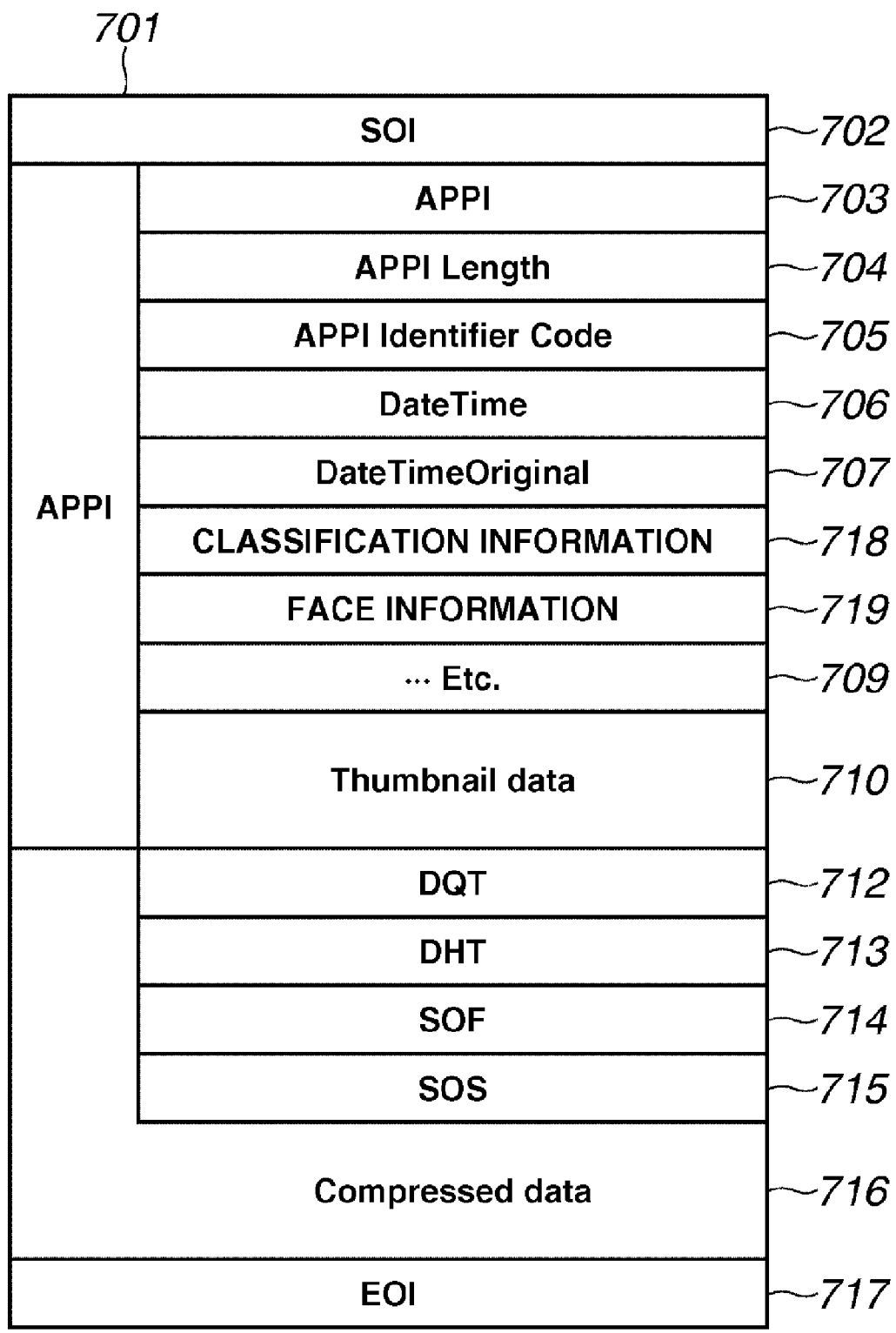
FIG. 10 illustrates a configuration of a still image file recorded on a recording medium.

FIG. 10 illustrates a data structure of a still image file recorded on the recording medium 200 in the above-described recording processing.

An image file 701 includes a marker (SOI (Start of Image)) 702, which designates a start of the image file, at a leading position thereof. The image file 701 further includes an application marker (APP1) 703 corresponding to a header portion. The application marker (APP1) 703 includes the following information.

Size (APP1 Length) 704,

Identifier Code of Application Marker (APP1 Identifier Code) 705,

Date and Time of Creating Image Data (Date Time) 706,

Date and Time of Generating Image Data (Date Time Original) 707,

Classification Information of Image Data 718,

Face Information 719,

Other Photographing Information 709, and

Thumbnail Image (Thumbnail Data) 710.

As described above with reference to FIG. 8, the classification information 718 differs from the parameters at the photographing of an image and is suitable for an operation, such as a search, performed subsequent to the photographing thereof. One or more of a plurality of types of classification information respectively representing "person", "landscape" and "event" having been described with reference to FIG. 8 can be stored in the field "classification information" 718. Also, general classification information representing "Category 1", "Category 2", and "Category 3" can be stored in the field "classification information" 718. Additionally, classification information designating "Work" for prompting, when image data is transferred to an external device such as a personal computer (PC) by the communication unit 110, special processing, such as mail sending, from a transfer destination can be stored therein in a reproduction mode, which will be described below with reference to FIG. 15. Such classification information, which is not automatically imparted to the image data by performing the processing illustrated in FIG. 8, is imparted to desired image data by a predetermined user operation, which will be described below. Additionally, classification information, which is automatically imparted to image data at the photographing of an image, can be edited in the reproduction mode, which will be described below.

Thus, more highly convenient classification can be implemented by imparting classification information for relatively slowly classifying image data while observing a reproduced image, in addition to the classification information automatically imparted to image data at photographing of an image.

The face information 719 is generated by the face detection processing performed in step S406 illustrated in FIG. 4. The face information 719 includes sets of information representing position coordinates, sizes (i.e., widths and heights), the number of detected faces, and reliability coefficients of the faces detected in the image represented by an image signal so that the number of sets of information is equal to the number of the detected faces. Image data recorded in the image file 701 includes a quantization table (DQT) 712, a Huffman table (DHT) 713, a frame start marker (SOF (Start of Frame)) 714, a scan start marker (SOS (Start of Scan)) 715, and compressed data 716. The field for storing the face information 719 ends with a marker (EOI (End of Image file data)) 717 indicating the end of image file data.

Figure 11:
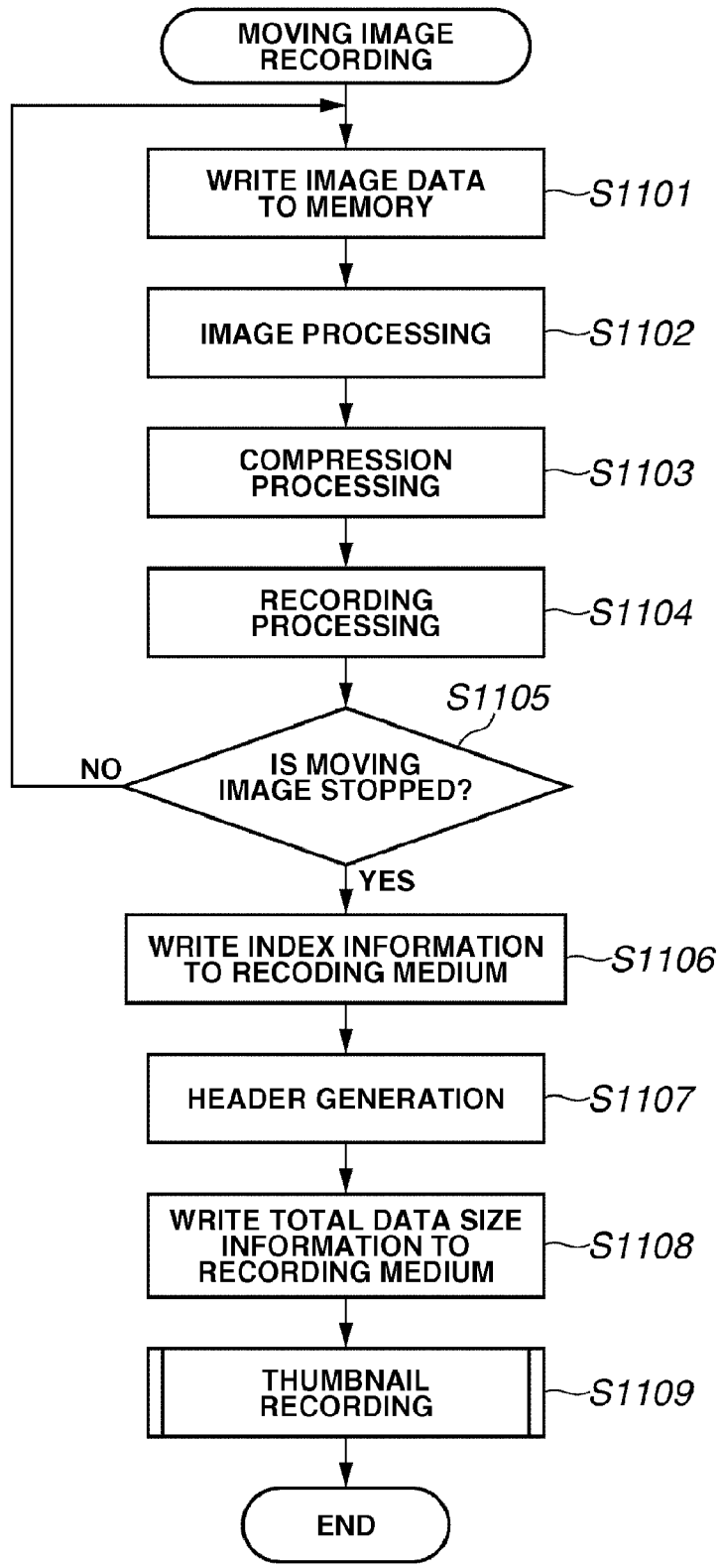
FIG. 11 is a flowchart illustrating moving image recording mode processing by the digital camera.

Next, the moving image recording mode processing performed in step S306 illustrated in FIG. 3 is described below. When the mode changeover switch 60 is set to a moving image recording mode, the system controller 50 determines an image taking mode. In the following description of the present exemplary embodiment, it is assumed that the image taking mode determined in the moving image recording mode is similar to that determined in the still image recording mode. Apparently, the digital camera 100 can be configured such that the image taking mode is specialized for recording a moving image. FIG. 11 is a flowchart illustrating moving image recording mode processing by the digital camera 100 according to the present exemplary embodiment. When it is detected in the moving image recording mode that the second shutter switch signal SW2 is in an ON-state, the system controller 50 starts moving image recording illustrated in FIG. 11.

First, in step S1101, the system controller 50 causes the memory 32 to serially store image data captured by the image sensor 22 at a predetermined frame rate. Simultaneously with this, the system controller 50 causes the memory 32 to store audio data obtained via the microphone 10, the audio controller 11, and the A/D converter 23. According to the present exemplary embodiment, the audio data is assumed to be PCM digital data. Subsequently, in step S1102, the system controller 50 performs image processing, such as image size conversion for recording an image in a file, on the image data stored in the memory 32. Then, in step S1103, the system controller 50 performs compression processing and causes the memory 32 to store the compressed image data.

FIG. 12 illustrates a storage format for storing moving image files to be recorded on the recording medium 200. A fixed-length header region 1201 including data representing a video frame rate and an audio sampling rate is provided at a leading part of the data. A fixed-length audio data region 1202 storing audio data of a predetermined recording unit (i.e., 1 second according to the present exemplary embodiment) is provided just posterior to the header region 1201. Audio data is obtained by converting sound input to the microphone 10 into digital data via the audio controller 11 and the A/D converter 23 and by sampling the digital data. The audio data is stored in the memory 32. Frame data recorded at a predetermined frame rate is sequentially stored in regions 1203 to 1206 on the memory 32 from immediately posterior to the audio data region 1202. Thus, audio data and frame data are sequentially generated and stored in predetermined units of recording. Thus, moving image data is generated.

Thus, when moving image data of 1 second is stored in the memory 32, the system controller 50 starts recording processing in step S1104 to record the moving image data, which has been stored in the memory 32, on the recording medium 200, in parallel with the recording processing of moving image data and audio data. The system controller 50 iteratively performs a process including steps S1101 to S1104 until a request for stopping a moving image is detected in step S1105. The request for stopping a moving image is generated by detecting that the second shutter switch signal SW2 has changed to an ON-state again, detecting that a free space of the recording medium 200 is insufficient, or detecting that a free space of the memory 32 is insufficient.

As described above, FIG. 9 illustrates an example of a configuration of directories recorded on the recording medium 200 as a result of the recording processing by the digital camera 100. The extension "AVI" is added to the file name of each of the moving image files recorded in the moving image recording mode as indicated by reference numerals 515 and 517. Also, the extension "THM" is added to the file name of each of the thumbnail files, in which management information is recorded, as indicated by reference numerals 516 and 518.

When moving recording processing is stopped in response to the request for stopping a moving image, the process proceeds from step S1105 to step S1106, in which the system controller 50 records, on he recording medium 200, index information 1218 representing an offset to and a size of each audio data/video data after the remaining moving data in the memory 32 is written to the recording medium. Then, in step S1107, the system controller 50 generates header information, such as a total number of frames. In step S1108, the system controller 50 writes information representing a total data size to the directory entry and records this information on the recording medium 200. Thus, the recording of a moving image file is completed. Subsequently, in step S1109, the system controller 50 generates moving-image file management information in a thumbnail file, whose file name is, for example, "MVI_0005.THM" (516), which has the same file number as that of the above-described moving image file and has an extension "THM". A configuration, generation, and recording of a thumbnail file are described with reference to FIG. 13.

The thumbnail file generated in the moving image recording processing has a file structure similar to that of the image file illustrated in FIG. 10. However, the thumbnail file does not have a region 710 in which thumbnail data is to be recorded. A thumbnail image is recorded in the compressed data region 716.

A thumbnail file 701 includes a marker (SOI) 702, which designates a start of the image file, at a leading position thereof. The thumbnail file 701 further includes an application marker (APP1) 703 posterior to the marker (SOI) 702. The application marker (APP1) 703 includes the following information.

Size (APP1 Length) 704,
Identifier Code of Application Marker (APP1 Identifier Code) 705,
Date and Time of Creating Image Data (Date Time) 706,
Date and Time of Generating Image Data (Date Time Original) 707,
Classification Information of Image Data 718,
Face Information 719, and
Other Photographing Information 709.

Image data of the thumbnail file represents a reduced image of a leading frame at the start of recording a moving image. Image data recorded in the thumbnail file 701 includes a quantization table (DQT) 712, a Huffman table (DHT) 713, a frame start marker (SOF) 714, a scan start marker (SOS) 715, and compressed data 716 corresponding to the reduced image. The field for storing the face information 719 ends with a marker (EOI) 717 indicating the end of image data.

Figure 13:
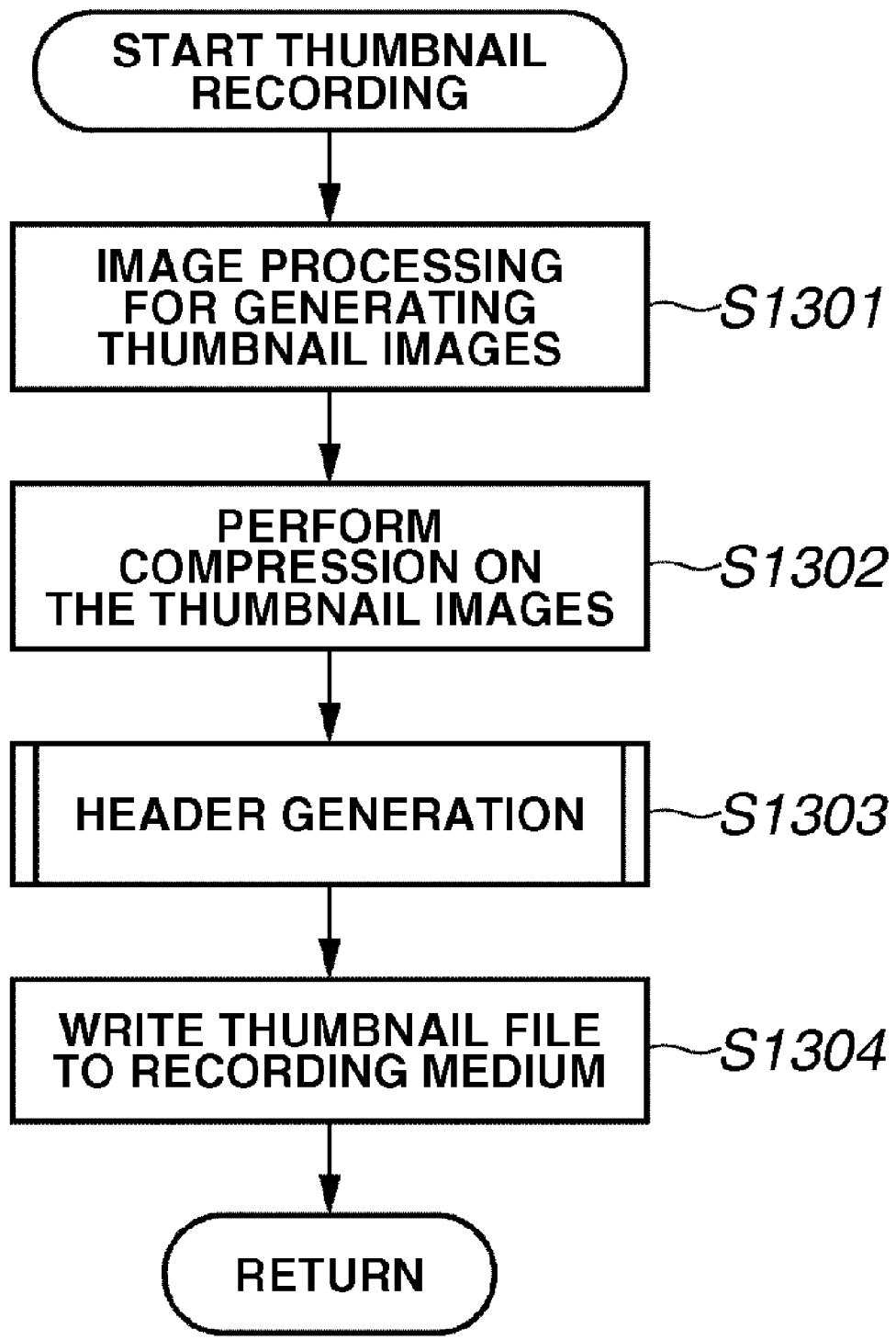
FIG. 13 is a flowchart illustrating thumbnail recording processing by the digital camera.

Next, thumbnail recording processing in step S1109 is described below with reference to a flowchart illustrated in FIG. 13.

In step S1301, the system controller 50 generates a thumbnail image. According to the present exemplary embodiment, the thumbnail image is generated by performing image processing on the leading frame of moving image data stored in the memory 32, for example, changing an image size of the leading frame into a predetermined image size. Next, in step S1302, the compression/decompression unit 16 performs compression processing on the thumbnail image generated in step S1301. Then, in step S1303, a header including an application marker 703 described with reference to FIG. 10 is generated. This processing is performed as described above with reference to FIG. 8. Upon completion of generating the header, in step S1304, the system controller 50 writes a thumbnail file, which includes the header and the thumbnail image data, to the recording medium 200. Then, thumbnail recording processing ends.

Figure 14:
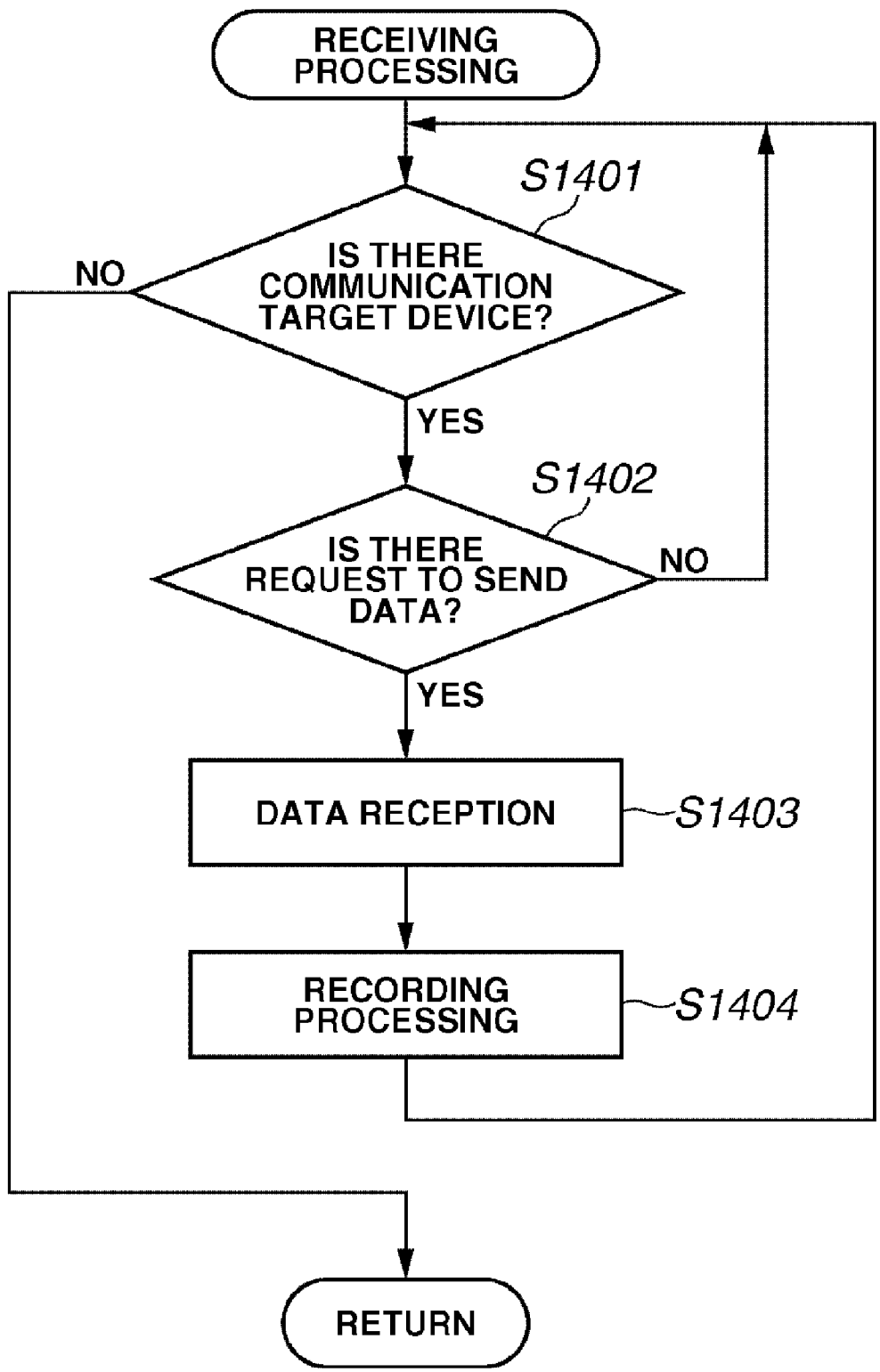
FIG. 14 is a flowchart illustrating receiving processing by the digital camera.

Next, reception mode processing, which is included in other mode processing performed in step S309, is described below. When the mode changeover switch 60 of the digital camera 100 is changed to a reception mode, reception processing illustrated in FIG. 14 is performed. An operation of receiving an image file from an external device (i.e., a communication target device) and recording the image file on a recording medium is described below.

In step S1401, the system controller 50 determines whether a communication target device is present. If it is determined that there is no communication target device, the system controller 50 determines in step S1402 whether a request for sending data is present. If it is determined that there is no request for sending data, the process returns to step S1401. Then, the system controller 50 determines again whether a communication target device is present. If it is determined that there is no communication target device, the system controller 50 waits for a request for sending data.

Conversely, if it is determined that there is a communication target device, the process advances to step S1403. In step 1403, the system controller 50 receives data from the communication target device via the communication unit 110. Then, the received data is temporarily stored in the memory 32. Subsequently, in step S1404, the system controller 50 writes the received data to the recording medium 200. At that time, in a case where the header portion of the received data includes classification information, the received data is written to the recording medium 200 without being changed. In a case where the header portion of the received data includes no classification information, classification information can be added to the header portion by performing processing similar to the processing illustrated in FIG. 8. In this case, the setting condition, in which the digital camera 100 at the photographing of an image is set, is acquired by referring to the header portion of the received data. For example, face information 719 and image-taking mode information (or scene mode information) included in other photographing information 709 are referred to. Additionally, object information can be acquired by referring to the header portion of the received data. Alternatively, object information can be newly detected by analyzing the received image data. Upon completion of writing, the process returns to step S1401. Then, the system controller 50 determines again whether a communication target device is present. Thus, the system controller 50 waits for a request for sending data. If it is determined that there is no communication target device, the system controller 50 exits the receiving processing.

Figure 15:
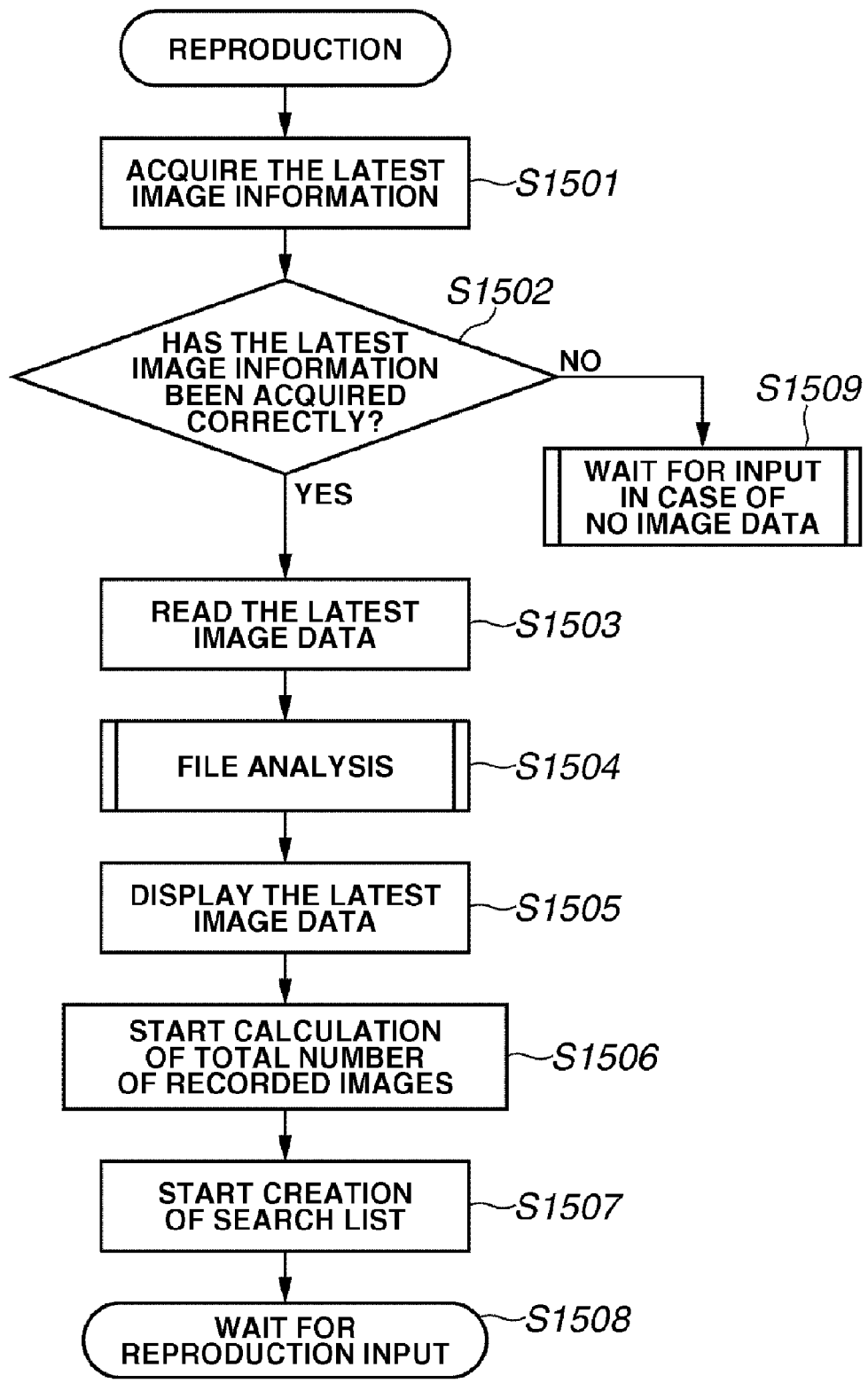
FIG. 15 is a flowchart illustrating reproduction processing by the digital camera.

FIG. 15 is a flowchart illustrating a reproduction mode operation of the digital camera 100 according to an embodiment. The flowchart illustrated in FIG. 15 illustrates the processing performed in step S308 in detail.

In step S1501, the system controller 50 acquires the latest image information from the recording medium 200. The acquirement of the latest image information is performed earlier than the calculation of a total number of images and the generation of a search list. Thus, an embodiment has an advantage that when the digital camera 100 enters a reproduction mode, a processed image can quickly be displayed. In step S1502, the system controller 50 checks whether the acquirement of the latest image information has appropriately been performed in step S1501. In a case where the latest image information cannot be acquired, the process proceeds to step S1509, in which the system controller 50 waits for input in the case of no image data. Processing to be performed in step S1509 will be described below with reference to the flowchart illustrated in FIG. 16. The case in which the latest image information cannot be obtained may be that there is no image data, or that no image information can be acquired due to defective media. If the latest image information can be acquired, the system controller 50 determines that at least image data representing one image is present. Then, the process proceeds to step S1503.

In step S1503, the system controller 50 reads the latest image data from the recording medium 200 according to the latest image information acquired in step S1501. Then, in step S1504, the system controller 50 performs file analysis processing to acquire photographing information and attribute information of an image represented by the read latest image data. The file analysis processing will be described below with reference to FIG. 45. In step S1505, the system controller 50 performs display of the latest image data. Additionally, the photographing information and the attribute information acquired in step S1504 are displayed. In a case where it is determined according to the result of the file analysis performed in step S1504 that the file is improper data, e.g., partly collapsed data, an error display is also displayed.

In step S1506, the system controller 50 starts calculation of a total number of images recorded on the recording medium 200. The processing in step S1506 runs in the background. The next processing can be performed without waiting for completion of the processing. Thus, a large amount of image data is stored on the recording medium 200. Even in a case where it takes time to calculate a total number of images, an image can be viewed without waiting for completion of calculation of the total number of images. The processing in step S1506 is particularly effective in a case where image data is newly recorded or erased in a recording mode or a total number of images changes when the mode of the digital camera 100 is changed from the recording mode to the reproduction mode. In a case where image data is not newly recorded or erased in the recording mode, the total number of images, which has already been calculated, is utilized. Therefore, it is unnecessary to calculate the total number of images.

Next, in step S1507, the system controller 50 starts creation of a search list. The search list is a list for preliminarily acquiring and managing attribute information imparted to image data. An image corresponding to each attribute can quickly be reproduced or erased by preliminarily creating a search list. Search list creation processing is performed in the background, similarly to the calculation of the total number of images. Thus, the next processing can be performed without waiting for completion of the search list creation processing. In step S1508, the system controller 50 is put into a state in which the system controller 50 waits for input. The processing to be performed in a state in which the system controller 50 waits for input will be described below with reference to the flowchart illustrated in FIG. 17.

Process of Waiting for Input in the Case of No Image Data in Reproduction Mode Processing (S1509)

Figure 16:
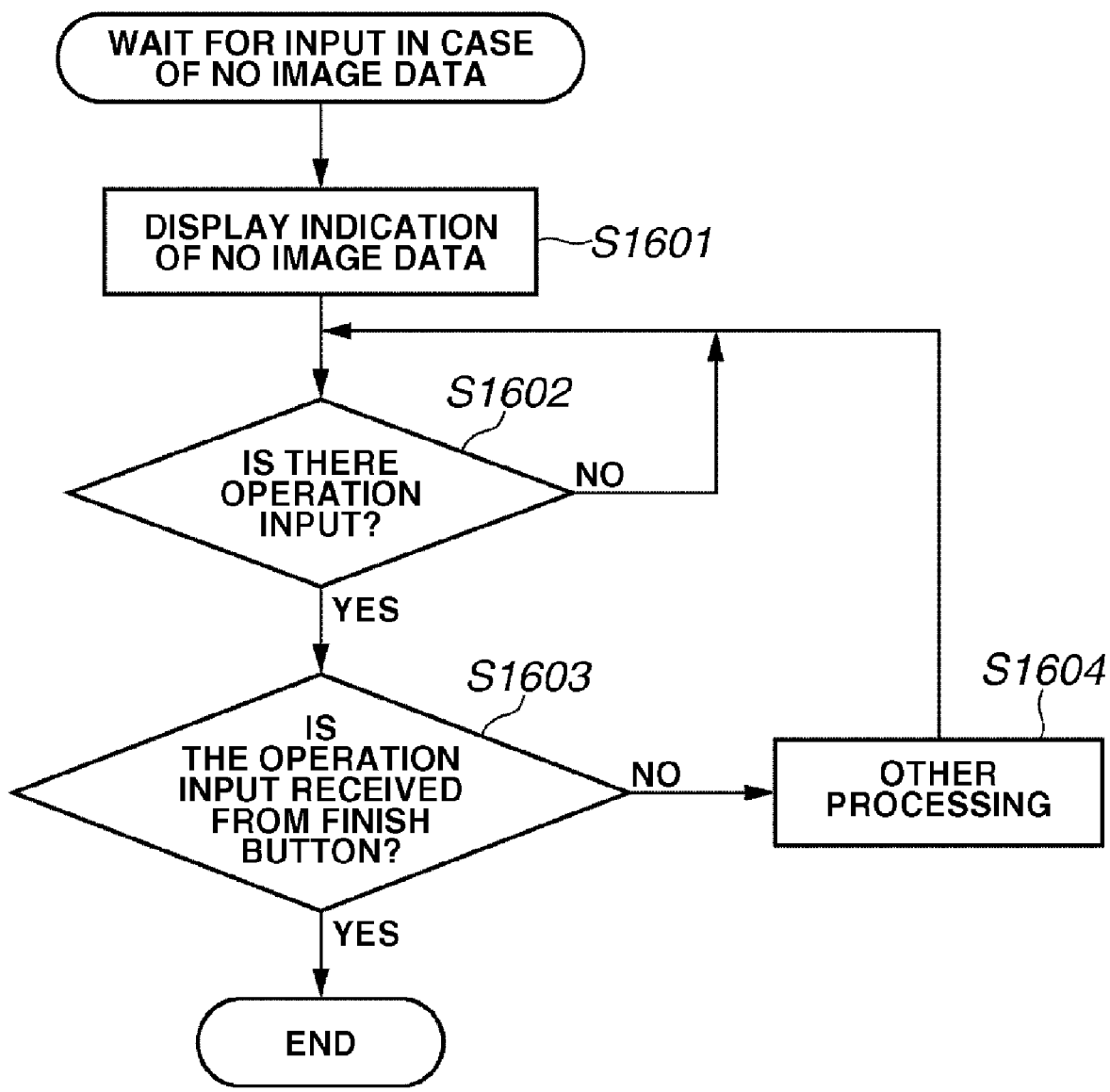
FIG. 16 is a flowchart illustrating a process performed in the reproduction processing in the case of no image data.

FIG. 16 is a flowchart illustrating a process of waiting for an input in the reproduction mode in the case of no image data.

First, in step S1601, the system controller 50 causes the image display section 28 to display a message "There Is No Image Data" so as to inform a user of the absence of image data. Next, in step S1602, the system controller 50 waits for an operation input. The operation input includes a user's operation performed on a button or a battery cover, and an event informing a user of a power supply level down. When a certain operation input occurs, the process proceeds to step S1603, in which the system controller 50 checks whether this input is a user's press on the finish button. If it is determined that this input is a user's press on the finish button, the reproduction mode processing ends. Then, the process proceeds to step S310 illustrated in FIG. 3. Conversely, if this input is other than a user's press on the finish button, the process proceeds to step S1604, in which processing corresponding to this operation input is performed. For example, in a case where a user's press on a menu button is input as the operation input even when there is no image data, the system controller 50 causes the image display section 28 to perform a menu display, so that the user can change the setting of the digital camera 100.

Process of Waiting for Reproduction Input in Reproduction Mode Processing (S1508)

Figure 17:
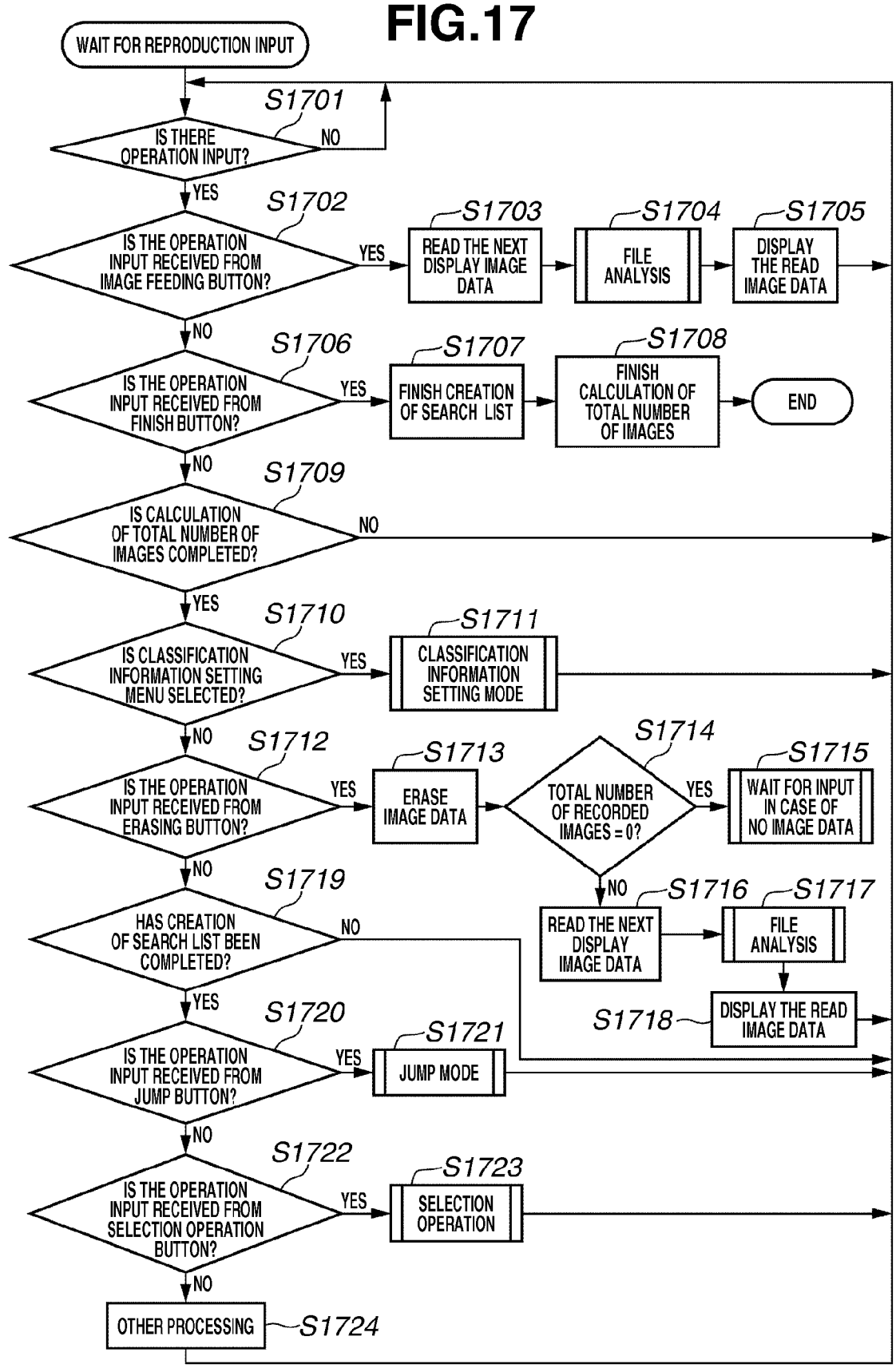
FIG. 17 is a flowchart illustrating a process of waiting for reproduction input, which is performed in the reproduction processing.

FIG. 17 is a flowchart illustrating a process of waiting for an input in the reproduction mode.

In step S1701, the system controller 50 checks whether there is a user's operation input. As described above, the operation input includes a user's operation performed on a button or a battery cover, and an event informing a user of a power supply level down. If there is no operation input, the system controller 50 waits for an input. If there is a certain operation input occurs, the process proceeds to step S1702.

The system controller 50 determines in step S1702 whether the operation input is a user's press on an image feed button included in the operation unit 70. If the operation input is the user's press on the image feed button, the process proceeds to step S1703, in which the system controller 50 reads the next display image data. The image feed buttons are a pair of buttons respectively corresponding to feeding directions. The next display image data is read according to the feeding direction corresponding to the pressed button. Next, in step S1704, the system controller 50 performs file analysis processing on the photographing information and the attribute information concerning the image data read in step S1703. The file analysis processing will be described below with reference to FIG. 45. Then, in step S1705, the system controller 50 performs display of the image data read in step S1703. At that time, the photographing information and the attribute information are displayed using a result of the file analysis processing performed in step S1704. In a case where it is determined according to the result of the file analysis performed in step S1704 that the file is improper data, e.g., partly collapsed data, an error display is also displayed. Upon completion of this display, the process returns to step S1701, in which the system controller 50 waits for an input.

If it is determined in step S1702 that the input is not the user's press on the image feed button, the system controller 50 determines in step S1706 whether the operation input is the user's press on the finish button. If it is determined that the operation input is the user's press on the finish button, the process advances to step S1707, in which the system controller 50 finishes the search list creation processing. If the search list is in process of creation, the system controller 50 interrupts the search list creation processing. However, if the creation of the search list has been completed, the system controller 50 performs nothing. Next, in step S1708, the system controller 50 performs termination processing on the calculation of a total number of images. If the processing is in process of calculation, the calculation is interrupted, similarly to the processing in step S1707. If the calculation of a total number of images has been completed, the system controller 50 performs nothing. Then, the reproduction mode is finished. The process advances to step S310 illustrated in FIG. 3.

If it is determined that the operation input is not the user's press on the finish button, the process advances to step S1709, in which the system controller 50 checks whether the calculation of a total number of images, which has been started in step S1506 illustrated in FIG. 15, is completed. If this calculation is not completed, the process returns to step S1701, in which the system controller 50 waits for an operation input. At that time, a message or an icon, which indicates that this calculation is not completed, can be displayed. Thus, an image feeding operation instructed by pressing the image feed button and a finishing operation instructed by pressing the finish button are performed without waiting for completion of the calculation of a total number of images. However, other operation inputs are ignored until the calculation of a total number of images is completed.

In a case where it is determined in step S1709 that the calculation of a total number of images is finished, the process proceeds to step S1710, in which the system controller 50 determines whether a classification information setting menu is selected by an operation of the operation unit 70. If it is determined that the classification information setting menu is selected, the process proceeds to step S1711, in which the system controller 50 performs classification information setting mode processing. The classification setting mode processing will be described below with reference to FIGS. 34A and 34B. If it is determined that the classification information setting menu is not selected in step S1710, the process proceeds to step S1712.

In step S1712, the system controller 50 determines whether the operation input is a user's press on the erasing button included in the operation unit 70. If it is determined that the operation input is a user's press on the erasing button, the process advances to step S1713, in which the system controller 50 erases the image data displayed on the image display section 28. Upon completion of erasing the image data, in step S1714, the system controller 50 checks a total number of the remaining images after erasing the displayed image data. If the total number of the remaining images is 0, the process proceeds to step S1715. The state of the system controller 50 is changed to a state in which the system controller 50 waits for an input in the case of no image data. This processing is as described with reference to FIG. 16.

Conversely, if image data still remains after erasing the displayed image data, the process advances to step S1716, in which the system controller 50 reads the next image data, which is the next object to be displayed, so as to display the next image data. The next image data, which is the next object to be displayed, is assumed to be image data corresponding to a file number next to the file number corresponding to the erased image data. Incidentally, in a case where the latest image data is erased, the next image data, which is the next object to be displayed, is assumed to be image data corresponding to a file number just precedent to the file number corresponding to the erased image data. In step S1717, the system controller 50 performs file analysis processing on the image data read in step S1716 as the object to be displayed. Thus, photographing information and attribute information of the read image data are obtained. The file analysis processing will be described below with reference to FIG. 45. Then, in step S1718, the system controller 50 causes the image display section 28 to display the image data read in step S1716. At that time, the photographing information and the attribute information acquired in step S1717 are also displayed. In a case where it is determined according to the result of the file analysis performed in step S1717 that the file is improper data, e.g., partly collapsed data, an error display indicating this fact is also displayed. Upon completion of this display, the process returns to step S1701, in which the system controller 50 waits for an input.

If it is determined in step S1712 that the input is not the user's press on the erasing button, the process proceeds to step S1719, in which the system controller 50 check whether the search list creation processing started in step S1507 is completed. If the search list creation processing is not completed, the process returns to step S1701, in which the system controller 50 waits for an operation input. At that time, a message or an icon indicating this fact can be displayed, similarly to the case where the calculation of the total number of images is not completed. As a result of the above-described processing, other operation inputs are ignored until the calculation of a total number of images is completed. The above-described processing includes an image feeding operation (corresponding to steps S1702 to S1705), a finishing operation (corresponding to steps S1706 to S1708), a classification information setting mode processing (corresponding to steps S1710 and S1711), and an image erasing operation (corresponding to steps S1712 to S1718).

If it is determined in step S1719 that the creation of the search list is completed, the process advances to step S1720, in which the system controller 50 determines whether the operation input is a jump instruction. If it is determined that the operation input is a jump instruction, the mode of the digital camera 100 is changed to a jump mode in step S1721. Jump mode processing will be described below with reference to FIG. 19.

If the operation input is not a jump instruction, the process advances to step S1722, in which the system controller 50 determines whether the operation input designates a selection operation. If it is determined that the operation input designates a selection operation, the process proceeds to a selection operation in step S1723. Selection operation processing will be described below with reference to FIGS. 36, 37, 38A to 38C, and 39.

If it is determined in step S1722 that the operation input is not a selection operation instruction, the process proceeds to step S1724, in which processing corresponding to one of the other operation inputs is performed. This processing includes, for example, image editing processing, changing of the mode to a multiple reproduction mode, and displaying of a menu using a menu button. The multiple reproduction mode is a reproduction mode in which a plurality of reduced images obtained from image data are displayed by being arranged on a screen of the image display section 28.

Figure 18:
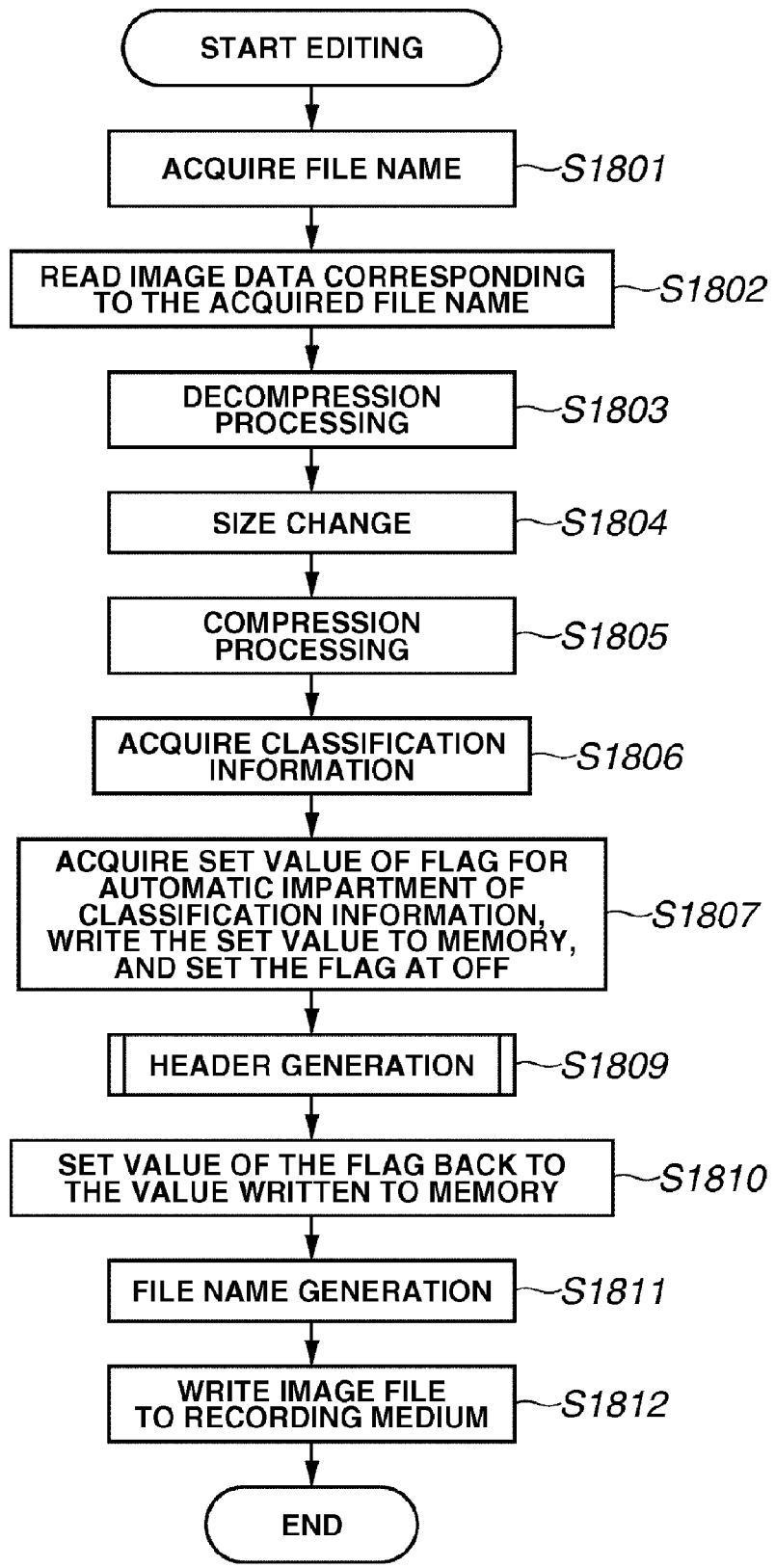
FIG. 18 is a flowchart illustrating editing processing by the digital camera.

Editing processing can be performed on an image file displayed on the image display section 28 as one of types of other processing to be performed in step S1724 illustrated in FIG. 17. The editing processing is described below with reference to FIG. 18. In the following description, a file to be edited is assumed to have a file name "IMG_0002.JPG " (505).

In step S1801, the system controller 50 acquires an image file name "IMG_0002.JPG" of image data which is currently displayed on the image display section 28. Next, in step S1802, the system controller 50 causes the memory 32 to read image data, which corresponds to the acquired file name, from the recording medium 200. In step S1803, the system controller 50 performs decompression processing on the image data read in step S1802 using the compression/decompression unit 16. Then, the system controller 50 causes the memory 32 to store the decompressed image data. Subsequently, in step S1804, the system controller 50 performs expansion/reduction processing on the decompressed image data, using the image processor 24, so as to expand/reduce the size of an image represented by the image data to a desired image size. Then, the system controller 50 causes the memory 32 to store image data representing the image changed in size. Subsequently, the system controller 50 acquires classification information of an original image file read in step S1802. Then, the acquired classification information is stored in the system memory 52. Incidentally, users can set a scaling factor for the expansion/reduction processing using a predetermined menu screen.

Next, in step S1807, the system controller 50 once sets the value of the flag for automatic impartment of classification information, which is stored in the system memory 52, at "OFF". The initially set value of the flag for automatic impartment of classification information is recorded or saved in another region of the system memory 52. Subsequently, in step S1809, the system controller 50 generates a header for the edited image data. More particularly, a header portion of the original image file read by the memory 32 is copied. Then, the header creation processing described with reference to FIG. 8 is performed on a newly generated image file using the copied header portion of the original image file. Because the value of the flag for automatic impartment of classification information is set at "OFF", the automatic impartment of classification information is not performed. Also, because the header portion is created based on a copy of the header portion of the original image file, the classification information of the original image file is carried on into an image file, which is newly generated after edited, without change. Additionally, a region which concerns an image size, and items which concern the date and time of creation, are suitably changed.

After the generation of the header, in step S1810, the system controller 50 causes the value of the flag for automatic impartment of classification information, which has been set once at "OFF", to return to the set value recorded or saved in the system memory 52. Thus, the generation of image data for a newly created image file is completed. Accordingly, the name of the newly created image file is generated. It is assumed that "IMG_0003.JPG" is created as a file name in the present exemplary embodiment. In step S1812, the system controller 50 writes the generated image file to the recording medium 200. Thus, the editing processing is completed.

Thus, even in a case where the editing is performed on an image file to newly generate an image file, the classification information of the image file, which is obtained after the editing, is not changed from the classification information of the original image file before edited. The classification information automatically imparted to the original image data at the photographing of an original image, or the classification information optionally imparted by a user to an original image is carried on into a newly generated image after the original image is edited. Consequently, highly convenient operation can be performed on edited image data in a search of an image.

Jump Mode Processing (S1721) #1: Display of Operation Screen

Next, jump processing in a jump mode is described below. Jump processing is to select specific attribute information and to change image data, which is to be displayed, according to the attribute information serving as a "key". That is, the jump processing is to jump such image data to image data included in the image file having specific attribute information. Practical examples of attribute information serving as a key (hereunder referred to as a "jump key") are a photographing date, classification information, a folder, and a moving image. For example, in the jump processing (hereunder referred to as a date jump) in a case where a photographing date is employed as the jump key, images represented by image data are classified according to the photographing date, such as "Jan. 1, 2006", "Jan. 2, 2006", . . . , into groups respectively corresponding to the photographing dates. Then, every time image feeding is performed by a user, a single image representative of a current one of the groups is displayed. That is, when an image feeding operation is performed, image data to be displayed jumps to image data representing a representative image corresponding to an associated photographing date. The jump key is not limited to the attribute information. For example, the number of images can be employed as the jump key. The image data to be displayed can be jumped to image data representing an image selected "every ten images" or "every hundred images".

Figure 19:
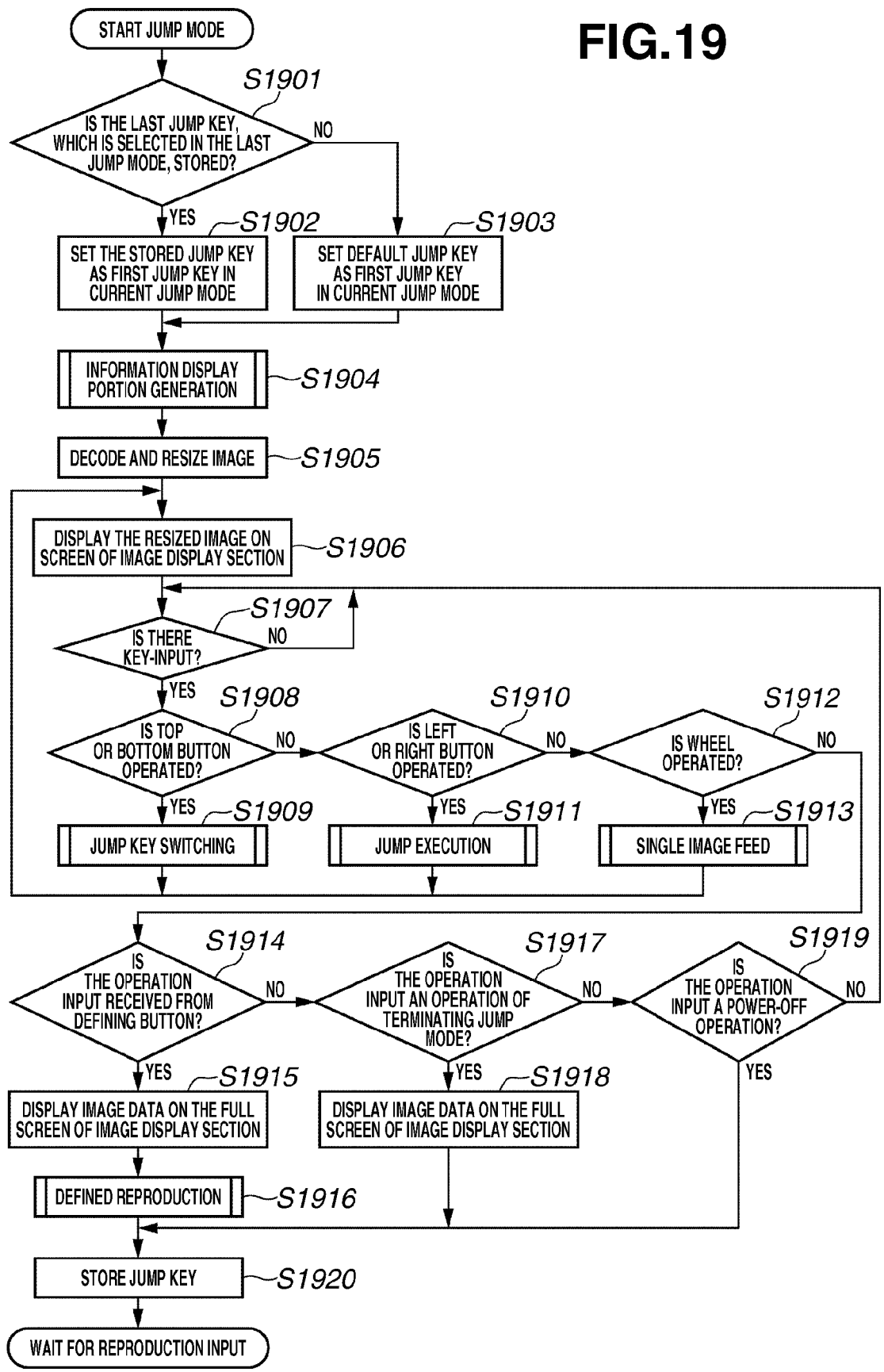
FIG. 19 is a flowchart illustrating processing performed in a jump mode by the digital camera.

Next, a flow of the jump processing is described below. FIG. 19 is a flowchart illustrating processing in step S1721 illustrated in FIG. 17, which is performed by a user who performs an operation of transiting a current mode of the digital camera 100 to a jump mode.

First, in step S1901, the system controller 50 refers to the nonvolatile memory 56 and determines whether the last jump key selected in the last jump mode is stored in the nonvolatile memory 56. The jump key stored in the nonvolatile memory 56 will be described below. If it is determined that such a jump key is stored therein, the system controller 50 sets the jump key as the first jump key in step S1902. Conversely, if it is determined that such a jump key is not stored therein, the system controller 50 sets a default jump key, which is stored in the nonvolatile memory 56, as the first jump key in step S1903.

Figure 24A:
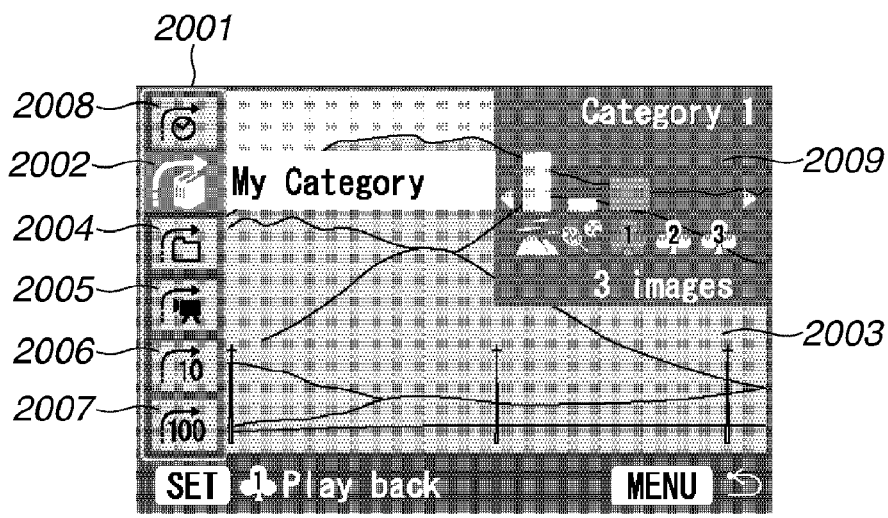
FIG. 24A illustrates a display screen in the jump mode of the digital camera.

FIG. 24A illustrates an example of a screen which is displayed on the image display section 28 when the mode transits to the jump mode. This screen includes an image display area 2003, in which image data to be currently displayed is displayed, and an information display portion 2009, in which information on the groups is displayed. The image display area 2003 and the information display portion 2009 will be described below. The screen includes also a jump key list display area 2001, in which a list of jump keys is displayed. Icons representing various jump keys are displayed in the area 2001. An icon 2008 represents a date jump. An icon 2002 represents jump processing using classification information (hereunder referred to as a classification jump) as a jump key. An icon 2004 represents jump processing using a folder (hereunder referred to as a folder jump), to which an image file belongs, as a jump key. An icon 2005 represents jump processing using a moving image file (hereunder referred to as a moving image jump) as a jump key. An icon 2006 represents that image feeding is performed in units of 10 images. An icon 2007 represents that image feeding is performed in units of 100 images. A cursor is pointed to the icon representing the jump key, which is currently selected, among the jump keys. For example, in FIG. 24A, the icon 2002 is currently selected.

A process performed in steps S1901 through S1903 illustrated in FIG. 19 is a control process for selecting which of the jump keys is put into a selected state just after such a screen is displayed. For example, it is assumed that in a state in which the folder jump is selected in the last jump mode, the processing in the jump mode is finished, or the power supply is turned off. In this case, in step S1902, the system controller 50 controls the cursor so that when starting processing in the jump mode, the cursor is pointed to the icon 2004 representing the folder jump. In contrast, in a case where a jump mode screen illustrated in FIG. 24A is displayed first time, the process proceeds to step S1903, in which the system controller 50 selects, for example, the date jump placed at the top of a jump key list as the default jump key. Then, the system controller 50 controls the cursor so that the cursor is pointed to the icon 2008 representing the date jump in the screen illustrated in FIG. 24A. The default jump key can optionally be determined by a user's operation.

Next, in step S1904, the system controller 50 generates the information display portion 2009 according to the selected jump key. The generation of the information display portion 2009 will be described below. Subsequently, in step S1905, the system controller 50 decodes image data to be displayed, and resizes the image data so that this image data is displayed slightly smaller than the image display section 28. This resizing prevents a part of the display of the image data from being covered with the display of the jump key list 2001 displayed at the left side of the image display section 28, as viewed in FIG. 24A, to be made to be difficult to view. This resizing enables the display of the entire image represented by image data in the screen displayed in FIG. 24A. Consequently, the present exemplary embodiment can provide a screen, which is easy to view, to a user.

Next, in step S1906, the system controller 50 causes the image display section 28 to display the resized image data, the jump key list display 2001, the cursor pointed to the selected jump key, and the information display portion 2009. After finishing the display, in step S1907, the system controller 50 waits for a user's operation.

Information display portion generation processing in step S1904 illustrated in FIG. 19 is described below.

Figure 24B:
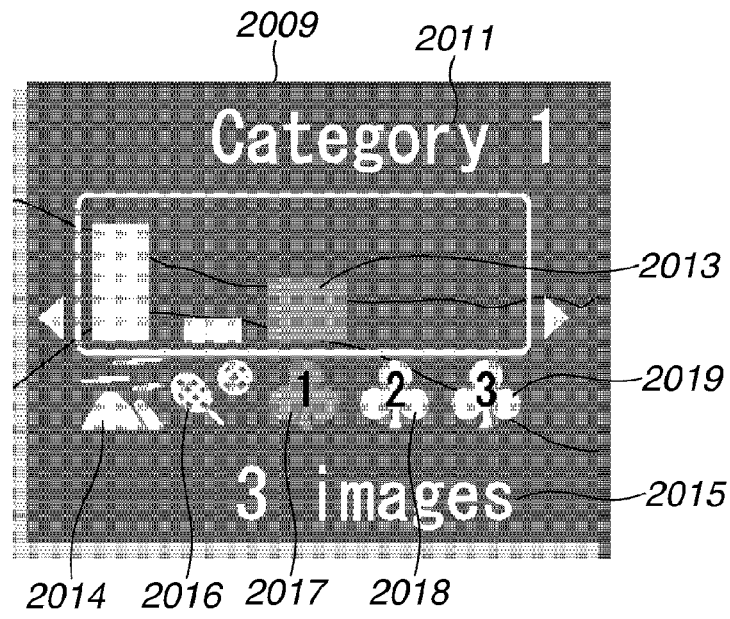
FIG. 24B illustrates a display in an information display portion in the jump mode of the digital camera.

FIG. 24B illustrates the image display portion 2009 illustrated in FIG. 24A. In this case, the classification information corresponding to the icon 2002 is selected as the jump key. Thus, the classification jump is selected and performed.

In the classification jump, image data is classified into groups according to classification information selected as the jump key. That is, the designation of the jump key means that of the classification criterion for classifying the image data into groups. Group icons 2014, 2016, 2017, 2018, and 2019 represent groups, into which the image data are classified, respectively corresponding to five types of the classification information "landscape", "event", "category 1", "category 2", and "category 3". The group icons are not limited to symbols. Dates, numerals, and character strings can be used as the group icons.

An image count bar 2013 has a length representing the number of image files belonging to the group represented by the group icon 2017 illustrated just under the image count bar 2013. That is, the image count bar 2013 is an indicator representing the number of image files having the classification information "category 1". An indication 2015 represents the number of image files with characters. The image count bar 2013 and the indication 2015 can be adapted to represent a total file size of images instead of the number of images. Similar indications are provided corresponding to other groups, respectively. An indication 2015 represents the number of image files belonging to the group represented by the selected group icon. Data represented by the indication is changed according to the selected group icon. The selection of the jump key (or icon) in the jump key list display 2001 is performed by, for example, the top button and the bottom button of the crisscross-arranged four direction buttons. The selection of the group icon is performed by, for example, the left button and the right button of the crisscross-arranged four direction buttons. A display manner of the selected group icon is changed to be able to be distinguished from the icons that are not selected.

The indication 2011 represents the group, to which the image data currently displayed in the image display area 2003 belongs, that is, the classification information of the currently displayed image data. In this case, "Category 1" is indicated. Additionally, highlighting is performed by changing the color of the group icon corresponding to the group, to which the currently displayed image belongs, and changing the width and the color of the image count bar. Consequently, a user can easily recognize which of categories is currently selected. In the case illustrated in FIG. 24B, the group icon 2017 and the image count bar 2013 are highlighted.

To effectively use a screen space, the digital camera 100 can be adapted to display only the group icons respectively corresponding to the selected groups. However, according to the present exemplary embodiment, a list of information on a plurality of groups is displayed at a time in the information display portion 2009. Thus, a graph is displayed in the information display portion 2009 so that abscissas represent the groups, and that ordinates represent the number of pixels. Accordingly, a user can know at a glance how many images belong to each of the groups. Consequently, users' visibility can be enhanced by displaying the state of classification of images into the groups using a graph display.

Next, a flow of practical information display portion generation processing is described below with reference to a flowchart illustrated in FIG. 20.

First, in step S1931, the system controller 50 acquires necessary information to be output to the information display portion 2009 from the attribute information of image data stored in the recording medium 200 according to the selected jump key. Next, in step S1932, the system controller 50 classifies image data into groups according to the selected jump key. Then, the system controller 50 acquires the number of images represented by the image data classified into each of the groups.

Next, in step S1933, the system controller 50 normalizes the number of images classified into each category, utilizing a total number of images recorded on the recording medium 200. Then, the system controller 50 obtains a height used to indicate the number of images of each category with an image count bar in the image display section 28 (i.e., the information display portion 2009). Subsequently, in step S1934, the system controller 50 generates and arranges image count bars respectively corresponding to the groups, which are displayed in the information display portion 2009, according to the height obtained in step S1933. Next, in step S1935, the arranged image count bars are actually displayed in the information display portion 2009 of the image display section 28. Practical display processing in step S1935 will be described below with reference to a flowchart illustrated in FIG. 25.

Next, in step S1936, the system controller 50 determines the groups respectively corresponding to the currently selected jump keys, to which the currently displayed image data on the image display area 2003 belongs, by referring to the attribute information of the currently displayed image data. In a case where the currently displayed image data belongs to one of the groups, then in step S1937, the associated group icon and the associated image count bar are highlighted. Conversely, in a case where the currently displayed image data does not belong to any of the groups, step S1937 is skipped. Then, the information display portion generation processing ends.

Figure 20:
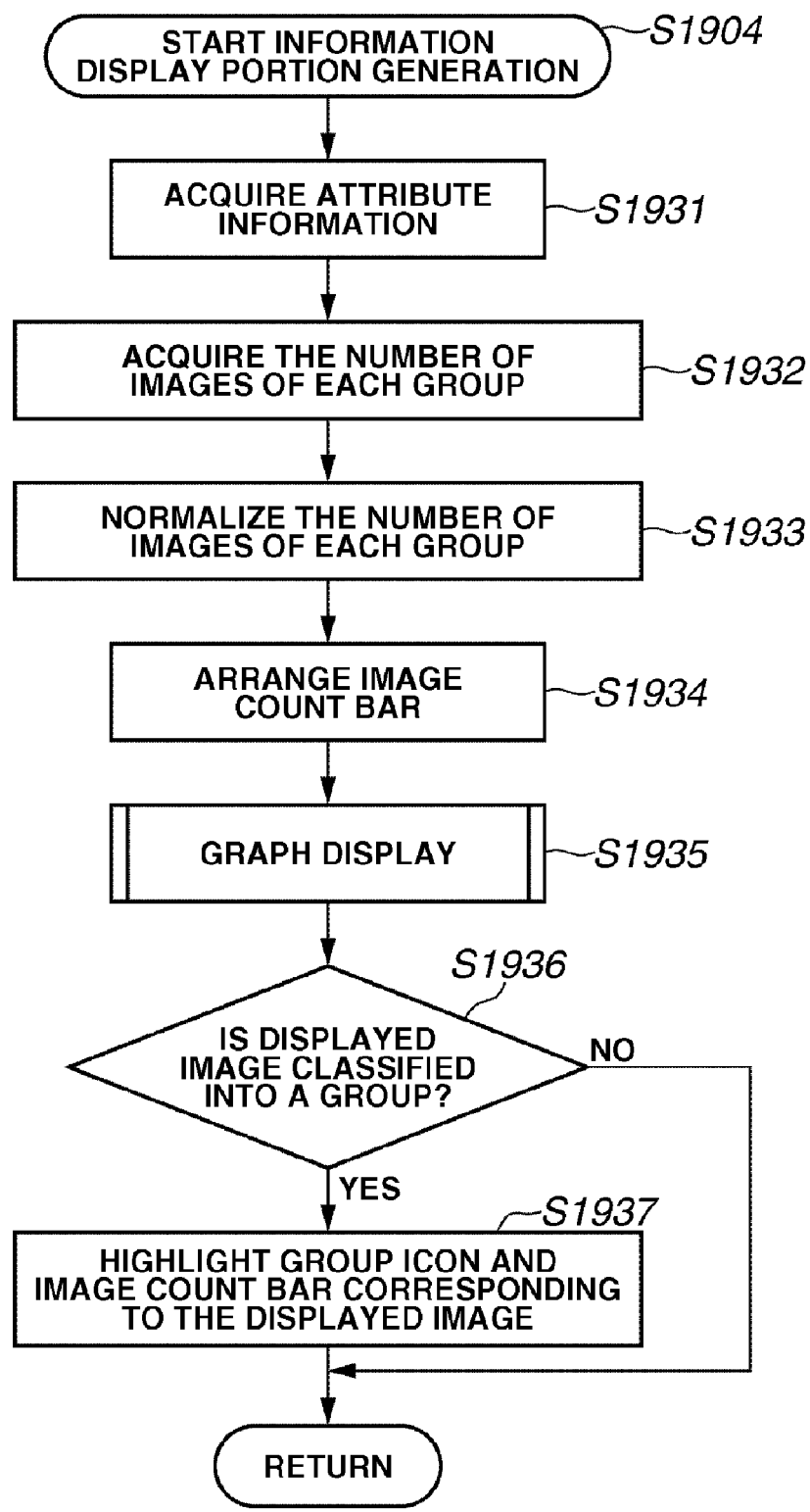
FIG. 20 is a flowchart illustrating information display portion generation processing performed in the jump mode by the digital camera.
Figure 25:
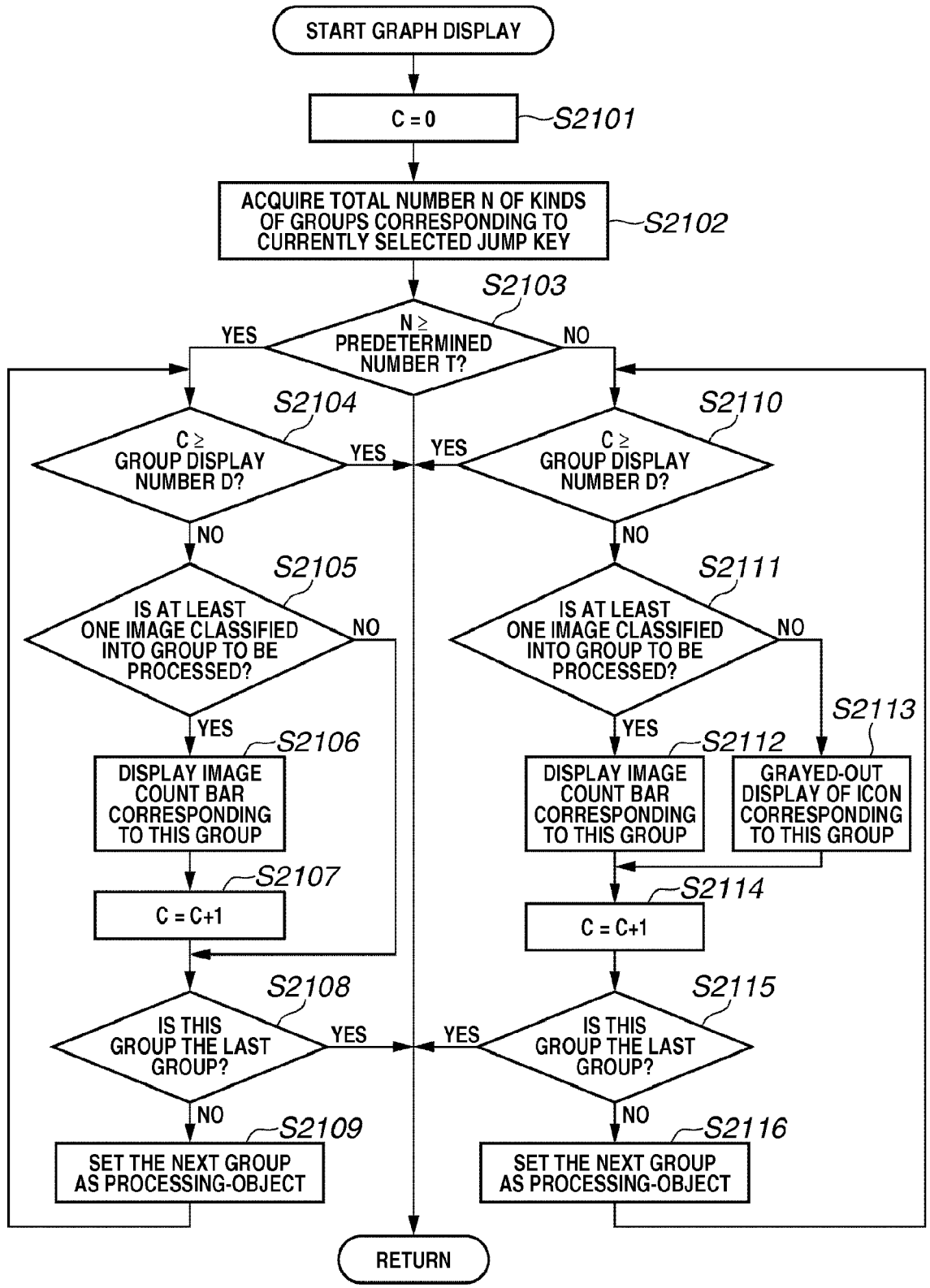
FIG. 25 is a flowchart illustrating graph display processing performed in the jump mode by the digital camera.

The graph display processing in step S1935 illustrated in FIG. 20 is described below in detail with reference to FIG. 25.

First, in step S2101, the system controller 50 initializes a counter C for counting the number of groups displayed in the information display portion 2009. Next, in step S2102, the system controller 50 acquires a total number N of types of groups corresponding to types of the currently selected jump keys. Then, in step S2103, the system controller 50 compares the acquired total number N with a predetermined number T in step S2103.

In a case where the total number N is equal to or greater than the predetermined number T, the displaying of the icons and the image count bars corresponding only to the groups, in each of which images are present, is performed in steps S2104 through S2109. In this case, the groups, to each of which no images belong, are not displayed at all. Conversely, in a case where the total number N is less than the predetermined number T, the displaying of the icons and the image count bars corresponding to all the groups is performed, regardless of the presence of images belonging thereto, in steps S2110 through S2114. The icons corresponding to the groups, in each of which no images are present, are displayed while being grayed out.

In step S2104, the system controller 50 determines whether the number of groups (i.e., the value of the counter C) displayed in the information display portion 2009 is equal to or greater than the number of displayable groups D (i.e., the number of groups that can be displayed at a time in the information display portion 2009). If the number of groups displayed in the information display portion 2009 does not reach the number of displayable groups D, the process proceeds to step S2105, in which the system controller 50 determines whether one or more images are classified into the group to be processed. In a case where it is determined that one or more images are classified into the group to be processed, the system controller 50 displays the icon and the image count bars corresponding to the group in the information display portion 2009 in step S2106. Then, in step S2107, the system controller 50 increments the counter C representing the number of groups displayed in the information display portion 2009. In step S2108, the system controller 50 determines whether the current group is the last one. If not the last group, the process proceeds to step S2109, in which the system controller 50 sets the next group as a processing object. Then, the process returns to step S2104. If it is determined in step S2104 whether the number of the groups displayed in the information display portion 2009 (i.e., the value of the counter C) is equal to or greater than the predetermined group display number D, or in a case where it is determined in step S2108 that the current group is the last group, the process ends.

Figure 26A:
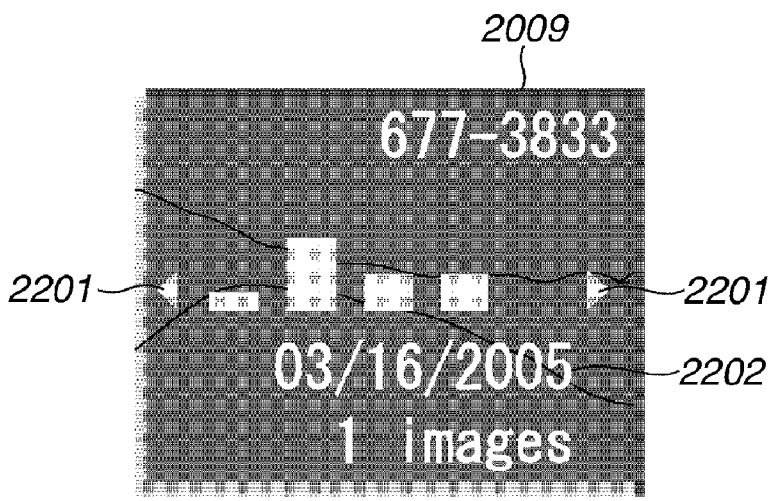
FIG. 26A illustrates a graph display example in the information display portion.
Figure 26B:
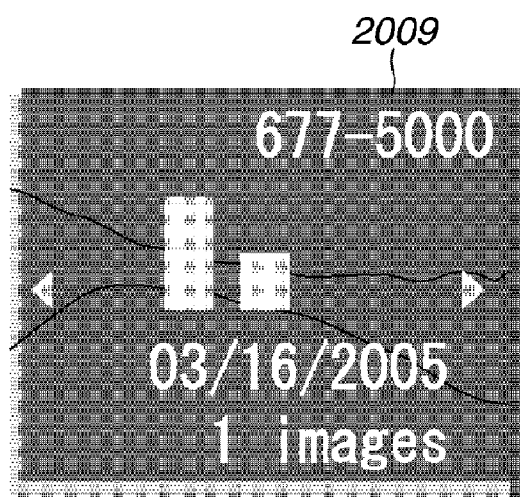
FIG. 26B illustrates another graph display example in the information display portion.

Thus, as illustrated in FIG. 26A, the groups of the group display number D are displayed by the above-described processing. The group display number is the number of groups that can be displayed at a time in the information display portion 2009. For example, in a case where an example of display in the information display portion 2009 illustrated in FIG. 26A, the group display number D is 5. In the example illustrated in FIG. 26A, only the group icon 2202 ("Mar. 16, 2005") corresponding to the selected group is displayed. At that time, in a case where the group display number D is greater than the number of groups, into which images are classified, the displayable groups (in this case, only five groups) are displayed. Other groups, which are not displayed therein, can be displayed by a user's selection of a mark 2201 via the operation unit 70. Conversely, in a case where the numbers of the groups, into each of which images are classified, is less than the group display number D, all the groups are displayed in the information display portion 2009, as illustrated in FIG. 26B.

Figure 26C:
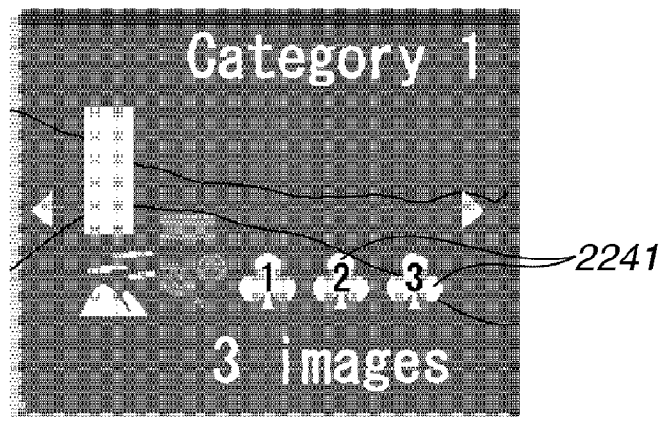
FIG. 26C illustrates yet another graph display example in the information display portion.

A process is described below which is performed in a case where it is determined in step S2103 that the acquired total number N of types of groups is less than the predetermined number T. In this case, processing in steps S2110 through S2116 is performed. Processing in steps S2110 through S2112, and processing in steps S2114 through S2116 are similar to that in steps S2104 through S2109. The process including steps S2110 through S2116 differs from that including steps S2104 through S2109 in treatment (in step S2113) of the groups, into which no images are classified. That is, in a case where it is determined in step S2111 that no images are classified into the current group, the group icon corresponding to this group is displayed while being grayed out. FIG. 26C illustrates a practical example of graying-out processing. That is, the graying-out of the current group is performed as a group icon 2241 to indicate that no images are classified into the current group. Conversely, the image count bar corresponding to the group, into which at least one image is classified, is displayed instep S2112. Also, the group icon corresponding to this group is displayed in a usual display manner. The increment of the counter C in step S2114 is performed after one of processing in step S2112 and processing in step S2113 is performed. Thus, both of the groups, into each of which at least one image is classified, and the groups, into which no images are classified, that is, a total number D of groups are displayed.

Thus, display modes of the group icons are changed according to the number of groups respectively corresponding to types of jump keys and to the number of image files classified into each of the groups. The processing enables a user to know the groups, into each of which no images are classified, at a sight. According to the above-described process, in a case where the number of groups is equal to or greater than a predetermined constant (T), the group icons corresponding to the groups, into each of which no images are classified, are not displayed. Thus, in a case where the number of groups is large, a user can check and select only the groups, into each of which one or more image files are classified, by pressing the left button or the right button. Consequently, too many groups are prevented from being displayed. Accordingly, operability can be enhanced.

The determination in step S2103 can be performed on one of the following conditions (i) to (iv).

(i) The determination is made according to whether the currently selected jump key is of the type that all image files necessarily belong to some of the groups. For example, attribute information representing a photographing date is usually included in each of image files. In the case of the date jump using this photographing date information, the group icon corresponding to the group, into which no image files are classified, are not displayed. In contrast, classification information is not necessarily included by each of all image files. In the case of the classification jump using the classification information, the group icon corresponding to the group, into which no image files are classified, is displayed while being grayed out.

(ii) The determination is made according to whether the currently selected jump key is of the type that image files are classified according to the photographing condition. For example, the photographing date is the attribute information representing a type of the photographing condition. In the case of the date jump using the photographing date information, the group icon corresponding to the group, into which no image files are classified, is not displayed. In contrast, information concerning a folder does not relate to the photographing condition. Accordingly, in the case of the folder jump using the classification information, the group icon corresponding to the group, into which no image files are classified, is displayed while being grayed out.

(iii) The determination is made according to whether the currently selected jump key is of the type that image files are classified according to ex-post additional parameter. For example, the photographing date is the attribute information which cannot be changed later. In the case of the date jump using the photographing date, the group icon corresponding to the group, into which no image files are classified, is not displayed. In contrast, classification information is attribute information that can be added later by a user's operation. Thus, in the case of the classification jump using classification information, the group icon corresponding to the group, into which no image files are classified, is displayed while being grayed out. In a case where the attribute information can be added later, classification information having been added to no images may be used later. Therefore, it is useful to display all the groups, that is, the classification information.

(iv) The determination is made according to whether the currently selected jump key is attribute information adapted so that a plurality of parameters can be added to one associated image file. For example, the photographing date is not the attribute information adapted so that two dates can be added to one associated image file. In the case of the date jump using the photographing date information, the group icon corresponding to the group, into which no image files are classified, is not displayed. In contrast, two types of classification information can be added to one image file. Thus, in the case of the classification jump using such classification information, the group icon corresponding to the group, into which no image files are classified, is displayed while being grayed out.

Figure 24C:
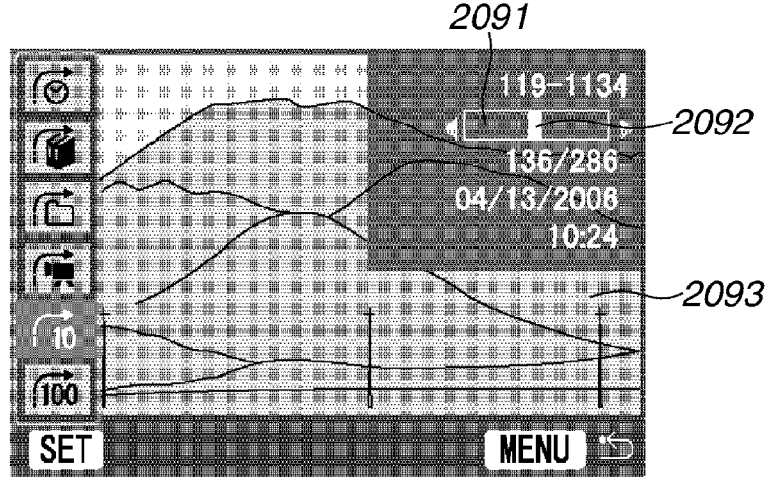
FIG. 24C illustrates another display in the information display portion in the jump mode of the digital camera.

Although the number of images in each of the groups is indicated by the image count bar in the example displayed in the information display portion 2009, the indicator according to the present embodiment is not limited to the image count bar. For example, a position bar can be used instead of the image count bar. The position bar is a bar indicating a position of a currently displayed image in a whole image area. FIG. 24C illustrates an example of a position bar display. In the case of the position bar 2091, the entire bar indicates the number of all images. A point 2092 indicates the position of the currently displayed image 2093. This display mode is effective in a case where the jump key does not jump corresponding to each type of classification information, for example, in the case of the moving image jump, and in the case where an image to be displayed jumps every image feeding in units of 10 images, that is, the image to be displayed jumps every feeding of 10 images. Additionally, in a case where the image to be displayed jumps from a set of continuous images to an image corresponding to a given point, the position bar display can enhance visibility more than the image count bar display.

A histogram display and a position bar display can be switched by automatically selecting the image count bar or the position bar according to the jump key.

Referring back to the flowchart illustrated in FIG. 19, a case in which a user's operation is detected in step S1907 is described below.

When a user's operation input occurs, the process proceeds from step S1907 to step S1908, in which the system controller 50 determines which of the top button and the bottom button the key operated by the user for the operation input is. If it is determined that one of the top button and the bottom button is operated by the user, the process proceeds from step S1908 to step S1909, in which the cursor to be pointed to one of the jump keys in the jump key list display 2001 is moved upwardly or downwardly. That is, a user can change the jump key to a desired one by operating the top button and the bottom button.

Figure 21:
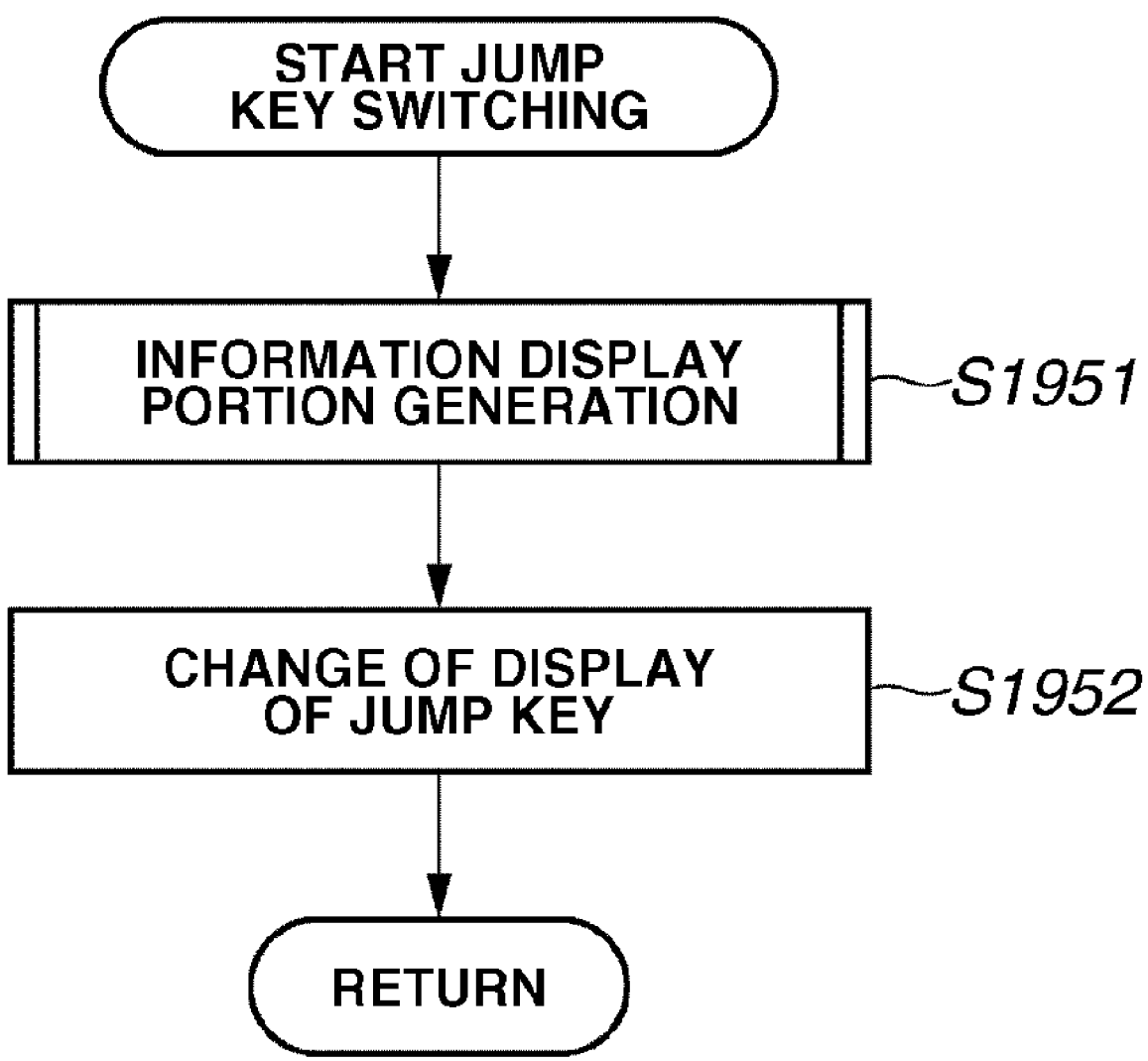
FIG. 21 is a flowchart illustrating jump mode switching processing performed in the jump mode by the digital camera.

Jump key switching processing in step S1909 is described below with reference to the flowchart illustrated in FIG. 21.

First, in step S1951, the system controller 50 generates the information display portion 2009 again according to the jump key selected by a user's press on the top or bottom button. This is because of the fact that when the jump key is changed, data to be displayed (e.g., data representing the configuration of groups) is changed, so that it is necessary to generate the graph display again. Next, in step S1952, the system controller 50 performs cursor movement processing in the jump key list display 2001. When the top button is pressed, the jump key is moved to that corresponding to the next higher icon in the jump key list display 2001. When the bottom button is pressed, the cursor is moved to the next lower icon in the jump key list display 2001. Then, the jump mode switching processing ends.

Referring back to FIG. 19 again, a case in which the operation input detected in step S1907 is a user's press on the left button or the right button is described below. In this case, the process proceeds from step S1910 to step S1911.

In step S1911, the system controller 50 performs group changing processing in response to the user's press on the left button and the right button as the operation input. For example, when the right button is pressed in a state in which "category 1" 2017 is selected, as illustrated in FIG. 24B, information displayed in the image display area 2003 illustrated in FIG. 24A is changed to information represented by the image file having classification information representing the "category 2" 2018. Similarly, when the left button is pressed, information displayed in the image display area 2003 is changed to information represented by the image file having classification information representing the "event" 2016. That is, a user can change an object, which is to be displayed, to a desired group by operating the left button and the right button. Thus, the jump processing can be performed.

Figure 22:
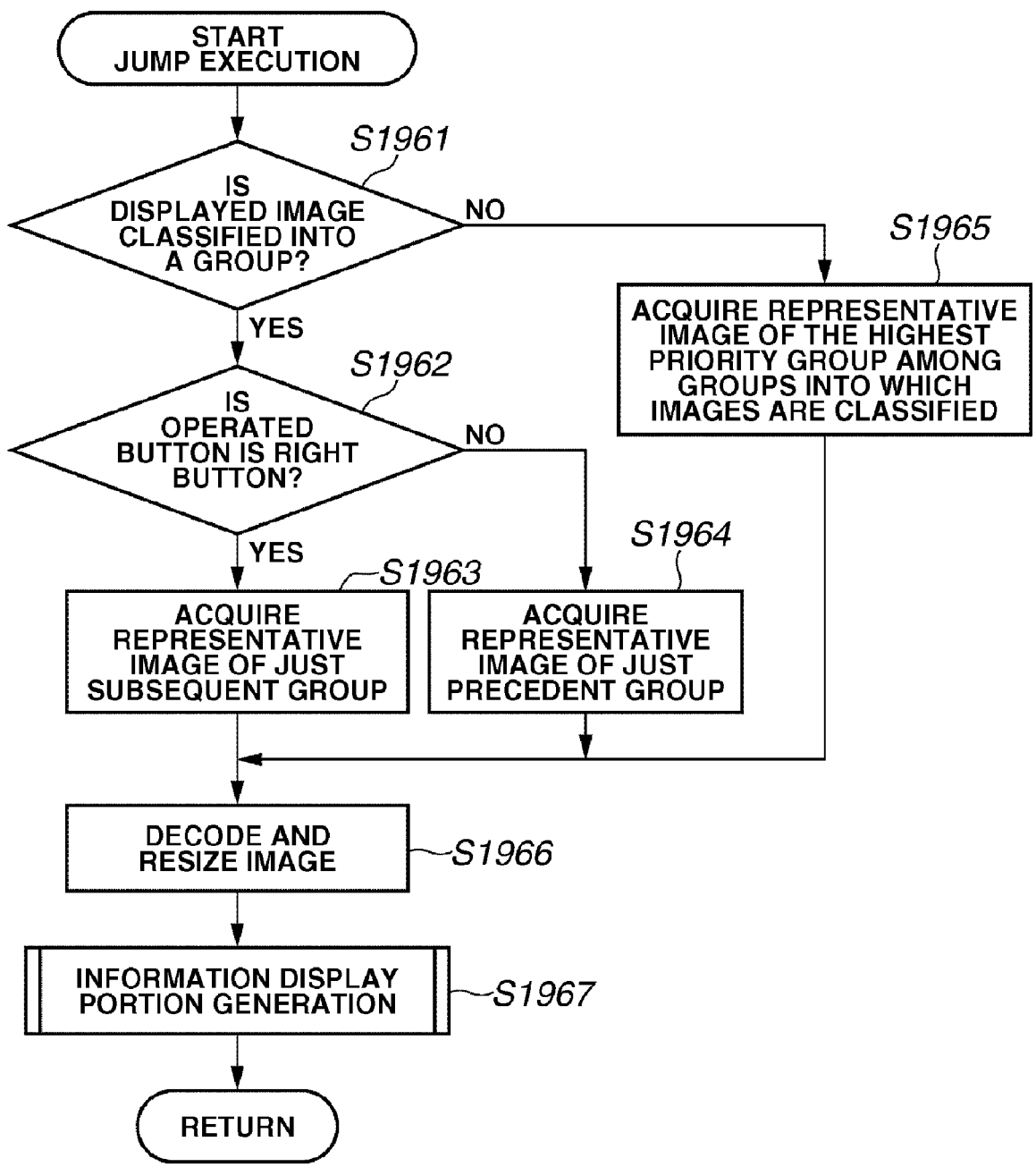
FIG. 22 is a flowchart illustrating jump execution processing performed in the jump mode by the digital camera.

The jump processing to be performed in step S1911 with changing the group is described below. FIG. 22 is a flowchart illustrating the jump processing performed in step S1911.

In step S1961, the system controller 50 determines whether the image data currently displayed in the image display area 2003 is classified into one of the groups according to the selected jump key. For example, the classification information is not necessarily imparted to all of image data. Accordingly, the system controller 50 determines the presence of such image data in this step. If it is determined that such image data is classified into one of the groups, the system controller 50 determines in step S1962 whether the operated button is the right button.

In a case where the operated button is the right button, the process advances to step S1963, in which the system controller 50 acquires representative image data from image data belonging to the group displayed the next right to the group, to which the cursor is currently pointed in the information display portion 2009. For example, when the cursor is currently pointed to the "category 1" 2017, as illustrated in FIG. 24B, representative image data can be acquired from image data belonging to the group corresponding to "category 2" 2018.

In the present exemplary embodiment, the image data representative of the group is assumed to be image data having the youngest identification (ID). A file name is used as ID. As described above with reference to FIG. 9, a file name is in a format "XXXXyyyy.JPG" in the present exemplary embodiment. Numerical values ranging from "0001" to "9999" are used as the file number "yyyy". The youngest ID is a file name having a lowest numerical value indicated by the file number "yyyy". Apparently, the youngest ID can be set as a leading file name in a case where file names are arranged in an ascending or descending order.

Conversely, if it is not determined that the operated button is the right button, it is determined that the left button is pressed. Accordingly, the process proceeds from step S1962 to step S1964, in which the system controller 50 acquires image data representative of the group displayed the next leftward to the group, to which the cursor is currently pointed in the information display portion 2009, from the image data corresponding to the former group. For example, as illustrated in FIG. 24B, in a case where the cursor is currently pointed to the group corresponding to "category 1" 2017, the system controller 50 acquires representative image data from the image data belonging to the group corresponding to "event" 2017. The image data representative of a group is assumed to be image data having the lowest ID among image data belonging to the group.

If it is determined in step S1961 that the image data currently displayed in the image display area 2003 does not belong to any group, the process proceeds to step S1965, in which the system controller 50 acquires image data having the oldest ID among image data belonging to the highest priority group among groups, into which images are classified, corresponding to the selected jump key.

In step S1966, the system controller 50 decodes and resizes image data acquired in one of steps S1963, S1964, and S1965. Then, in step S1967, the system controller 50 generates the information display portion 2009 again. Then, the jump processing ends. The generation of the information display portion 2009 has been described with reference to FIG. 20. Therefore, the description of the generation of the information display portion 2009 will not be repeated.

Thus, when the processing in step S1911 is finished, the process returns to step S1906, in which the system controller 50 causes the image display section 28 to display an image resized in step S1967. Then, the information displayed in the image display area 2003 is updated to an image corresponding to the selected group. Thus, according to an input from the top button and the bottom button or from the left button and the right button detected in step S1907, the jump key switching processing in step S1909 or the jump processing in step S1911 is performed. Then, upon completion of such processing, an image is displayed again in the image display section 28 in step 1906. Subsequently, the system controller 50 waits for a user's operation input again in step S1907.

Figure 23:
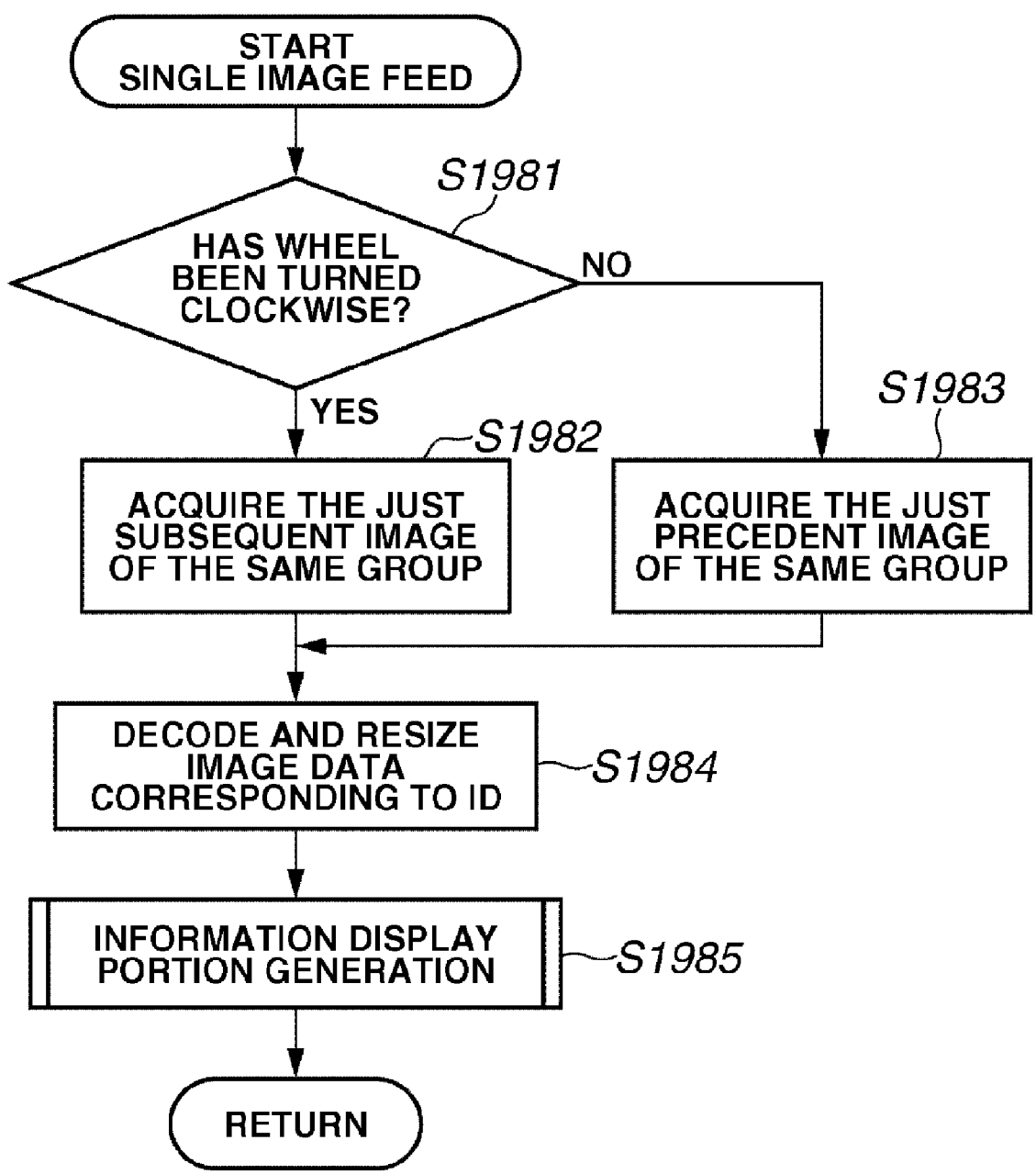
FIG. 23 is a flowchart illustrating single image feed processing performed in the jump mode by the digital camera.

Referring back to the flowchart illustrated in FIG. 19, in a case where an operation input detected in step S1907 is input by operating the wheel 73, the process proceeds from step S1912 to step S1913, in which the system controller 50 performs single image feeding processing. The single image feeding processing is described below with reference to a flowchart illustrated in FIG. 23.

First, in step S1981, the system controller 50 determines whether the wheel 73 is turned clockwise (or rightwardly), as viewed from a user. If the wheel 73 is turned clockwise, the system controller 50 searches for image data having an ID younger than the ID of the currently displayed image data in the group, to which the cursor is currently pointed, and acquires the ID of the searched image data. As described above, in the present exemplary embodiment, a file name corresponding to the searched image data is used as ID. Then, in step S1982, in a case where files of the group are arranged in an ascending or descending order of the file number, image data having a file name the next to the file name of the currently displayed image data is searched for. As described above with reference to FIG. 9, the file number is incremented by one in the generation of the file name. Thus, image data having a larger file number is generated temporally later. Therefore, in the present exemplary embodiment, the larger the file number of image data, the younger the ID of the file.

Conversely, it is determined that the wheel 73 is not turned clockwise, that is, the wheel 73 is turned counterclockwise (or anticlockwise), the process proceeds from step S1981 to step S1983, in which the system controller 50 searches for image data having the next younger ID than the ID of the currently displayed image data in the group to which the cursor is currently pointed. Then, the system controller 50 acquires the ID of the searched image data. That is, in a case where files of this group are arranged in order of the file number, the system controller 50 searches for image data having a file name which is the next antecedent to the file name of the currently displayed image data.

Although the order of the IDs (or file names) is determined using the file number in the above-described case, the file names can be arranged in an ascending or descending order of the entire file name.

Next, in step S1984, the system controller 50 decodes and resizes image data corresponding to the ID acquired in step S1982 or in step S1983. Subsequently, in step S1985, the system controller 50 generates the information display portion 2009 again. Then, the system controller 50 ends the single image feeding processing.

In a case where the jump key is a moving image, that is, where an icon 2005 representing the moving image jump is selected, a user can operate the wheel 3 to feed moving image data currently displayed in units of frames.

Referring back to FIG. 19, in a case where the operation input detected in step S1907 is an operation (i.e., a user's press on a defining button) for defined display, the process proceeds from step S1914 to step S1915.

In step S1915, the system controller 50 displays or resizes image data currently displayed in the image display area 2003 so that the image data is displayed on the entire image display section 28. Then, in step S1916, the system controller 50 performs processing in a defined reproduction mode. When a specific group is designated in the defined reproduction mode, image data can be reproduced in a state in which the image data is defined according to the group. The defined reproduction processing is described below with reference to FIG. 27.

Figure 27:
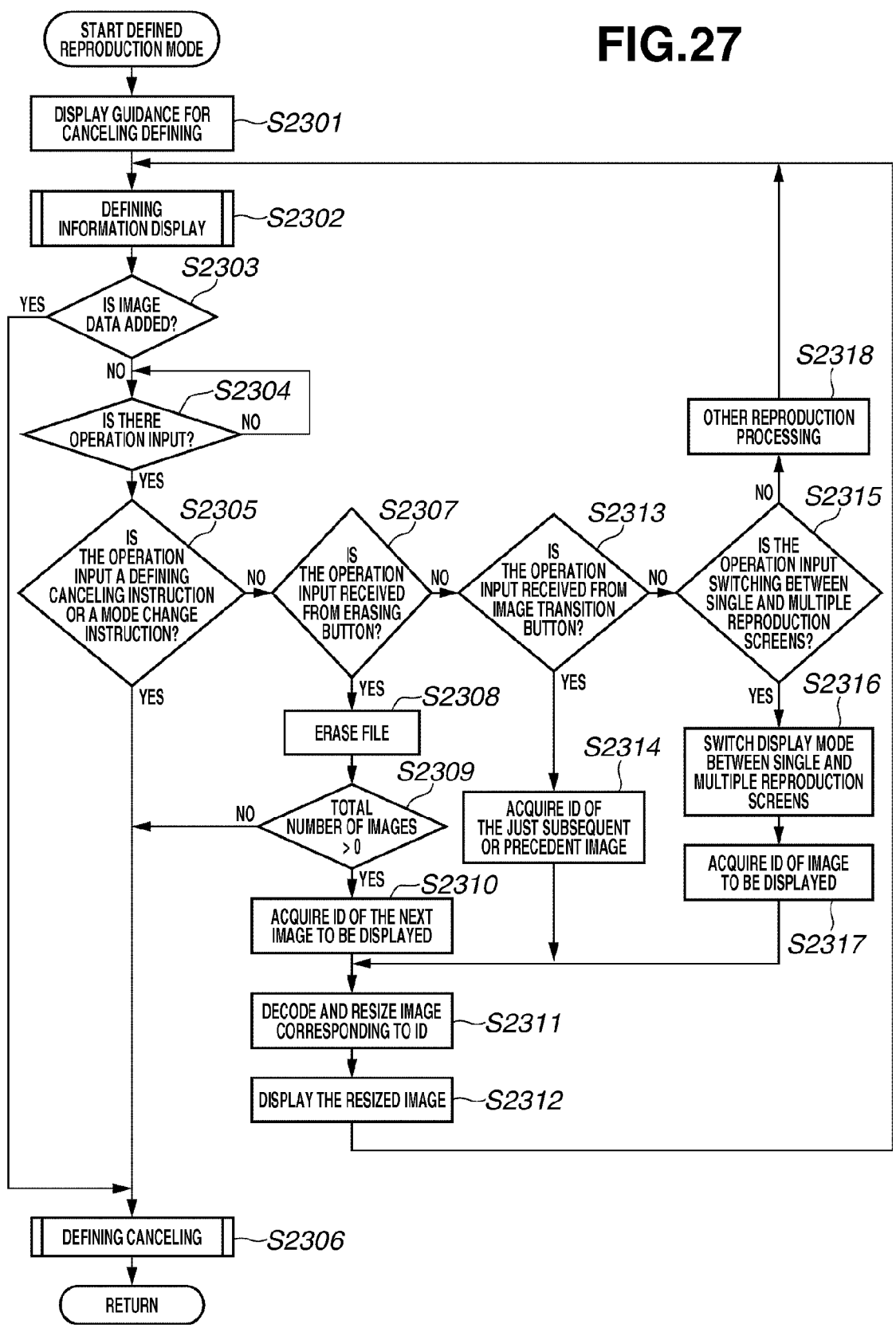
FIG. 27 is a flowchart illustrating defined reproduction mode processing by the digital camera.

In the defined reproduction mode, among image data recorded on the recording medium 200, only image data classified into given classification information, that is, image data belonging to a given group is set to image data to be reproduced. Then, erasing, protection, image rotation, and multiple image display, which are similar to operations in a normal reproduction mode, can be performed on the image to be reproduced. As described above, the classification information includes person, landscape, event, category 1, category 2, category 3, and work. The defined reproduction mode processing is described below with reference to FIG. 27. FIG. 27 is a flowchart illustrating processing in step S1916 of FIG. 19 in detail.

Figure 33A:
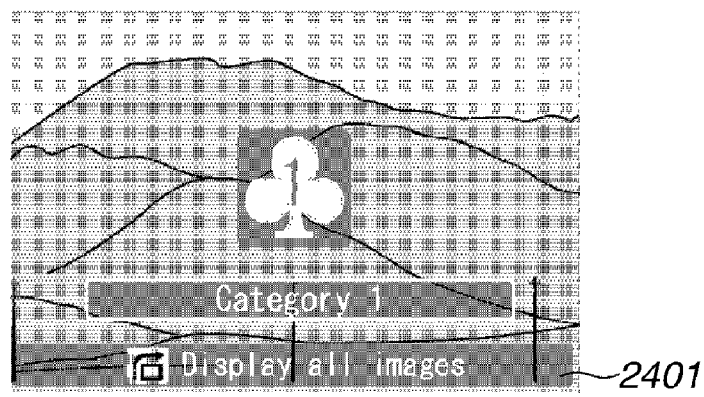
FIG. 33A illustrates an example of a screen display at the time of transition to a defined reproduction mode of a digital camera 100.

When entering the defined reproduction mode, in step S2301, the system controller 50 displays, on a screen of the image display section 28, a guidance, such as that 2401 illustrated in FIG. 33A, which indicates a method for exiting from the defined reproduction mode. This guidance indicates that the mode can be returned to a full image reproduction mode by operating predetermined operating members, for example, the top button of the operation unit 70.

Next, in step S2302, the system controller 50 performs defining information displaying processing to display an icon representing a defined state. The defining information display processing will be described in detail with reference to FIG. 29.

Next, in step S2303, the system controller 50 determines whether image data is newly added to the recording medium 200. In a case where image data is added to the recording medium 200, the process proceeds to step S2303, in which the system controller 50 performs defining canceling. The defining canceling will be described below with reference to FIG. 28. Addition of image data occurs in the present exemplary embodiment in a case where, after color editing processing and partial expansion processing are performed on an image which is in process of defined reproduction, the edited image is newly stored, or where a new image is captured while a defined state is maintained.

If addition of image data is not detected in step S2303, the process advances to step S2304. In step S2304, the digital camera 100 changes into a state in which the system controller 50 waits for a user's operation input.

In a case where a user's operation input is detected and the operation input is an instruction to cancel a defined reproduction or to change a mode, the process proceeds from step S2305 to step S2306, in which defining canceling is performed. In a case where an operation for setting classification information is performed in the defined reproduction state, this operation is determined as an instruction to cancel the defined reproduction. An instruction to cancel defining may be issued by pressing the same button for causing the digital camera 100 to enter a defining jump mode. Mode change is caused in a case where a request for changing the digital camera 100 into a scene mode to exit from a reproduction mode occurs, and where a request for changing the digital camera 100 into an image classification information setting mode occurs. At that time, regarding an operation of causing the digital camera 100 to exit to a reproduction mode, it can be preliminarily set to automatically cancel defining.

Conversely, in a case where the operation input detected in step S2304 is an erasing instruction (or erasing button), the process proceeds from step S2307 to step S2308, in which the system controller 50 erases an image file including image data currently displayed on the image display section 28. In step S2309, the system controller 50 determines whether an image is present in a currently defined group. If there is no image data remaining in the group, the process proceeds to step S2306, in which the system controller 50 performs defining canceling. If image data remains in the group, the process advances to step S2310, in which the system controller 50 acquires an ID of the next image data to be displayed. Then, in step S2311, the system controller 50 decodes and resizes the image data. In step S2312, the system controller 50 causes the image display section 28 to display the resized image. Subsequently, the process returns to step S2302, in which the system controller 50 performs defining information display processing.

In a case where the operation input detected in step S2304 is an instruction for image transition (in the present exemplary embodiment, a user's press on the left or right button), the process proceeds from step S2313 to step S2314. In step S2314, the system controller 50 acquires, in a case where the pressed button is the left button, an ID of image data which has classification information used for defining and which is just the next antecedent to the image data currently displayed. The system controller 50 acquires, in a case where the pressed button is the right button, an ID of image data which has classification information used for defining and which is just the next subsequent to the image data currently displayed. After acquiring an ID of the image data, the system controller 50 decodes and resizes the image data in step S2311. Then, in step S2312, the system controller 50 causes the image display section 28 to display the resized image data. Subsequently, the process returns to step S2302, in which the defining information processing is performed.

In a case where the operation input detected in step S2304 is an instruction to switch between single and multiple screens, the process proceeds from step S2315 to step S2316, in which the system controller 50 changes a display mode so that when a current display screen in the image display section 28 is a single reproduction screen, the single reproduction screen is changed to a multiple reproduction screen, and that when a current display screen in the image display section 28 is a multiple reproduction screen, the multiple reproduction screen is changed to a single reproduction screen. Then, in step S2317, the system controller acquires an ID of the image to be displayed on the image display section 28. Subsequently, in step S2311, the system controller 50 decodes and resizes the image data corresponding to the ID acquired in step S2317. Then, in step S2312, the image data processed in step S2311 is displayed on the image display section 28. Subsequently, the process returns to step S2302, in which defining image display processing is performed.

In a case where the operation input detected in step S2304 does not correspond to any of the above-described data, the system controller 50 performs other defined reproduction processing according to the operation input in step S2318. Upon completion of the processing, the process returns to step S2302, in which defining image display processing is performed.

Additionally, even in the defined reproduction, various operations can be performed. For example, according to classification information other than classification information currently defined, processing accompanied by defining can be performed. In this case, a current defined reproduction mode is automatically canceled. A user can be prevented by the cancellation from being confused about attribute information according to which classification information is defined. The system controller 50 can be adapted so that in a case where the processing accompanied by defining is not intended to perform image reproduction and is, for example, protection and erasing of image files, the current image reproduction is maintained, and that in a case where the processing accompanied by defining is intended to perform image reproduction and is, for example, a slide show, the defined reproduction is canceled.

An exemplary case in which an instruction to perform a slide show in the defined reproduction mode is described below. A user presses the menu button and selects the execution of a slide show from the menu so as to issue an instruction to perform a slide show in the defined reproduction mode.

Figure 30:
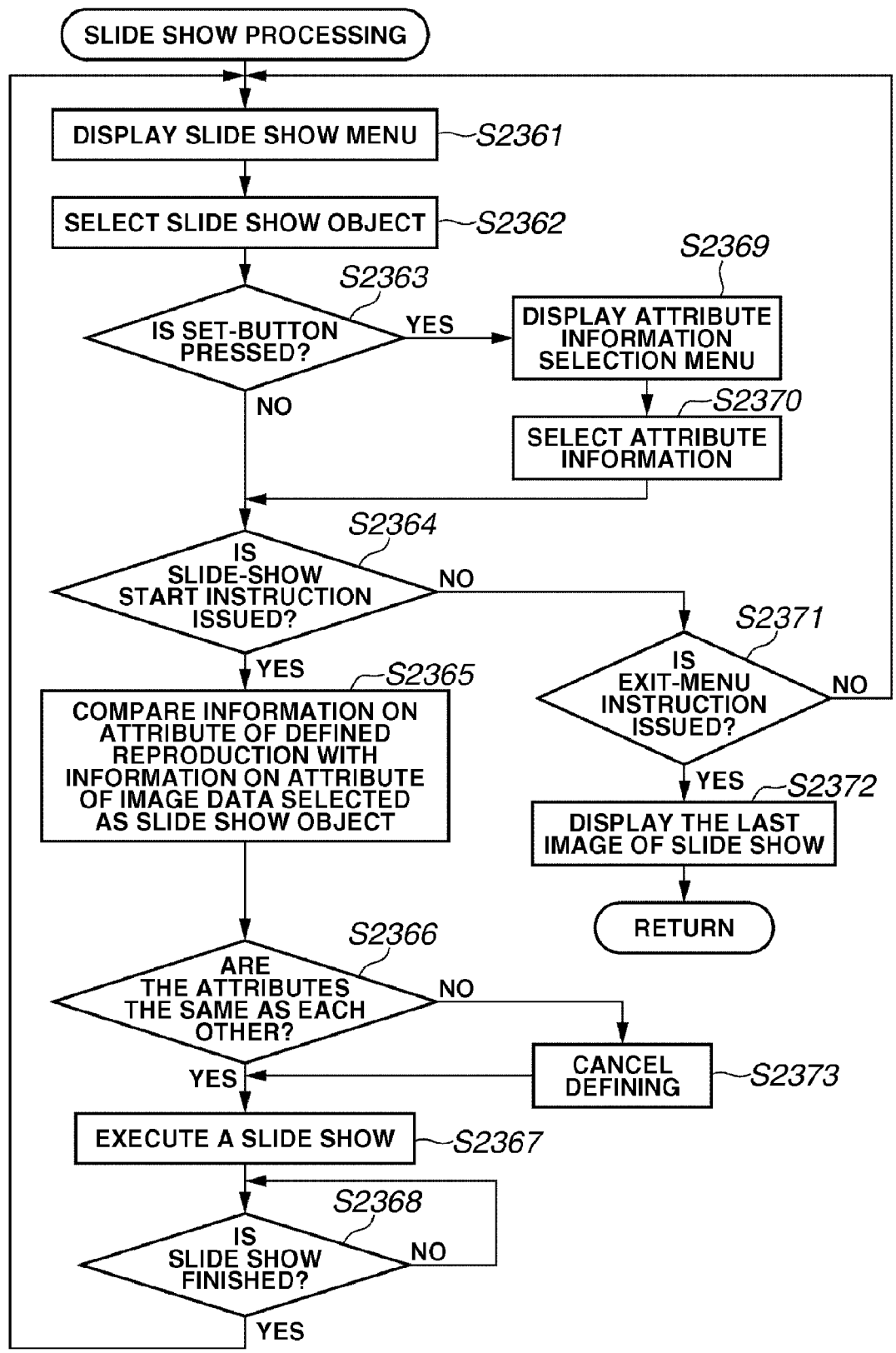
FIG. 30 is a flowchart illustrating slide show processing performed in the reproduction mode by the digital camera.
Figure 31:
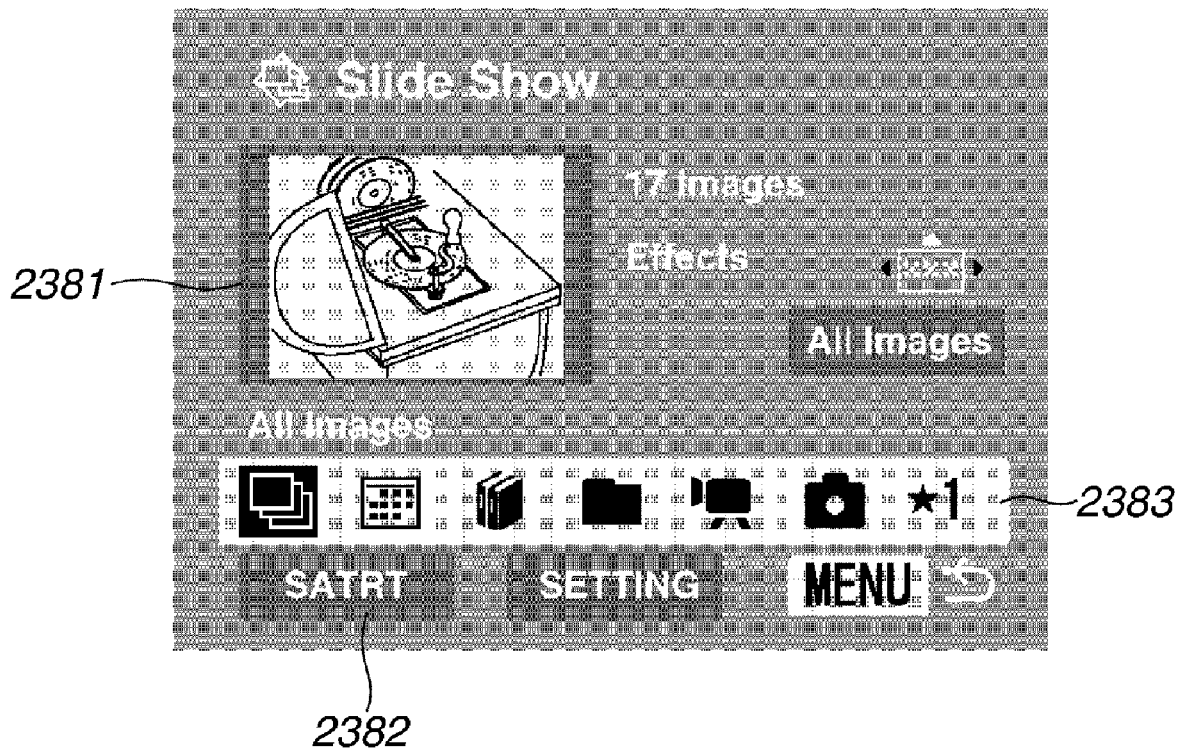
FIG. 31 illustrates an example of a slide show menu screen in the slide show processing.

FIG. 30 is a flowchart of a process performed in a case where an instruction to perform a slide show is issued in the defined reproduction mode. First, in step S2361, the system controller 50 causes the image display section 28 to display a slide show menu. The slide show menu is displayed so as to allow a user to select an object on which a slide show is performed. FIG. 31 illustrates an example of the slide show menu. First image data, the slide show of which is performed, is displayed in an area 2381.

In step S2362, the system controller 50 selects an object, the slide show of which is performed. In the present exemplary embodiment, images, which are slide-show objects, can be selected in specific units. As illustrated in FIG. 31, the slide-show objects are indicated by icons 2383. A user selects a desired one of these icons by operating the left button and the right button. In response to the user's operation, the system controller 50 selects a slide-show object. Examples of the slide-show object are image data photographed at specific date and time, image data including specific classification information, moving-image data, and still-image data. According to the present exemplary embodiment, in a case where a slide show is performed in the defined reproduction mode, the icon 2383 corresponding to the attribute information used for defining is selected. For example, in a case where the slide show menu is displayed during the defined reproduction performed on a specific folder, an icon indicating the folder is first selected among the icons 2383. Similarly, this is also performed in the selection of the attribute information in step S2370.

Figure 32:
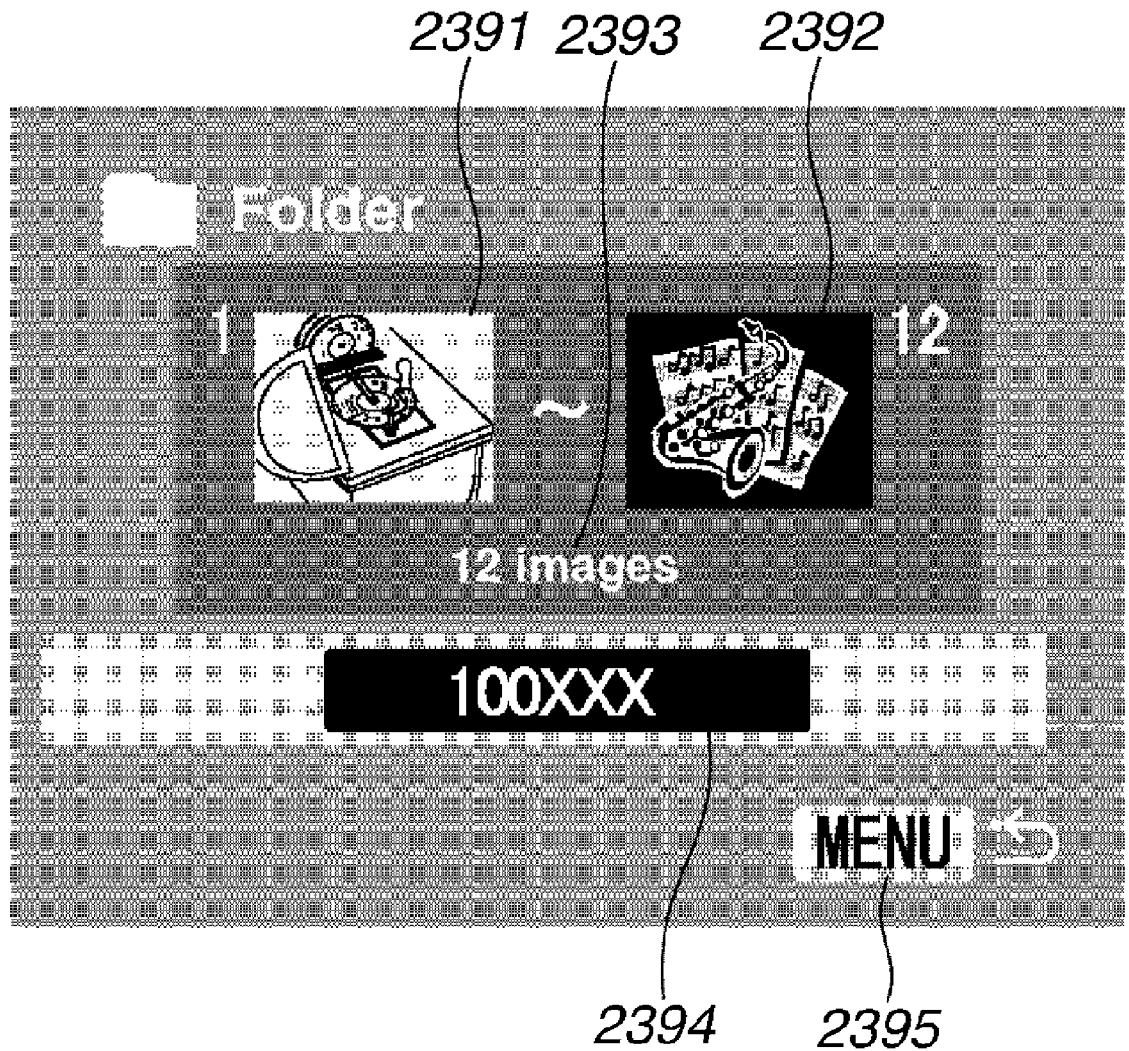
FIG. 32 illustrates an example of an attribute information selection menu screen in the slide show processing.

In step S2363, the system controller 50 determines whether the SET button is pressed. In a case where it is determined that the SET button is pressed, the process advances to step S2369, in which an attribute information selection menu is displayed. FIG. 32 illustrates an example of the attribute information selection menu in a case where a folder icon is selected in the screen illustrated in FIG. 31. FIG. 32 illustrates a first image 2391 in the slide show, the last image 2392 in the slide show, and a total number 2393 of images to be displayed in the slide show. In a case where it is determined that the SET button is not pressed, the process advances to step S2364.

In step S2370, the system controller 50 selects the attribute information of image data which is a slide show object. FIG. 32 illustrates attribute information 2394 currently selected. A user operates the left button or the right button so as to select the attribute information, that is, a type of a folder in this example. The system controller 50 selects attribute information in response to a user's operation. Selections performed in steps S2362 and S2370 can be performed independent of the attribute information defined in the defined reproduction illustrated in FIG. 27. That is, the slide show processing is to perform defining on a condition differing from that for performing the defining processing in FIG. 27 and to sequentially reproduce image data. When the MENU button 2395 is pressed, the screen of the image display section 28 returns to a screen illustrated in FIG. 31.

In step S2364, the system controller 50 determines whether a slide show start instruction is issued. More particularly, the system controller 50 determines whether a start icon 2382 illustrated in FIG. 31 is selected by a user's operation. In a case where the start icon 2382 is selected, the process advances to step S2365. If the start icon 2382 is not selected, the process proceeds to step S2371.

In step S2365, the system controller 50 compares the currently defined attribute information with the attribute information selected in step S2370. Then, in step S2366, the system controller 50 determines whether the currently defined attribute information is the same as that selected in step S2370. If the system controller 50 determines that the currently defined attribute information is the same as that selected in step S2370, the process advances to step S2367. If not, the process advances to step S2373, in which the defined state is canceled.

In step S2367, a slide show is performed according to the attribute information selected in step S2370. According to the present exemplary embodiment, images including the selected attribute information are sequentially searched and reproduced to perform the slide show.

In step S2368, the system controller 50 determines whether the slide show is terminated. Termination of the slide show includes not only a case where all of images to be displayed in the slide show are displayed, but also a case where the slide show is interrupted by a user's operation. If it is determined that the slide show is finished, the process returns to step S2361. If it is determined that the slide show is not finished, the slide show is continued.

Next, the processing in step S2371 is described below. In step S2371, the system controller 50 determines whether an instruction to cause the digital camera 100 to exit from the menu display processing. More particularly, the system controller 50 determines whether the MENU button is pressed by a user. If the MENU button is pressed, the process proceeds to step S2372. If the MENU button is not pressed, the process returns to step S2361.

In step S2372, the system controller 50 finishes the slide show and returns to a normal reproduction mode. At that time, the last image in the slide show is displayed.

Thus, according to the present exemplary embodiment, in a case where a slide show is performed in a state in which the attribute information is defined, the system controller 50 compares the attribute information of image data to be reproduced in the slide show with the defined attribute information. Then, the system controller 50 determines whether the defining is automatically canceled. Consequently, in a case where the attribute information corresponding to the defined reproduction is the same as the attribute information corresponding to the slide show, the execution of defining is maintained. Therefore, a user can save the trouble of performing defining on the same condition again. In a case where the attribute information corresponding to the defined reproduction differs from the attribute information corresponding to the slide show, the defining is canceled. Thus, occurrence of a situation, in which image data observed by a user is not an object to be displayed, and in which this image data cannot be found when being searched, can be prevented.

Figure 28:
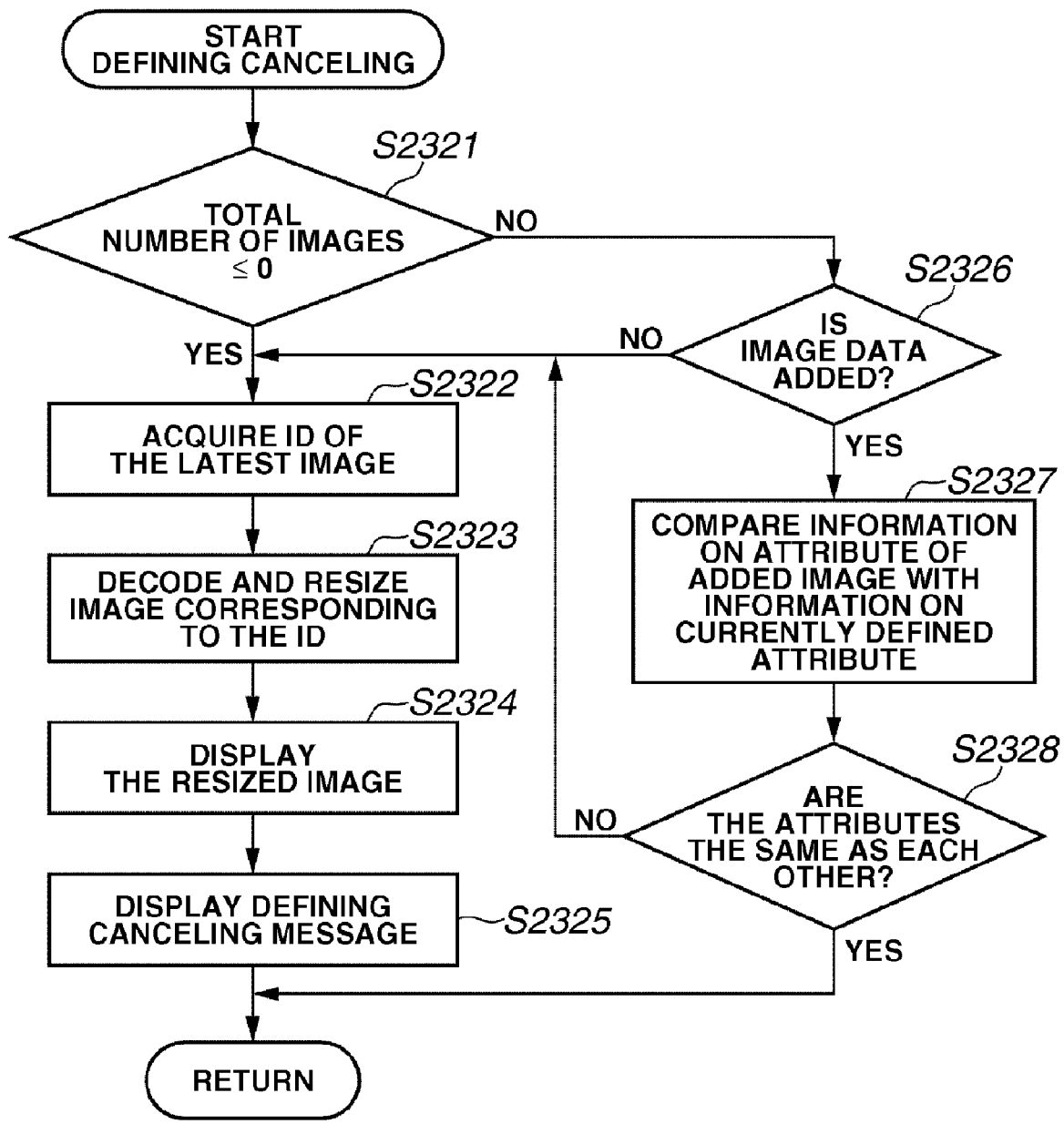
FIG. 28 is a flowchart illustrating defined reproduction mode canceling processing by the digital camera.

FIG. 28 illustrates the defining canceling in step S2306 illustrated in FIG. 27.

In step S2321, the system controller 50 determines whether image data is present in the group currently defined, that is, whether image data including the defined attribute information is present. For example, in a case where no image data including the defined attribute information is present as a result of performing erasing in step S2308, it is meaningless to perform defining. Accordingly, in a case where it is determined that no image data including the defined attribute information is present, the process advances to step S2322, in which the system controller 50 starts practical defining mode canceling processing. Conversely, in a case where it is determined that image data including the defined attribute information is present, the process proceeds to step S2326.

In step S2326, the system controller 50 determines whether image data is added. If it is determined that image data is added, the process proceeds to step S2327. If it is determined that no image data is added, the process proceeds to step S2322.

In step S2327, the system controller 50 compares the attribute information of the added image with the defined attribute information. In step S2328, the system controller 50 determines, according to a result of the comparison made in step S2327, whether the attribute information of the added image is the same as the defined attribute information. If it is determined that the attribute information of the added image is not the same as the defined attribute information, the process proceeds to step S2322. If it is determined that the attribute information of the added image is the same as the defined attribute information, the process ends without canceling defining.

Figure 33B:
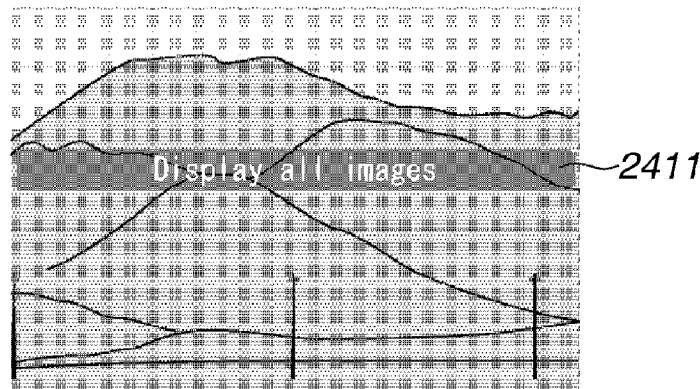
FIG. 33B illustrates an example of a screen display at the time of cancellation of the defined reproduction mode of the digital camera 100.

In step S2322, the system controller 50 acquires the youngest ID among IDs of image data stored in the recording medium 200. Then, the system controller 50 decodes and resizes the image data in step S2323. Subsequently, in step S2324, the system controller 50 causes the image display section 28 to display the resized image data. Then, in step S2325, the system controller 50 causes the image display section 28 to display a defining canceling message, such as that 2411 illustrated in FIG. 33B. Thus, the defining canceling processing ends.

In a case where the image data added in the defined reproduction mode includes the defined attribute information by performing the processing in steps S2327 and S2328, the defined reproduction mode is not canceled. That is, a user can view the added image data while the defined reproduction mode continued until this stage is maintained.

In contrast, in a case where the added image data does not include the defined attribute information, the defined reproduction mode is canceled due to the following reasons. That is, the newly added image data does not include the defined attribute information. Accordingly, if the defined reproduction mode is not canceled, the newly added image data is not a defined reproduction object. Consequently, a user cannot view image data that has just been added.

Accordingly, in the present exemplary embodiment, the defining canceling is controlled according to whether the added image data includes the currently defined classification information, that is, to whether the added image data belongs to the currently defined group. Consequently, defining canceling can be performed at appropriate timing for a user.

Figure 29:
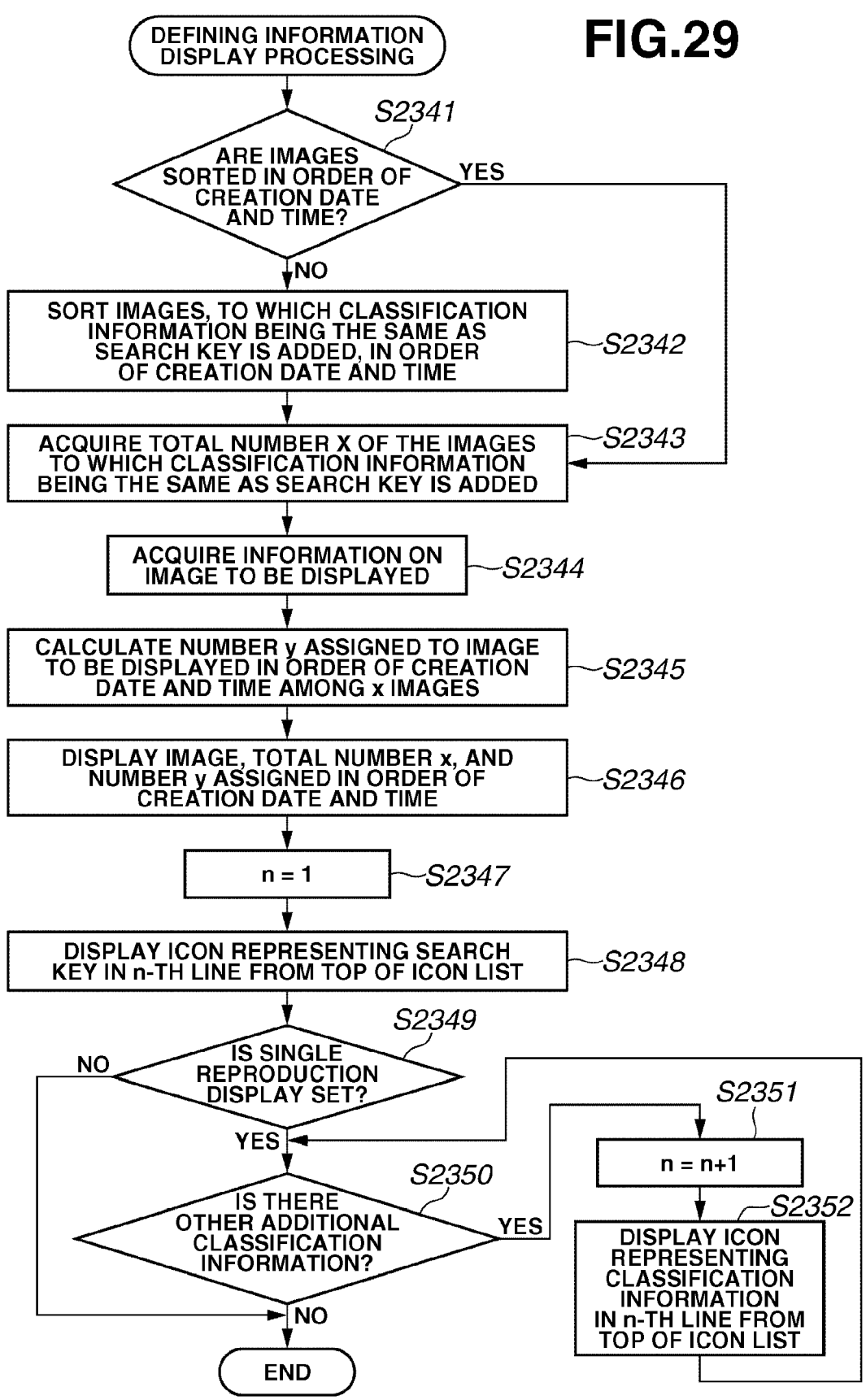
FIG. 29 is a flowchart illustrating defining information display processing performed in a defined reproduction mode by the digital camera.

As described above, when an operation input to instruct a defining reproduction from the operation unit 70 is detected in the jump mode, the system controller 50 starts defined reproduction processing to reproduce only image files to which the classification information set by a user is added. To inform a user of the execution of the defined reproduction at start of the defined reproduction processing and at image-feeding in the defined reproduction, it is necessary to display information peculiar to the defined reproduction of the display image. In the above-described step S2302, such defining information display processing is performed. The defining information display processing is described below in detail. FIG. 29 is a flowchart illustrating the defining information display processing.

In step S2341, the system controller 50 determines whether the defined image files are sorted in order of the creation date and time. If it is determined that the image files are not sorted, the defined image files are sorted in order of the creation date and time in step S2342. Although the image files are sorted in a descending order of the creation date and time in the present exemplary embodiment, the image files can be sorted in an ascending order of the creation date and time. The sorting of the image files is not necessarily performed in the order of the date and time. It is sufficient that image files are sorted according to a certain rule. For example, image files can be sorted according to a file number.

Next, in step S2343, the system controller 50 acquires a total number x of defined image files. Then, in step S2344, the system controller 50 acquires image information of image files to be displayed on the image display section 28. The defined image files have been sorted in order of the creation date and time. Accordingly, in step S2345, the system controller 50 calculates the number y assigned to each of the defined image files, which are arranged in order of the creation date and time, according to the creation date and time of each of the image files to be displayed.

As described above, the system controller 50 acquires the total number x of defined image files, the information on the images to be displayed, the number y of each of the display images arranged in order of the creation date and time. In step S2346, the system controller 50 causes the image display section 28 to display the total number x of defined image files, the information on the images to be displayed, the number y of each of the display images arranged in order of the creation date and time.

Figure 33C:
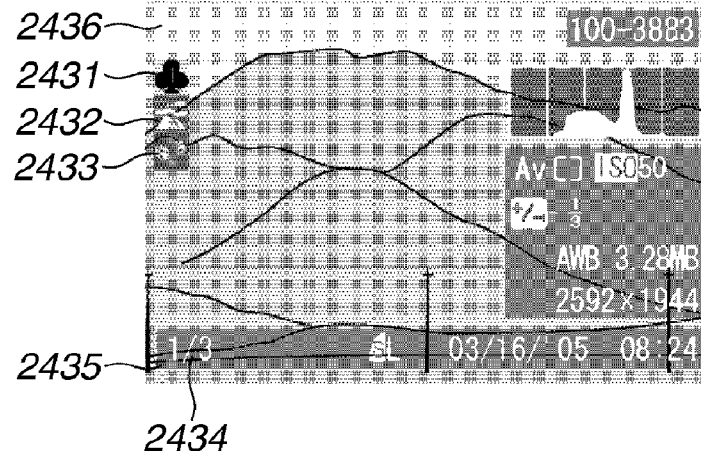
FIG. 33C illustrates an example of an information display screen in the defined reproduction mode of the digital camera 100.

FIG. 33C illustrates an example of a result of display processing performed in step S2346. It is assumed that, as illustrated in FIG. 33C, the classification information representing "Landscape" and the classification information representing "Event" are preliminarily added to the display image 2436, in addition to the classification information representing "category 1". It is also assumed that image files are searched by currently employing "category 1" as a search key, and that the images are reproduced in a defined reproduction mode. The total number x of defined files is displayed at a place 2434, while the number of each of the display images arranged in order of the creation date and time is displayed at a place 2435. In the example illustrated in FIG. 33C, an indication "1/3" is generated according to the total number x of the files and the number assigned in order of the creation date and time. That is, this indication indicates that there are three image files, to which the classification information corresponding to "category 1" is added. The display image 2436 is the oldest one (i.e., a first image) among three images.

Referring back to FIG. 29, in step S2347, the system controller 50 initializes a variable n, which indicates the display position of the icon representing the classification information, to "1". Then, in step S2348, an icon representing the search key is displayed at the n-th position (the top position) of the icon list. Thus, this icon is displayed like, for example, an icon 2431 illustrated in FIG. 33C. The display position of the icon 2431 can be set at the bottom of the screen. As long as a user can recognize at a glance that the currently defined category, this icon can be positioned at any place in the screen. Additionally, the icon 2431 representing the search key can be displayed by changing the color or being expanded so as to be differentiated from other icons representing other types of classification information.

Thus, the icon representing the search key is displayed. Then, the process advances to step S2349, in which the system controller 50 determines which of the single reproduction display and the multiple reproduction display the reproduction display is set at. If it is determined that the reproduction display is set at the multiple reproduction display, the process ends. This is intended to simplify information display, which is described in detail below.

On the other hand, if it is determined that the reproduction display is set at the single reproduction display, the process proceeds to step S2350, in which the system controller 50 determines whether additional classification information added to the display image 2436 is present in addition to the classification information serving as a search key. In a case where the additional classification information is present, the system controller 50 increments a variable n representing the display position of an icon in step S2351. Then, in step S2352, the system controller 50 causes the image display section 28 to display an icon representing the classification information at the n-th position in the icon list.

Then, processing in steps S2350 through S2352 is iteratively performed until all of icons respectively representing the classification information added to the display image 2436 are displayed on the image display section 28. When all of the icons are displayed on the image display section 28, the process ends. In the example illustrated in FIG. 33C, an icon 2432 corresponding to classification information representing "landscape" and an icon 2433 corresponding to classification information representing "event" are displayed. These types of classification information are added to the image 2436, which is currently displayed.

Although classification information added to a display image is displayed using an icon in the present exemplary embodiment, an indication representing the classification information according to the present invention is not limited to the icon. As long as a user can recognize the classification information using the indication, for example, the indication can be configured by displaying the name of the classification information directly on the image display section 28.

Figure 33D:
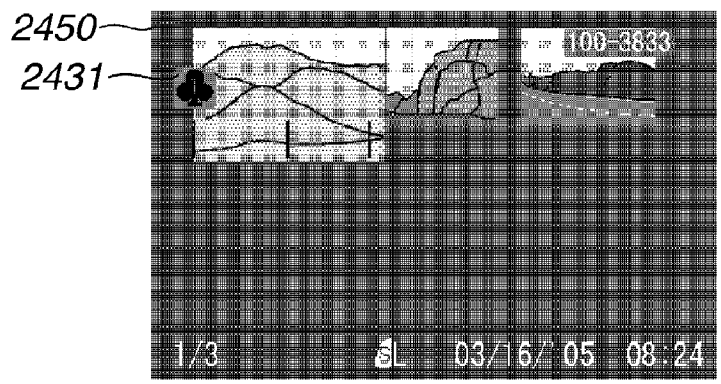
FIG. 33D illustrates an example of a multiple reproduction display in the defined reproduction mode of the digital camera 100.

Examples of displays in the above-described process are described below with reference to FIGS. 33C and 33D. In the image 2436, the icon 2432 representing the classification information "landscape" and the icon 2433 representing the classification information "event" are displayed in an icon list as the second icon and the third icon from the top of the list. FIG. 33D illustrates a multiple reproduction display 2450 in the defined reproduction. In the case of the multiple reproduction, as described above, icons other than the icon 2431 representing the search key are not displayed. Thus, an amount of information is prevented from being increased in the multiple screen display. Also, the display can be prevented from being complicated. For example, in an enlarged image display, for the same reason, it is useful that icons other than the icon 2431 representing the search key are not displayed.

In the foregoing description, the defining information display processing has been described. A defined reproduction using a search key is assumed for display according to the present exemplary embodiment. For example, the defining information display processing can be performed in the jump mode before defining. In this case, an icon representing the search key is displayed at the top in the jump mode. Thus, a user can recognize at a glance which of the search keys the user designates. The position of this icon does not change even when the digital camera 100 enters the defined reproduction. Thus, an operation can smoothly be continued.

A structure capable of setting a search key again in a defined reproduction can be provided. In this case, the digital camera 100 may be adapted so that search of images, to each of which classification information corresponding to a newly designated search key is added, is performed by employing images currently reproduced in the defined reproduction (i.e., a defined image file group) as search objects. Alternatively, the digital camera 100 may be adapted so that search is performed by employing all images as search objects again. Alternatively, the digital camera 100 may be adapted so that when a search key is set again, a user can select all of images or defined image file groups as search objects. Thus, a user can promptly search for a desired image by setting another search key in the defined reproduction.

A method of setting a search key in the defined reproduction is adapted so that one of the icons 2431 to 2433 can be selected in the display state illustrated in FIG. 33C.

Referring back to FIG. 19, in a case where the operation input detected in step S1907 is an instruction to terminate the jump mode, the process proceeds from step S1917 to step S1918. An operation of terminating the jump mode is, for example, to press the MENU button. When such an operation is performed, the system controller 50 redisplays an image on the entire image display section 28 in step S1918. Then, in step S1920, the jump key is stored in the nonvolatile memory 56. Then, the jump mode is terminated. The jump key stored in step S1920 is an object of determination in step S1901 at the next transition to the jump mode.

In a case where the operation input detected in step S1907 is a power-supply OFF operation using the power supply switch 72, the process proceeds from step S1919 to step S1920. That is, if it is determined that a power-supply OFF operation is performed, the system controller 50 records the currently selected jump key and terminates the jump mode.

In a case where the operation input detected in step S1907 does not correspond to any of the above-described operations, the process returns to step S1907 without performing any processing. Then, the system controller 50 waits for a user's operation input.

As described above, the screen illustrated in FIG. 24A includes the jump key list display 2001, the information display portion 2009, and the image display area 2003. Thus, three types of information are displayed in one screen. Thus, a good visibility display can be provided to a user. Although such a screen has good visibility, sometimes, a complex operation is needed for information manipulation. That is, complex operations are needed for enabling switching between jump keys displayed in the jump key list display 2001, switching between groups displayed in the information display portion 2009, and switching between image data displayed in the image display area 2003. However, the present exemplary embodiment is configured so that the top and bottom buttons are used for the switching between the jump keys, that the left and right buttons are used for the switching between the groups, and that the wheel 73 is used for the switching between the image data to be displayed. With this configuration, switching operations corresponding to the three types of information simultaneously displayed are assigned to different operating units, respectively. Thus, it is unnecessary for a user to perform complex operations. That is, while changing jump keys one after another, a user can easily perform an operation of changing the group corresponding to the jump key. Also, a user can easily perform an operation of checking image data while switching between the groups.

Figure 34A:
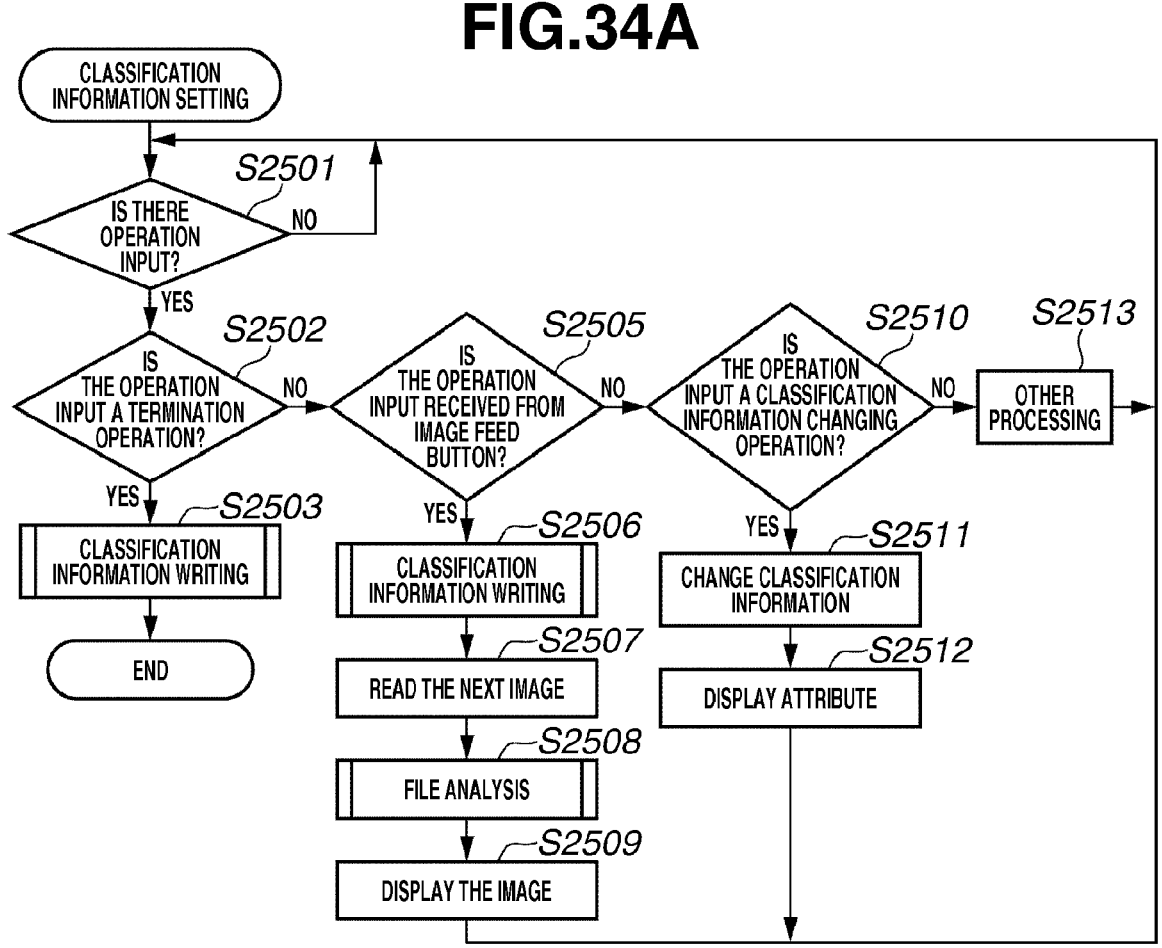
FIG. 34A is a flowchart illustrating classification information setting processing by the digital camera.

As described above with reference to FIG. 17, the digital camera 100 according to the present exemplary embodiment performs processing in a classification information setting mode by selecting a classification information setting menu. FIG. 34A is a flowchart illustrating a process performed in the classification information setting mode.

In step S2501, the system controller 50 checks whether an operation input occurs. The operation input includes a user's operation performed on the buttons and the battery cover, and an event informing a user of reduction in a power supply level. In the case of no operation input, the system controller 50 waits for the next operation input.

In a case where the operation input detected in step S2501 is a termination operation of instructing to terminate classification information setting, the process proceeds from step S2502 to step S2503. According to the present exemplary embodiment, the operation of instructing to terminate classification information setting includes an operation of pressing a menu button of the operation unit 70 so that the system controller 50 exits the classification information setting processing, an operation of turning off the power supply, and a mode change operation of changing the mode from the reproduction mode to the image-taking mode. In step S2503, the system controller 50 writes the classification information, which corresponds to image data and is changed in step S2511 (to be described below), to an image file. Then, the classification information setting mode is terminated. Upon termination of the classification information setting mode, the process returns to a state in which the system controller 50 waits for input in step S1701 illustrated in FIG. 17.

On the other hand, in a case where the operation input detected in step S2501 is a user's operation performed on the image feed button included in the operation unit 70, the process proceeds from step S2505 to step S2506. In step S2506, the system controller 50 writes the classification information, which is changed in step S2511 (to be described below) and is added to the image data, to an image file. Then, the process proceeds to step S2507, in which the system controller 50 reads the next image data to be displayed. The image feed buttons (i.e., the left and right buttons in the present exemplary embodiment) respectively correspond to a pair of directions. The next image data to be displayed changes according to the direction designated by the image feed button. In step S2508, the system controller 50 performs file analysis processing on the image data read in step S2507, and acquires attribute information from the file. The file analysis processing will be described below with reference to FIG. 45. Then, in step S2509, the system controller 50 causes the image display section 28 to display the read image data. At that time, the attribute information, such as the photographing information and the classification information, is displayed according to the setting. In a case where it is determined according to the result of the file analysis performed in step S2508 that the file is improper data, e.g., partly collapsed data, an error display is also displayed. Upon completion of the display, the process returns to step S2501, in which the system controller 50 waits for input.

The image feed processing described in the description of steps S2505 to S2509 can be applied to both of a single reproduction, in which one image is displayed on one screen, and a multiple reproduction in which a plurality of images (e.g., 9 images) are displayed on one screen. In the case of the multiple image display, the cursor sequentially moves in response to image feed instructions. In response to a moving instruction, the classification information of the image data is written to an image file.

In a case where the operation input detected in step S2501 is a classification information changing operation, the process proceeds from step S2510 to step S2511, in which classification information changing processing is performed on the classification information added to the displayed image data. In this stage, the changed classification information is not written to the image file. The changed classification information is stored in the memory 32. Then, in step S2512, the system controller 50 causes the changed classification information to be reflected in a display on the image display section 28.

In a case where the operation input detected in step S2501 does not correspond to any of the user's operations, other processing is performed in step S2513. The other processing is, for example, switching between the single reproduction display and the multiple image display.

As described above, the writing of the classification information to the image file is performed at the changing of the image data display or at the termination of the classification information setting mode. Thus, the number of accesses to the recording medium 200 can be decreased. Consequently, an operating speed can be enhanced.

Figure 34B:
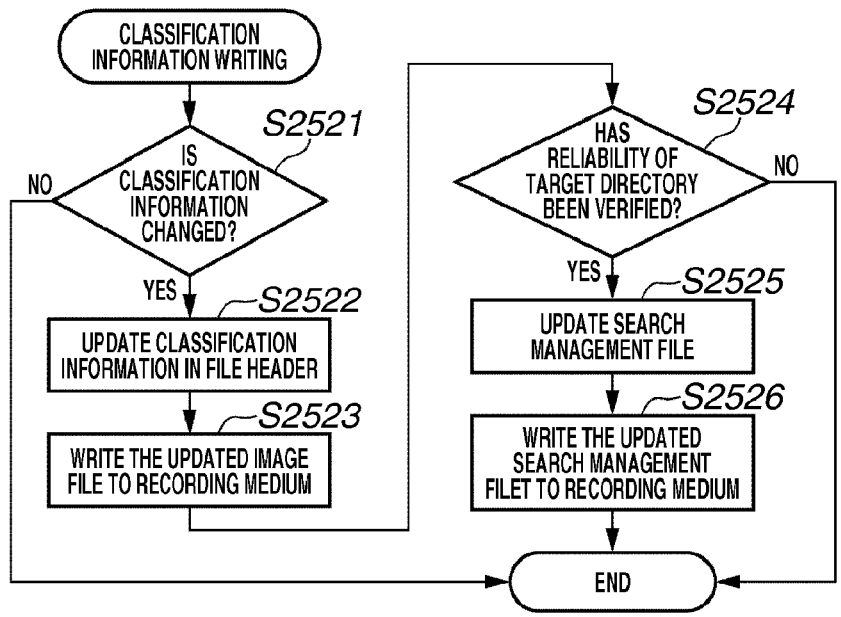
FIG. 34B is a flowchart illustrating classification information writing processing by the digital camera.

FIG. 34B is a flowchart illustrating a classification information writing process performed in steps S2503 and S2504 illustrated in FIG. 34A.

When a request for writing the classification information is issued, the system controller 50 determines in step S2521 whether the classification information is changed. If it is determined that the classification information is not changed, the process ends without performing processing. Conversely, in a case where it is determined that the classification information is changed, the process proceeds to step S2522.

In step S2522, the system controller 50 writes the changed classification information to the file header of the associated image file so as to update the classification information in the file header. Then, in step S2523, the system controller 50 writes the image file, whose file header is updated, to the recording medium 200.

Subsequently, in step S2524, the system controller 50 determines whether reliability of a target directory has been verified. The verification of the reliability will be described with reference to FIGS. 41 and 42. If the reliability has been verified, the process proceeds to step S2525, in which the system controller 50 updates data of a search management file. Then, in step S2526, the updated data of the search management file is written to the recording medium 200. Conversely, if the reliability has not been verified yet, the process skips steps S2525 and S2526. Then, the process ends without updating the search management file. The reliability of the target directory and the search management file will be described below.

Figure 35:
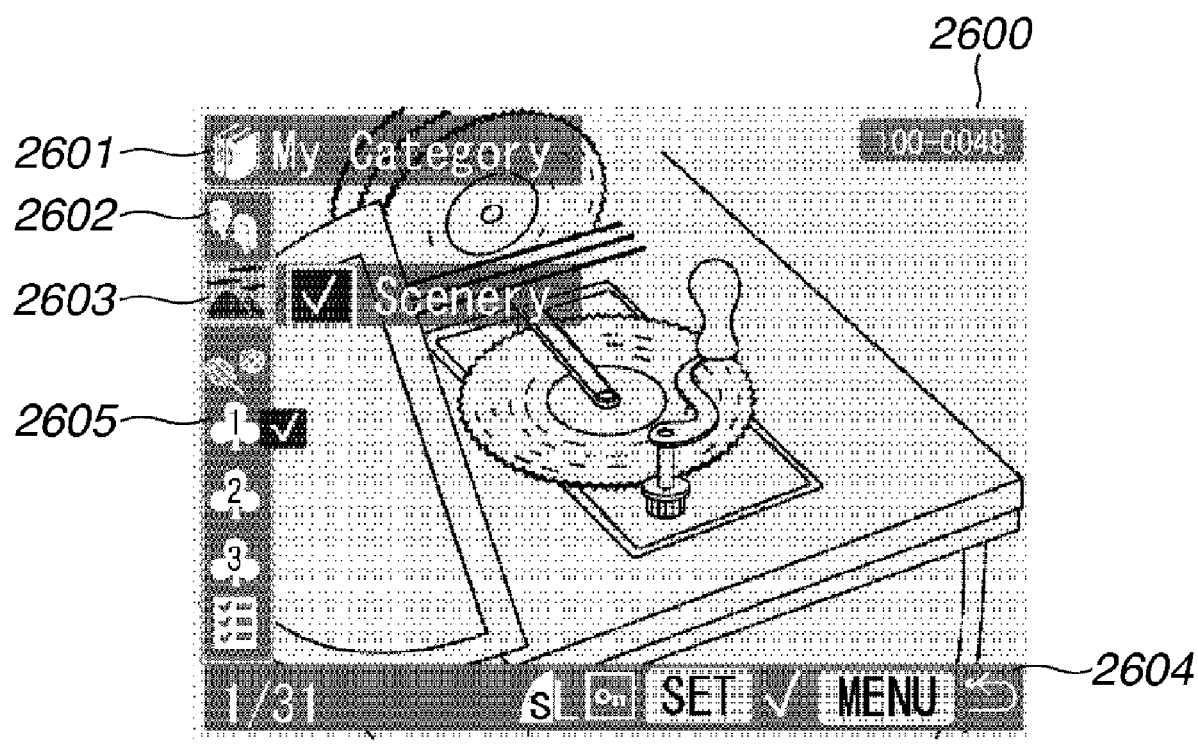
FIG. 35 illustrates an example of a display screen at the time of the classification information setting processing by the digital camera.

FIG. 35 illustrates an example of a display on a classification information setting screen 2600. As illustrated in FIG. 35, classification information stored in association with the currently displayed image data can be changed according to an operation input or instruction input from the classification information setting screen 2600.

A title display 2601 indicates that the currently displayed screen is a classification information setting screen. An indication 2602 is a list display of types of classification information, which can be set therein. In the example of the display, seven types of classification information are vertically listed in the list display. Classification display corresponding to the classification information imparted to the currently displayed image data is check-marked. As illustrated in FIG. 35, the classification indication 2605 corresponding to the classification information representing "category 1" is check-marked. Thus, the classification information representing "category 1" is imparted to the image data displayed in the classification information setting screen 2600.

Information 2603 is classification information that is currently changed. A background color is changed in order to indicate that the cursor is pointed to this classification information. Additionally, the check mark is displayed larger than that corresponding to other classification information. The indication of the classification information is turned on or off by pressing the SET button included in the operation unit 70. When such an operation is performed in a state in which classification information is not imparted to the currently displayed image data, this classification information is imparted to the image data by pressing the SET button. Conversely, when the operation is performed in a state in which classification information is imparted to the currently displayed image data, the classification information is eliminated from the image data by pressing the SET button.

A guidance indication 2604 indicates that check-marking or erasing of a checkmark can be performed by pressing the SET button, and that the classification information setting mode can be terminated by pressing the MENU button.

The classification information, which is to be changed in this screen, can be changed by the top and bottom buttons included in the operation unit 70. Also, the currently displayed image data can be changed by the right and left buttons to perform image-feeding.

The defined reproduction can be performed according to the classification information imparted thereto. However, when the classification information is set in a defined reproduction state, image data to be reproduced may be erased by a classification information setting operation. Thus, the digital camera 100 may be adapted so that any other screen is inhibited from changing to a classification information setting screen in the defined reproduction mode, that a defined reproduction state is canceled when any other screen changes to the classification information setting screen, or that when the defined reproduction is performed, classification information setting cancellation is performed at termination of the classification information setting.

Figure 36:
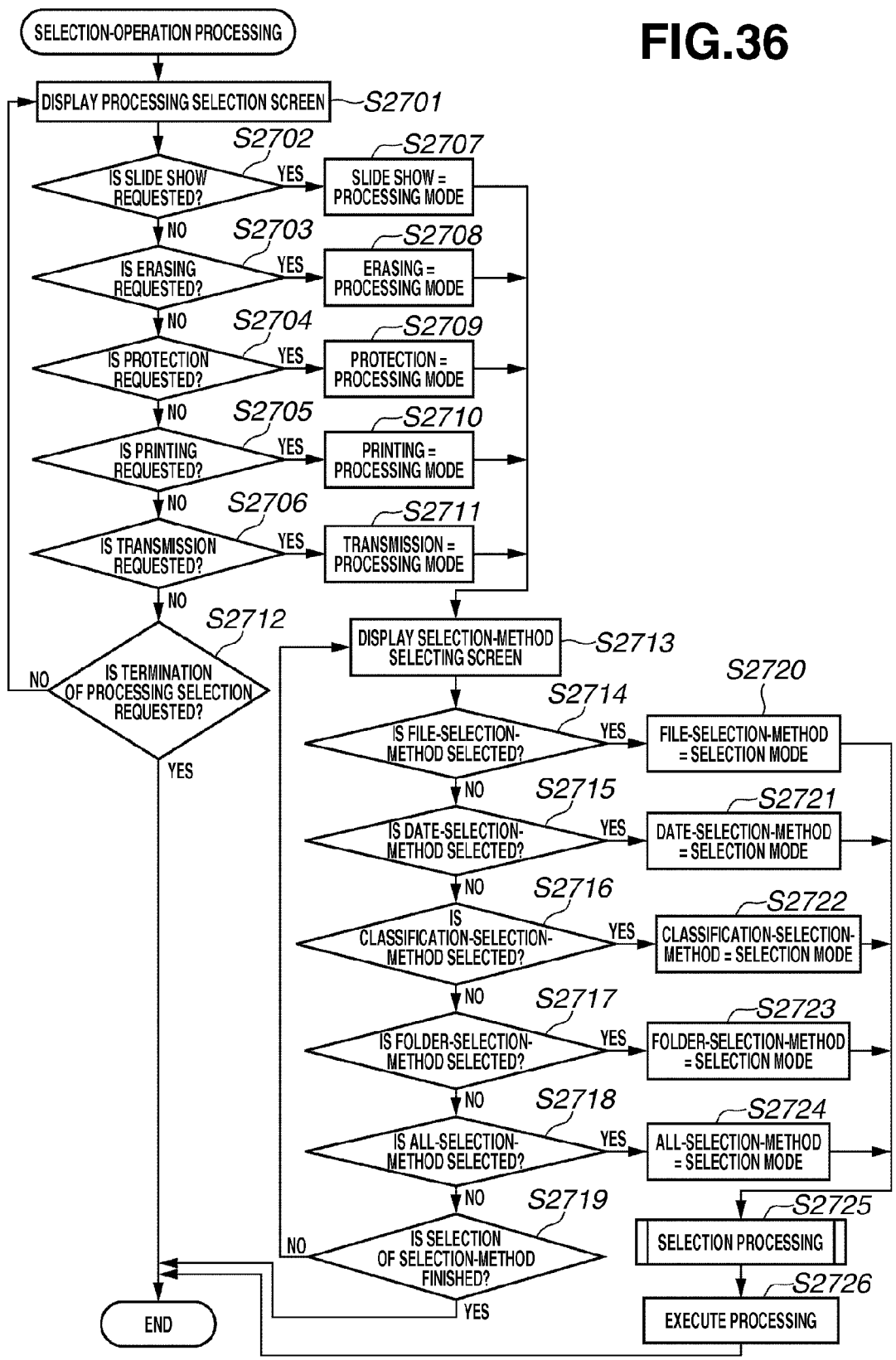
FIG. 36 is a flowchart illustrating selection-operation processing by the digital camera.

FIG. 36 is a flowchart illustrating a selection-operation process performed in step S1723 illustrated in FIG. 17. The process is started when a user performs an operation of changing to selection-operation processing.

Figure 38A:
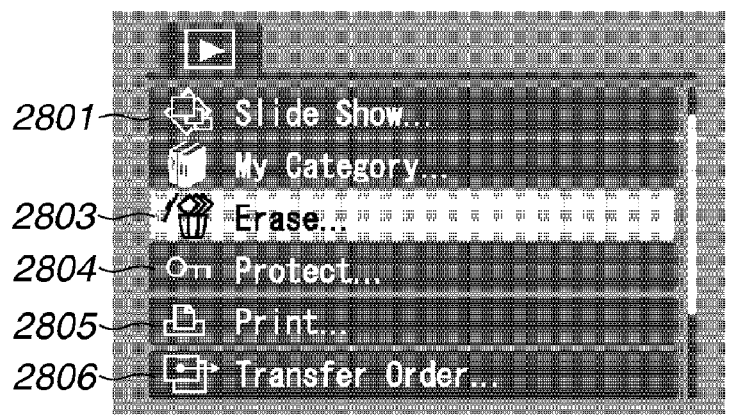
FIG. 38A illustrates an example of a display screen at the time of processing-mode selection in the selection-operation processing by the digital camera.

In step S2701, the system controller 50 causes the image display section 28 to display a processing selection screen, which is a menu screen as illustrated in FIG. 38A. A user can select processing to be performed on an image file via a graphical user interface (GUI) using this menu screen. Selectable processing includes, for example, slide show 2801, erasing 2803, protection 2804, printing 2805, and transmission 2806. In steps S2702 through S2706, the system controller 50 determines which of the slide show, the erasing, the protection, the printing, and the transmission is selected. Then, in steps S2707 through S2711, according to a result of the determination of the selected processing, the system controller 50 sets the associated processing mode (corresponding to one of the slide show, the erasing, the protection, the printing, and the transmission). Then, the system controller 50 causes the system memory 52 to store the selected processing. If a request for terminating a selection operation occurs, the system controller 50 terminates the processing in step S2712. If no processing is selected, and no request for termination of the processing selection occurs, the process returns to step S2702.

Figure 38B:
FIG. 38B illustrates an example of a display screen at the time of selecting a selection-method in the selection-operation processing by the digital camera.

If the processing mode is thus selected, the process proceeds to step S2713. In step S2713, the system controller 50 causes the image display section 28 to display a selecting screen for selecting a selection method. This screen display is illustrated in FIG. 38B. A user can select a method of selecting an object (or image) to be processed, using this screen, through the GUI. The selection method of an object to be processed is, for example, the following methods.

A file selection 2821, which is a method of selecting one or a plurality of image files from all of image files as an object.

A date selection 2822, which is a method of grouping objects into sets according to the date and selecting a set of the objects corresponding to the same date.

A classification information selection 2823, which is a method of grouping objects into sets according to classification information and selecting a set of objects including the same classification information.

A folder selection 2824, which is a method of grouping objects into sets according to folders and selecting a set of objects corresponding to the same solder.

All Selection 2825, which is a method of selecting all image files.

In steps S2714 to S2718, it is determined by a user's operation on the operation unit 70 whether one of the file selection, the date selection, the classification information selection, the folder selection, and the all selection is selected. Then, in steps S2720 to S2724, the system controller 50 sets one of the image file selection, the date selection, the classification information selection, the folder selection, the all selection as the selection mode. Then, the system controller 50 causes the system memory 52 to store the selection mode. In a case where no selection method is selected and where a request for finishing the selection of the selection-method occurs, the process ends in step S2719. In a case where no selection method is selected and where no request for finishing the selection of the selection-method occurs, the process returns to step S2714. In a case where the processing and the selection of the selection-method are finished, selection processing is performed in step S2725. The selection processing will be described below with reference to FIG. 37. Then, the process ends. Upon completion of the process, the system controller 50 returns to a state in which the system controller 50 waits for an input, as indicated in step S1701 illustrated in FIG. 17.

Figure 37:
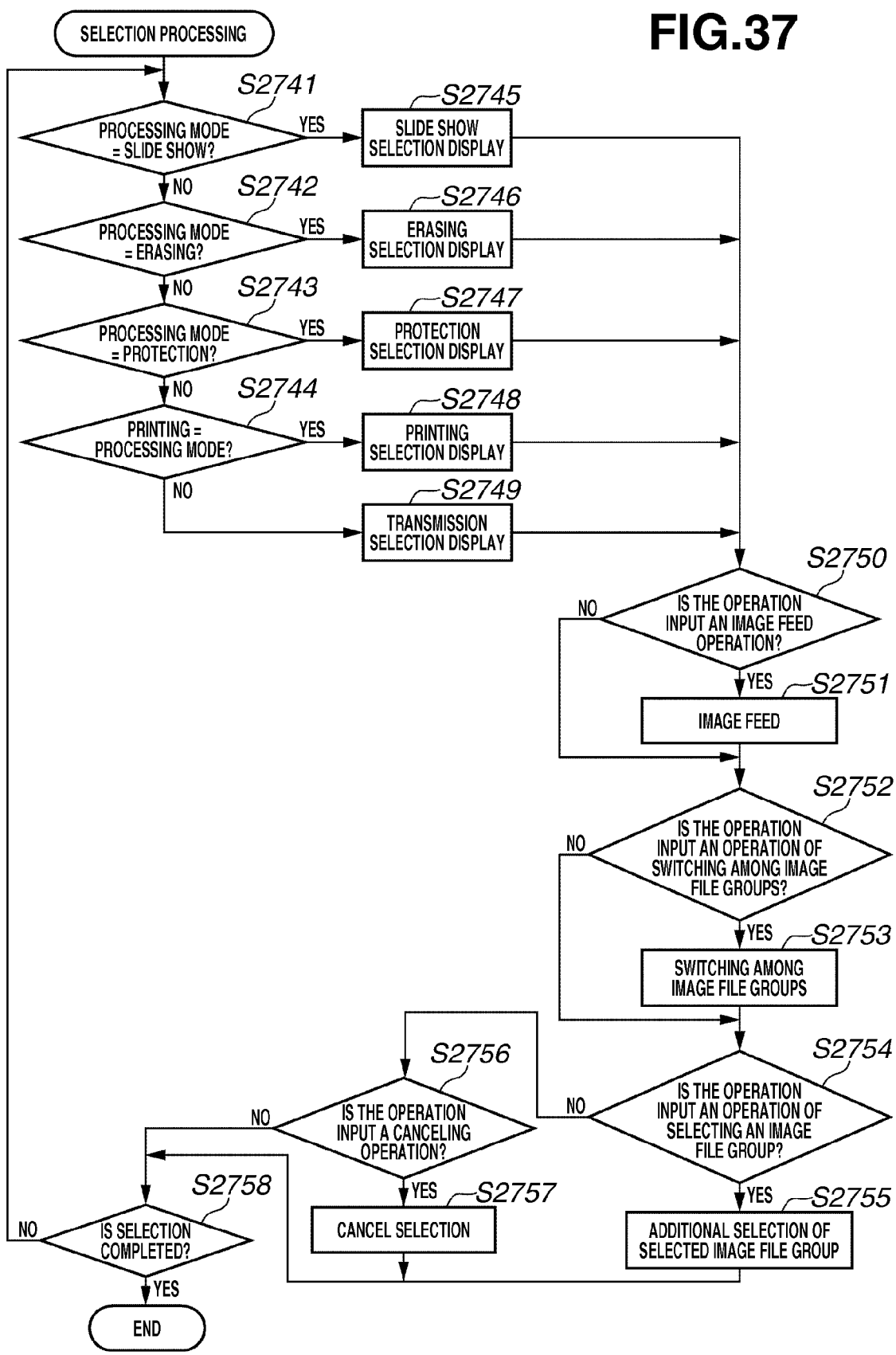
FIG. 37 is a flowchart illustrating selection processing by the digital camera.

FIG. 37 is a flowchart illustrating the selection processing in step S2725 illustrated in FIG. 36.

Figure 38C:
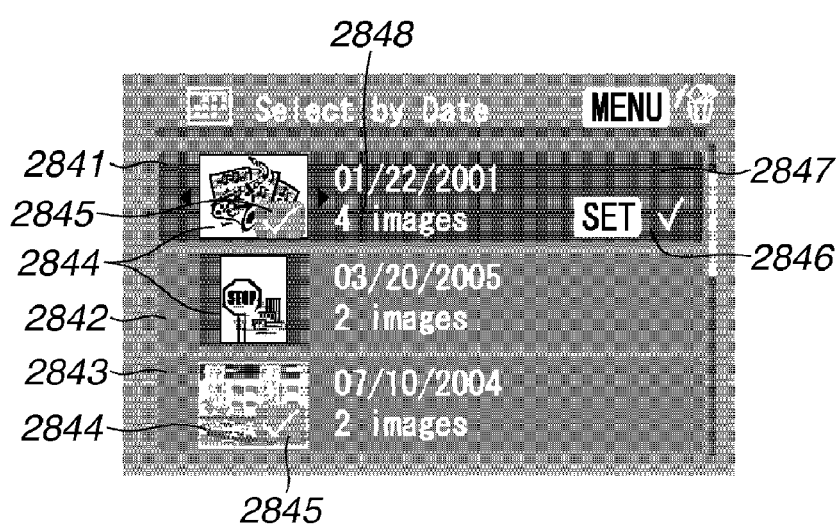
FIG. 38C illustrates an example of a display screen in the selection processing by the digital camera.

When the selection processing is started, in steps S2741 through S2744, the system controller 50 determines a processing mode stored in the system memory 52. The processing mode is stored in the system memory 52 in one of steps S2707 to S2711. In steps S2745 to S2749, according to a result of the determination in steps S2741 through S2744, a selection screen display corresponding to a set processing mode is performed. That is, in step S2745, the slide show selection display is performed. In step S2746, the erasing selection display is performed. In step S2747, the protection selection display is performed. In step S2748, the printing selection display is performed. In step S2749, the transmission selection display is performed. In the present exemplary embodiment, one of the slide show, erasing, protection, printing, and transmission is selected as a processing mode. Accordingly, if NO in each of steps S2741 through S2744, it is assumed that "transmission" is set as the processing mode. Thus, in step S2749, a transmission selection display is performed. FIG. 38C illustrates an example of the selection display screen.

Subsequently, if it is determined in step S2750 that the operation input is an instruction to perform an image feed operation, an image feed operation is performed in step S2751. In the image feed operation, the system controller 50 performs image feed in the image data display portion 2844 in an image file group, to which the cursor 2847 is pointed. If the operation input in step S2752 is a switching operation of switching the image file group, the image file group to be processed is switched in step S2753. Thus, the image file group to be processed is switched, and the cursor is moved. For example, the cursor is moved to the image file group 2848, so that the image file group 2848 is processed. The image feed operation is performed on the image file group to be processed. Accordingly, when the image feed operation is performed in a state in which the cursor is pointed to the image file group 2848, the image feed operation is performed in the image file group 2848. An image displayed in the image data display portion 2844 of the image file group 2848 is changed.

In the present exemplary embodiment, it is assumed that an image feed operation is performed using the left button and the right button, and that switching of an image file group is performed by the top button and the bottom button.

If a selection operation is performed on the image file group in step S2754, additional selection of the operated image file group is performed as a target image file in the selected processing mode in step S2755. Conversely, if an image file group selection canceling operation is input as the operation input, the process proceeds from step S2756 to step S2757, in which the system controller 50 cancels the selection of the operated image file group from the target image file in the selected processing mode. When an instruction to complete the selection is input, the process ends in step S2758. Conversely, when an instruction to complete the selection is not input, the process returns to step S2741. Then, the above-described process is performed iteratively. Thus, a plurality of image file groups can be selected corresponding to each processing mode.

FIG. 38C illustrates an example of a selection display screen in a case where the date selection is selected among the selection methods. GUI indications 2841, 2842, and 2843 are image file group choices corresponding to each of the following dates: Jan. 22, 2001; Mar. 20, 2005; and Jul. 10, 2004. The choice 2848 indicates the number of effective image files, which are to be processed, corresponding to each of the dates. The choice 2847 indicates the cursor pointed to the selected image file group. Selecting-instruction GUI indication 2846 moves together with the cursor. A user can collectively select a plurality of image files corresponding to each of the dates through the GUI from the operation unit 70. An image display portion 2844 displays image data corresponding to each image data group. In the image data display portion 2841 corresponding to the date, to which the cursor 2847 is pointed, image feed can be performed in the image file group corresponding to each of the dates according to the input from the operation unit 70 in steps S2750 and S2751.

In the present exemplary embodiment, the cursor 2847 can be upwardly and downwardly moved by the top button and the bottom button of the operation unit 70 in steps S2752 and S2753. Image feed can be performed in the image file group, to which the cursor 2847 is pointed, in step S2750 and S2751 in the image data display portion 2844, by pressing the left button and the right button. Consequently, a user can select the image file group to be processed, while easily checking images, which are represented by image data of the image file groups, on the selection display screen. The image files displayed by performing this image feed will be described below with reference to FIG. 39.

A user can select the image file group, which is to be processed, by pressing the SET button in a state in which the cursor 2847 is pointed to the unselected image file groups in steps S2754 and S2755. When the SET button is pressed while the cursor 2847 is pointed to the image file group selected as an object to be processed, the selected state of the image file group is canceled in steps S2756 and S2757. A checkmark 2845, which indicates that the image file group is selected, is displayed in an icon corresponding to each of the selected image file groups. A plurality of image file groups can be selected. The selected image file groups are collectively processed in the subsequent step S2726. In other selection modes (e.g., the classification information selection mode, and the folder selection mode), a similar selection display screen (i.e., image file selecting GUI) is used.

FIG. 39 is a table illustrating effective image files to be processed, corresponding to the selection display screen in each processing mode. The effective image files to be processed are image files which are image feeding objects in the image feed operations performed in steps S2750 and S2751. The number 2848 of the effective image files to be processed is the number of image files to be selected as objects to be processed, as illustrated in FIG. 39.

For example, in the erasing processing, image files having protection attribute are not objects to be erased. Thus, the number 2848 does not include the number of image files having the protection attribute in the associated image group. That is, only the number of image files having no protection attributes is displayed. In the selection display screen illustrated in FIG. 38C, the number of image files, which are effective as objects to be processed, corresponding to the image file group as a selection candidate, is displayed, so that a user can know the number of objects to be processed and can perform appropriate selection. Apparently, at that time, the number of image files, which are included in the image file group and are not effective as objects to be processed, or the total number of image files included in the image file group can be displayed. Also, an indication can be output, which informs a user that the image file group includes image files which are not effective as objects to be processed. Consequently, a user can select the image file group after more appropriate check is performed.

In the image feed operation in the image file group in the image data display portion 2844, only image files being effective as objects to be processed are displayed. As illustrated in FIG. 39, all image files are objects to be processed in the case where the processing is the slide show or the protection. Thus, all image files of the image file group are objects, on which the image feed operation is performed, in the image data display portion 2844. Accordingly, there is no limitation in the selectability of image files. On the other hand, image files having the protection attribute are not erased by erasing processing. Thus, the image feed processing can be performed only on the image files that do not have the protection attributes.

In a case where all of the image files of the image file group, to which the cursor 2847 is pointed, have the protection attribute in the erasing processing, there are no objects to be erased. Thus, the digital camera 100 informs a user that the user cannot select the image file group. This can be enabled by making the selection instruction GUI 2846 inactive. Only still images are objects to be printed in the printing. In a case where all of the image file groups, to which the cursor is pointed, are other than still images, for example, moving images and audio data, there are no objects to be printed. Accordingly, as described above, the digital camera 100 informs a user that the image file group cannot be selected. In the transmission processing, objects to be transmitted are only untransmitted image files. Thus, only untransmitted image files are objects on which the image feed is to be performed. In a case where the image file groups, to which the cursor is pointed, are transmitted image files, there are no objects to be transmitted. Accordingly, the digital camera 100 informs a user that the user cannot select the image file group. If there are no contents, no objects to be processed are present in each of the processing modes. Thus, the selection GUI for selecting the image file group is made to be inactive.

Thus, after the processing mode is set by selecting the processing, objects to be process are selected. Accordingly, according to preliminarily set processing, the number of image files being effective as objects to be processed is displayed. Additionally, the determination of the selectability of the image file group and the determination of objects, on which the image feed is performed, are performed. Consequently, the image file group having no objects to be processed is prevented from being selected. Also, image data of image files, which are not objects to be processed, is prevented from being displayed. Thus, a user can appropriately select objects to be processed.

Figures 40A, 40B:
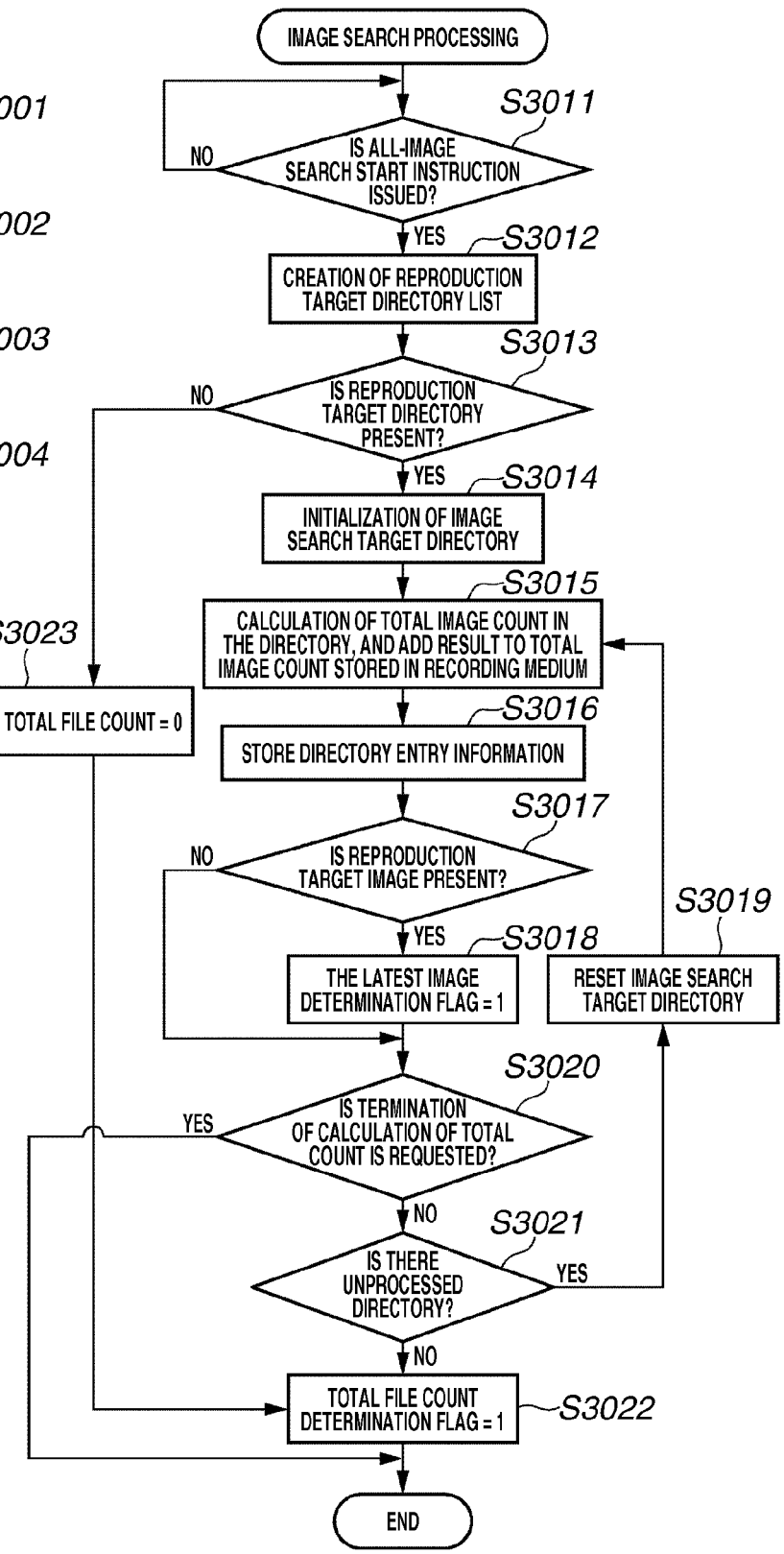
FIG. 40A is a flowchart illustrating file management processing by the digital camera.
FIG. 40B is a flowchart illustrating image search processing by the digital camera.

FIG. 40A is a flowchart illustrating image file management processing performed in step S302 illustrated in FIG. 3. The system controller 50 clears the latest image determination flag recorded in the system memory 52 in step S3001. Then, the system controller 50 clears the total file count determination flag in step S3002. Also, the system controller 50 clears the search permission flag in step S3003. Additionally, in step S3304, the system controller 50 issues an instruction to start an image search in the image search processing performed in parallel with the above-described processing. Then, the process ends.

FIG. 40B is a flowchart illustrating image search processing performed in response to an image search start instruction in step S3004 illustrated in FIG. 40A.

When an instruction to start an image search is issued, the process proceeds from step S3011 to step S3012, in which the system controller 50 creates a reproduction object directory list. This processing is to analyze a directory entry of a DCF (Design rule for Camera File system) root directory reproducing apparatus, which conforms to DCF standards, and to search a DCF directory and add the searched DCF directory to the reproduction object directory list. Then, in step S3013, the system controller 50 determines whether a reproduction object directory is present. If it is determined that there is no reproduction object directory (i.e., there are no directories and files, which can be handled by the digital camera 100), the system controller 50 sets the total file number at "0" in step S3023. Then, the process ends.

Conversely, if it is determined in step S3013 that there is a reproduction object directory, the system controller 50 initializes an image search object directory in step S3014. In this initialization, the maximum number DCF directory is set at an image search object directory in, for example, a reproducing apparatus conforming to the DCF standards. Next, in step S3015, the system controller 50 calculates a total number of images in the directory set at the image search object directory by analyzing the directory entry thereof. Then, the system controller 50 adds the total number of images in the directory to the total number of images recorded on the recording medium 200.

In step S3016, the system controller 50 acquires file information recorded in the directory entry of the DCF root directory. More particularly, the system controller 50 acquires the minimum file number, the maximum file number, a total sum of file numbers, a total sum of timestamps, a total sum of file sizes, and a total number of files. Then, these types of information are stored in the memory 52 as the directory entry information.

In step S3017, it is determined whether the reproduction object image file (i.e., files that can be handled by the digital camera 100) is present. If it is determined that there is a reproduction object image, the system controller 50 determines the latest image and sets the latest image determination flag at "1" in step S3018. When an instruction to finish a total number calculation is issued by operating the finishing button in step S3020, the process ends.

If an instruction to finish a total number calculation termination is not present, the system controller 50 determines in step S3021 whether an unprocessed directory is present. If it is determined that an instruction to finish a total number calculation termination is present, the system controller 50 sets the image search object directory at an unprocessed directory in step S3019. Then, the process returns to step S3015. Thus, the processing in steps S3015 through S3018 is performed on all of directories included in the reproduction object directory list created in step S3012. Upon completion of performing the processing in steps S3015 through S3018 on all of the directories, the process proceeds to step S3022, in which the system controller 50 informs a user of the latest image determination, calculates an image total number, and sets the total file number determination flag. Then, the system controller 50 exits the process.

If there is a reproduction object directory is present, in a case where there are no reproduction objects in the directory, the system controller 50 sets the total number of images at "0" and sets the total file number determination flat at "ON". Then, the system controller 50 exits the process.

Figure 41:
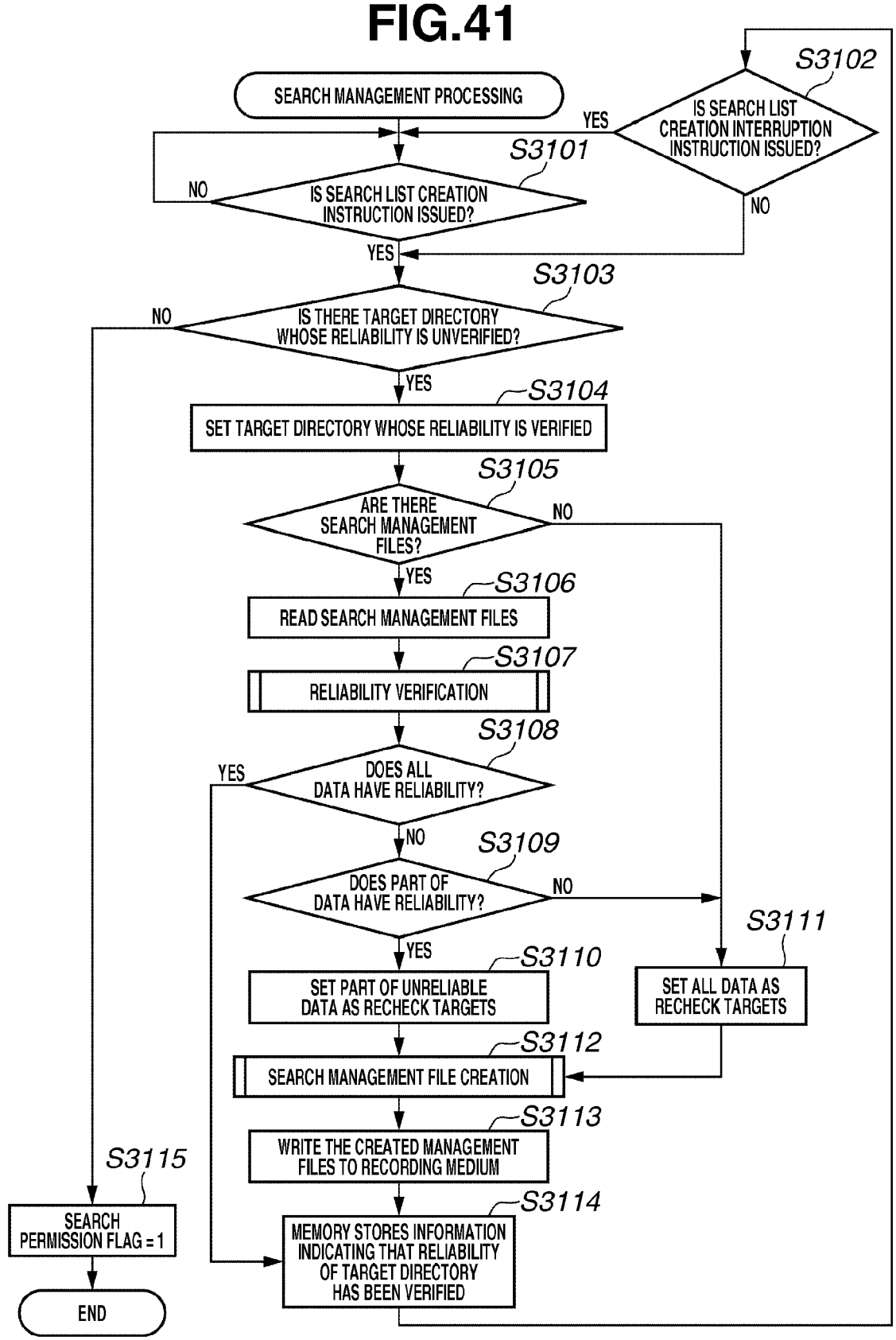
FIG. 41 is a flowchart illustrating search management processing by the digital camera.

FIG. 41 is a flowchart illustrating a flow of a search management process performed in step S1507 illustrated in FIG. 15. If an instruction to create a search list is issued in step S1507, the process proceeds from step S3101 to step S3103, in which the system controller 50 checks whether the reliability unverified directory is present. If the reliability has been verified on all of reproduction object directories, the process proceeds from step S3103 to step S3115, in which the system controller 50 sets the search permission flat at "1" in the system memory 52. Then, the process ends.

Conversely, it is determined in step S3103 that there is a reliability unverified directory, the system controller 50 sets this directory as reliability unverified directory in step S3104. Then, the system controller 50 determines in step S3105 whether a search management file corresponding to a target directory is present in the recording medium 200. If it is determined there is such a search management file, the system controller 50 loads the search management system into the system memory 52 in step S3106. Then, in step S3107, the system controller 50 performs verification of the reliability, which will be described below, on the search management file read in step S3106. If it is determined as a result of the verification that all of data has reliability, the process proceeds from step S3108 to step S3114, in which the system controller 50 performs the target directory reliability verifying information storing processing. Then, the process advances to step S3102, in which the system controller 50 determines whether an instruction to interrupt search list creation is issued.

Conversely, in a case where it is determined as a result of the reliability verification processing in step S3107 that even a part of the data has reliability, or it is determined in step S3105 that the search management file is not present, the process advances to step S3111, in which the system controller 50 creates a search management file by setting all of data included in the directory as a recheck object.

Also, it is determined as a result of the reliability verification processing in step S3107 that only a part of data has reliability, the process proceeds from step S3109 to step S3110, in which the system controller 50 sets a part of data, whose reliability is not verified, as a recheck object. Then, in step S3112, the search management file creation is performed corresponding to the file set as the recheck object.

Upon completion of the search management file creation in step S3112, the system controller 50 writes the created search management fie to the recording medium 200 in step S3113. For example, as illustrated in FIG. 9, a directory (XXXMSC) 521, in which the search management file is stored, is generated. Then, the created search management files (M100.CTG, M101.CTG) 522 and 523 are stored in this directory. According to the present exemplary embodiment, as illustrated in FIG. 9, a search management file corresponding to each directory is generated and stored. For example, the file "M100.CTG" is a search management file corresponding to the directory "100XXX". Also, the file "M101.CTG" is a search management file corresponding to the directory "101XXX". Then, in step S3114, the system memory 52 stores information indicating that the reliability of the directory has been verified. Subsequently, the process proceeds to step S3102.

If it is determined in step S3102 that an instruction to interrupt a search list creation is input, the process returns to step S3101, in which the system controller 50 waits for an instruction to create a search list. Conversely, if it is determined in step S3102 that no instruction to interrupt a search list creation is input, the process proceeds to step S3103, in which the sequence of processing is performed until it is detected that there are no directories whose reliability has not been verified. Then, if the sequence of the processing has been performed on all of the reproduction object directories, the process proceeds from step S3103 to S3115, in which the system controller 50 sets a search permission flag. Then, the process ends.

Figure 42:
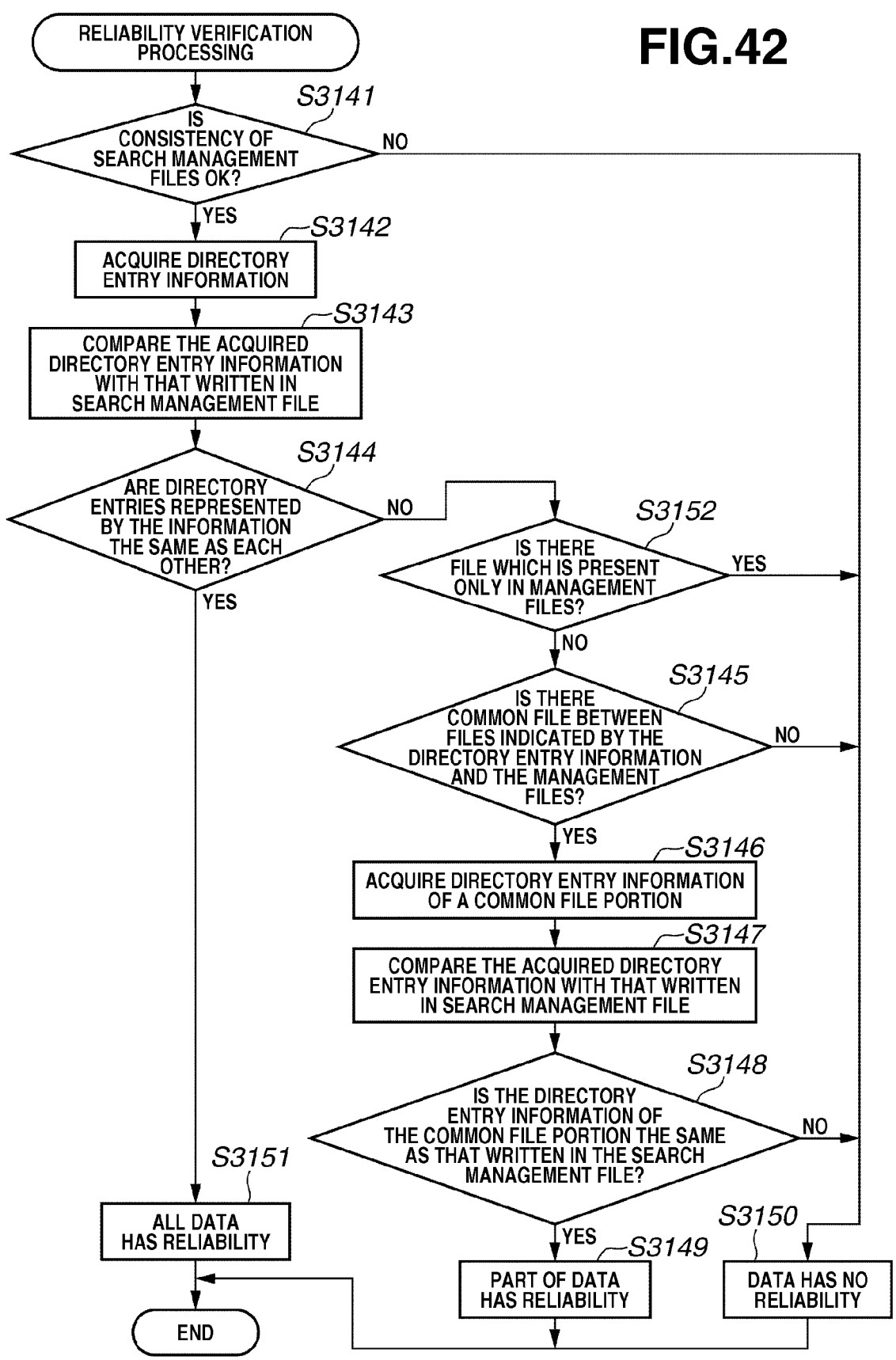
FIG. 42 is a flowchart illustrating reliability verification processing by the digital camera.

FIG. 42 is a flowchart illustrating a reliability verification process performed in step S3107 illustrated in FIG. 41.

First, in step S3141, the system controller 50 checks consistency of the search management files which are loaded into the system memory 52 from the recording medium 200 in step S3106. This is performed according to the management file reliability information 3202, which is consistency information on the search management files themselves, such as management file version information, management file size information, and management file checksum information, which is different from search information in the search management file. This also checks whether the search management file itself is falsified. The management file reliability information 3202 can utilize a timestamp and a hash value. If the consistency cannot be verified, the system controller 50 determines in step S3150 that the search management files have no data reliability. Then, the system controller 50 exits this process. Thus, a situation in which normal search cannot be performed can be prevented from occurring due to falsification of the search management file.

If the consistency of the search management files is verified in step S3141, the process advances to step S3142, in which the system controller 50 acquires the directory entry information stored in the system memory 52 in step S3016 of the above-described image search process illustrated in FIG. 40B. Then, in step S3143, the system controller 50 compares the directory entry information stored in the search management file in step S3106 with the reliability verification information 3201 acquired in step S3016. In this stage, the comparison is made using information representing the configuration of a target directory, for example, information representing the minimum file number, the maximum file number, a total sum of file numbers, a total sum of timestamps, a total sum of file sizes, and a total number of files. The reproducing apparatus according to the present exemplary embodiment is assumed to conform to the DCF standards. Thus, the file numbers can be used as the entry information.

Apparently, a file name, a total sum of character codes representing the file name, or a hash value of the directory entry on a recording medium can be used as the directory entry information.

In a case where the directory entry information read from the recording medium 200 is the same as that acquired in step S3016, the process proceeds from step S3144 to step S3151, in which the system controller 50 determines that all of the data has reliability. Then, the system controller 50 exits the process. That is, occurrence of a situation in which a normal search cannot be achieved due to a change in the file itself stored in the target directory or to a change in a file organization can be prevented.

Conversely, in a case where the directory entry information read from the recording medium 200 is not the same as that acquired in step S3143, the process proceeds to step S3152, in which the system controller 50 determines whether there is a file which is present only in management files. If it is determined in step S3152 that there is no file which is present only in management files, the process proceeds to step S3145, in which the system controller 50 determines whether there is a common file which is present in both of a management file and in directory entry information. If it is determined that such a common file is present, the system controller 50 acquires directory entry information of a common file portion from the recording medium 200 in step S3146. Then, in step S3147, this directory entry information is compared with directory information stored in the search management file. This comparison between the directory entry information of the common file portion and that stored in the search management file in the common file portion can use timestamps, file sizes, file names, protection attributes, hidden attributes, and archive attributes. If it is determined that the directory entry information of the common file portion and that stored in the search management file in the common file portion are the same as each other, the process proceeds from step S3148 to step S3149, in which the system controller 50 determines that a part of data has reliability. Then, the system controller 50 exits the process. For example, in a case where an image is added to the recording medium 200 by a personal computer and a power supply is shut down before a photographed image information search management file reflects the addition of the image in the digital camera 100, a state in which only information of a part of a file is not stored in the management file is caused. Even in such a state, according to the present exemplary embodiment, data whose reliability has been verified can effectively be used.

In a case where it is determined in step S3145 that there is no common file, and in a case where the directory entry information on the common file portion is not the same as the directory information written in the search management file in step S3148, it is determined in steps S3150 that data has no reliability. Then, the system controller 50 exits the process.

According to the above-described search management process, the management file can automatically been reconstructed by detecting a change in the configuration of files to be managed in the recording medium 200 and a change of the files themselves to be managed. Additionally, a change in the configuration of files to be managed in the recording medium 200 and a change of the files themselves to be managed are detected using data stored in the directory entry in steps S3142 and S3143, without referring to data stored in the file. Thus, the detection of such changes can be achieved at high speed. The reconstruction of the management file is performed corresponding to the directory in which a change in the configuration of files to be managed in the recording medium 200 and a change of the files themselves to be managed are detected. Therefore, it is unnecessary to reconstruct the management file corresponding to the directory in which no changes occur (in steps S3104 through S3114).

If no change occurs in the common file, information on the management file of the common file is utilized without a change in steps S3145 through S3149, S3110, and S3112. Thus, even in a case where a file is added to the directory of an apparatus other than the reproducing apparatus according to the present exemplary embodiment, where a file is added to the directory in the reproducing apparatus according to the present exemplary embodiment whose power supply is turned off before the management file is updated, the constructed management file can be effectively used. In a case where no change occurs in the common file, the reconstruction of the management is performed only on files to be managed without being overlapped among files in the directories in which a change in the configuration of files to be managed in the recording medium 200 is detected or in which a change in the files to be managed is detected. Therefore, it is unnecessary to reconstruct file information having already been constructed. Only directories in which addition of files thereto is detected can be rechecked.

The verification of reliability is performed by writing the file attribute 3202 (FIG. 44) of the management file to the management file itself and by collating the written file attribute of the management file in step S3141. Thus, the falsification of the management itself can be detected. Consequently, the management can be prevented from being erroneously performed. The falsification of the management file can be verified on the information of the management file itself and that of the directory entry thereof at high speed in units of management files (steps S3143 through S3148 and information 3201, 3203 through 3206 illustrated in FIG. 44).

Figure 43:
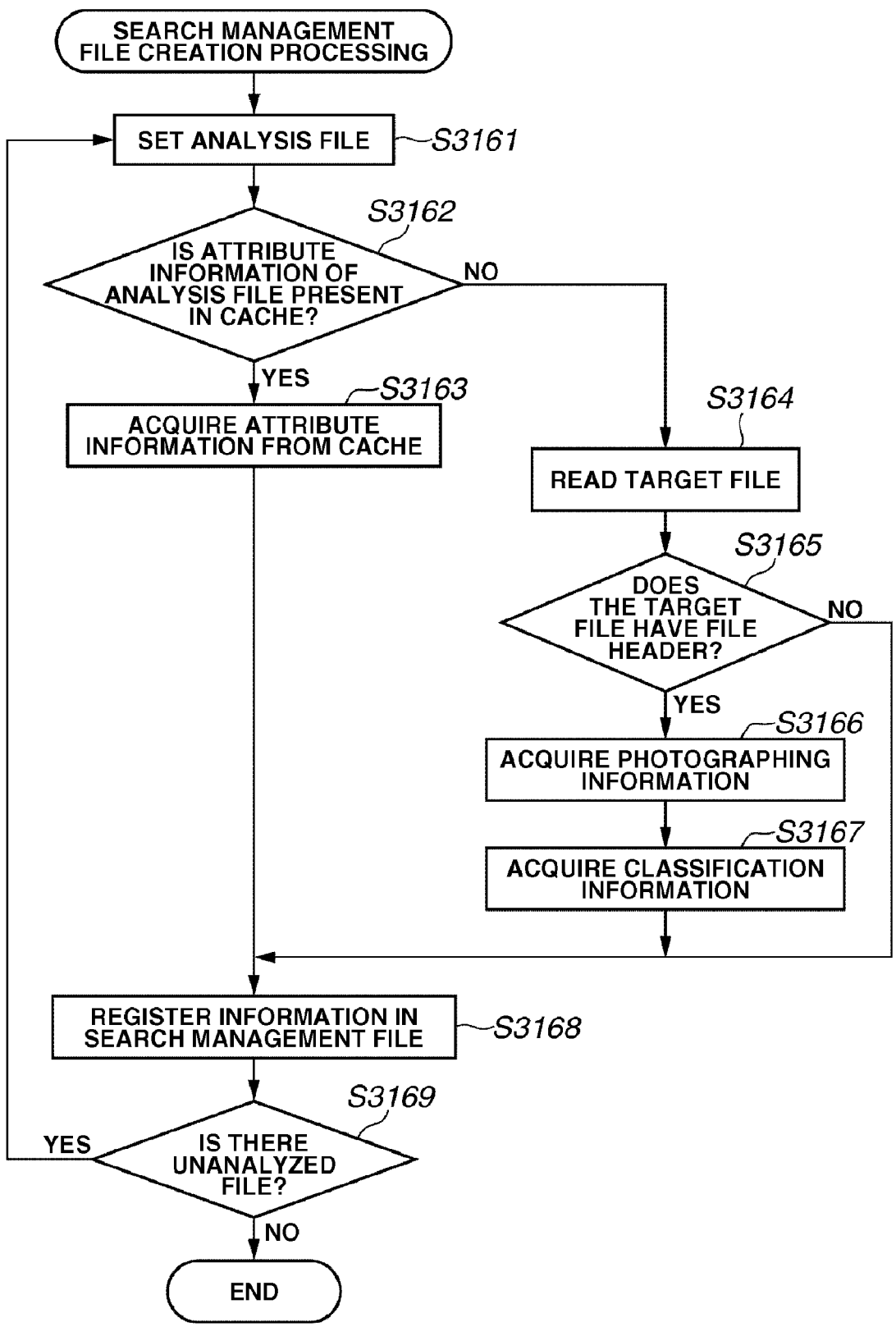
FIG. 43 is a flowchart illustrating search management file creation processing by the digital camera.

FIG. 43 is a flowchart illustrating a search management file creation process performed in step S3112 illustrated in FIG. 41. The search management file creation process is described below with reference to a flowchart illustrated in FIG. 43 and a search management file illustrated in FIG. 44.

When the search management file creation process is started, in step S3161, the system controller 50 performs setting of an analysis file. The analysis file includes all of files in the directories set by the search management processing illustrated in FIG. 41 and unanalyzed files in this process among a part of files, the reliability of which is not verified.

Next, in step S3162, the system controller 50 determines whether the attribute information of files to be analyzed is present in a cache area of the memory 52. Cache information is stored in a cache area of the memory 52, for example, when an image is captured. In a case where it is determined that cache information is present therein, the system controller 50 acquires information written to a search management file from the cache information in step S3163, and generates information to be written to the search management file in step S3168. Then, the system controller 50 writes the generated information to the search management file. This information is file information, such as that 3203 illustrated in FIG. 44, which includes classification information, photographing information, and object information and is stored in association with information identifying a file. Incidentally, a file name and a file number can be written in the list as information identifying a file. Also, the file information can be associated with a file according to an order of files in the file.

Conversely, if it is determined in step S3162 that no attribute information is not present in the cache, the process proceeds to step S3164, in which the system controller 50 reads a target file from the recording medium 200. Then, in step S3165, the system controller 50 determines whether the target file has a file header to which attribute information is written. If it is determined that the target file has a file header, the system controller 50 acquires photographing information in step S3166, and further acquires classification information in step S3167. In step S3168, the system controller 50 generates information which is to be written to the search management file and writes the generated information to the search management file.

Conversely, if it is determined in step S3165 that the target file has no file header, the system controller 50 writes information which indicates that the target file has no file header to the management file in step S3168.

Thus, in step S3168, the attribute information of the analysis file is registered in the management file. Then, in step S3169, the system controller 50 determines whether an unanalyzed file is present. If there is an unanalyzed file, the process returns to step S3161, in which the unanalyzed file is set as an analysis file to be analyzed. Then, the above-described process is iteratively performed. Upon completion of analysis of all requested files, the system controller 50 finishes the process.

When an image is captured, the attribute information is present in the cache, so that an associated file stored in the recording medium 200 is not read again to analyze the read file. Consequently, a search management file can be constructed at high speed.

According to the above-described reliability verification processing, in a case where the classification information setting processing in step S1711 and the image erasing processing in S1713 are performed before the reliability is verified, a target image file can be eliminated from objects to be managed. That is, in the file management processing starting with step S302, the target image file is eliminated from the image files to be managed.

When image files recorded on the recording medium 200 are searched, so that a total number of image files is determined, classification information setting can be performed in steps S1710 and S1711. Also, image erasing can be performed in steps S1712 and S1713. During that processing, the reliability verification processing on the search management file in the recording medium 200 in step S3107 is performed in parallel to the classification information setting and the image erasing.

First, processing in a case in which an image file is erased before the reliability verification is performed is described below. In this case, with erasing the image file, the directory entry of the directory to which this image file belongs is updated. Thus, inconsistency occurs between the reliability verification information 3201, which is written to the search management file, and the directory entry. In the reliability verification processing illustrated in FIG. 31B, the process proceeds from step S3144 to step S3152. The erased image file is not present in the directory entry. Thus, this image file is present only in the search management file. Accordingly, it is determined in step S3150 that the data included in the search management data has no reliability. Then, all of such data is set as objects to be rechecked. Thus, the search management file is generated in steps S3111 and S3112.

Next, processing performed in a case in which classification information added to an image file, whose reliability is not verified yet, is changed is described below. Similarly, in this case, the directory entry, such as a timestamp, of the directory, to which this image file belong, is updated with a change of the classification information added to the image file. Thus, inconsistency is caused between the reliability verification information 3201, which is written to the search management file, and the directory entry. In the reliability verification processing illustrated in FIG. 31B, the process proceeds from step S3144 to step S3152. In the case of a change in the classification information, the image file is not erased. Thus, an image which is present only in the search management file is not generated. However, the classification information is changed. Thus, inconsistency is caused between this image file and another image file which is present in common to the directory entry and the search management file. Thus, the process proceeds to from step S3148 to step S3150, in which the system controller 50 determines that the data included in the search management file has no reliability. Consequently, all data is set as objects to be rechecked. Then, the search management file is generated in steps S3111 and S3112.

Thus, an image file which is erased or is changed in the classification information added thereto before the reliability verification is eliminated from objects to be managed according to the present exemplary embodiment.

Figure 45:
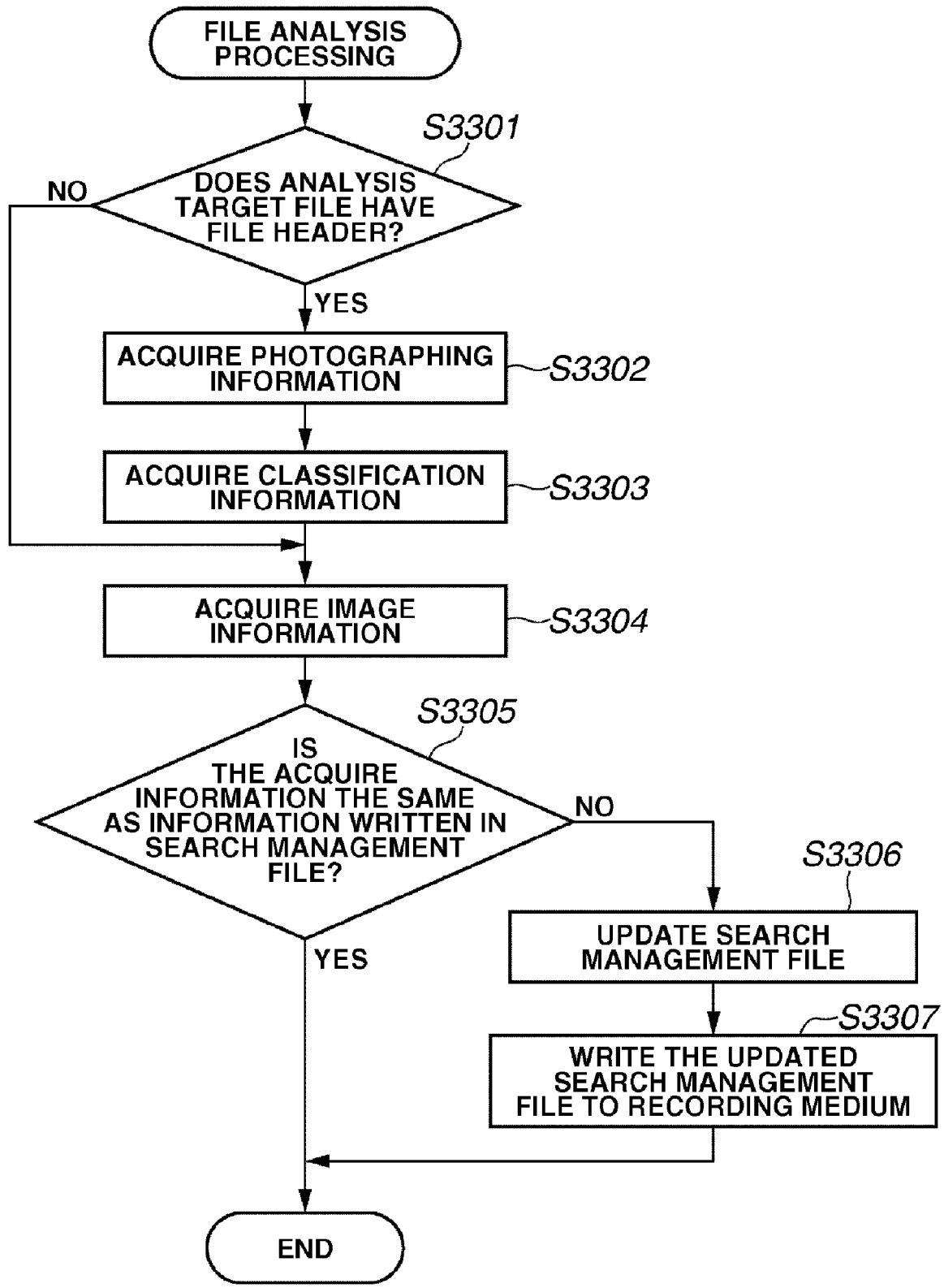
FIG. 45 is a flowchart illustrating file analysis processing by the digital camera.

Next, the file analysis processing performed in step S1504 illustrated in FIG. 15, steps S1704 and S1717 illustrated in FIG. 17, and step S2508 illustrated in FIG. 34A is described below. FIG. 45 is a flowchart illustrating a file analysis process.

In step S3301, the system controller 50 determines whether a file to be analyzed has a file header including photographing information and classification information. If it is determined that the file to be analyzed has such a file header, the system controller 50 acquires photographing information from the file header in step S3302 and acquires classification information from the file header in step S3303. Then, in step S3304, the system controller 50 acquires image information, such as an image body start position and an image compression method.

Next, in step S3305, the system controller 50 determines whether the photographing information, the classification information, and the image information are the same as those stored in the search management file. If so, the system controller 50 exits the process without performing anything. Conversely, if it is determined in step S3305 that the photographing information, the classification information, and the image information differ from those stored in the search management file, the system controller 50 updates the corresponding file information in the search management file in step S3306. Then, the system controller 50 writes the updated search management file to the recording medium 200 in step S3307. Then, the system controller 50 finishes the process.

As described above, in a case where a file is read and a header is analyzed to reproduce an image, collation is simultaneously performed on the search management file in units of files. Thus, the detailed collation and correction can be performed on the search management file without extra processing time. Even when the falsification of the management file itself and a change of files to be managed cannot be detected, the management file can be reconstructed to correct values.

In the foregoing description, a case in which the present invention is applied to a digital camera has been described. The application of the present invention is not limited thereto. The present invention can be applied to an apparatus capable of reproducing an image, such as a mobile phone and a mobile terminal.

The present invention includes a case where the equivalent functions are achieved by supplying a software program that implements the functions of the above-described exemplary embodiment directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In such a case, the form of program is not particularly limited, and object code, a program to be executed by an interpreter, script data to be supplied to an operating system (OS), and the like may be used as along as they have the program function.

As the recording medium for supplying the program, for example, magnetic recording media, such as a floppy disk, hard disk, magnetic tape, and the like, optical/magneto-optical storage medium such as an MO (Magneto-Optic disk), CD-ROM (Compact Disk-Read-Only Memory), CD-R (Compact Disk-Recordable), CD-RW (Compact-Disk-Re-Writable), DVD-ROM (Digital Versatile Disk—Read Only Memory), DVD-R (Digital Versatile Disk-Recordable), DVD-RW (Digital Versatile Disc-Re-Writable), and the like, a nonvolatile semiconductor memory, and so on may be used.

As a program supply method using the wired/wireless communications, a server on a computer network can store a program data file that can be a computer program on a client computer, such as the computer program itself, a compressed file including an automatic installation function, or the like, and the program data file can be downloaded to the client computer which establishes connection to the server.

The program data file can include a file including a compressed computer program and having an automatic installation function.

The program data file can be segmented into a plurality of segment files, which can be allocated on different servers.

That is, the present invention includes a server apparatus which allows a plurality of users to download the program data file for implementing the functional process of the present invention on a computer.

Also, a storage medium, which stores the encrypted program of the present invention, can be delivered to a user, a user who has satisfied a predetermined condition can be allowed to download key information that is used to decrypt the program through the network, and the encrypted program can be executed using that key information to be installed on a computer.

The functions of the aforementioned embodiments can be implemented not only by executing the readout program code by the computer but also by some or all of actual processing operations executed by an OS or the like running on the computer according to an instruction of the program.

Additionally, the functions of the aforementioned embodiments can be implemented by some or all of actual processes executed by a central processing unit (CPU) or the like arranged in a function extension board or a function extension unit, which is inserted in or connected to the computer, after the supplied program code is written in a memory of the function extension board or unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-249756 filed Sep. 14, 2006, which is hereby incorporated by reference herein in its entirety.

What is claimed is:

1. An apparatus comprising:
    a key display unit configured to display a list of keys for searching for an image;
    a key designating unit configured to designate the key among the list of keys;
    an acquiring unit configured to acquire attribute information based on the designated key and image information on an image having the attribute information; and
    a group information display unit configured to display information of images classified into a group corresponding to the attribute information based on the acquired attribute information and the acquired image information as a group information;
    a group designating unit configured to designate at least one of a plurality groups into which images are classified; and
    an image display unit configured to, when a group is designated by the group designating unit, automatically display at least one of a plurality of images belonging to the designated group,
    an image switching unit configured to switch an image to be displayed by the image display unit, wherein, when the image switching unit switches the image to be displayed, the image display unit displays another image belonging to the group designated by the group designating unit,
    wherein the key list displayed by the key display unit, the group information displayed by the group information display unit and the image displayed by the image display unit are displayed within one display screen together,
    wherein the key designating unit, the group designating unit and the switching unit are different operating members.

2. The apparatus of claim 1, wherein the apparatus is an image reproducing portion of a digital camera.

3. The apparatus according to claim 1, wherein the group information display unit displays the number of images belonging to each of a plurality of groups by a graph as the group information.

4. The apparatus according to claim 1, wherein the group information display unit displays a total file size of images belonging to each of a plurality of groups by a graph as the group information.

5. The apparatus according to claim 1, wherein the group information display unit displays the group designated by the group designating unit in a manner discriminatable from another group.

6. The apparatus according to claim 1, wherein the image display unit displays an image resized such that the image does not overlap a display provided by the key display unit.

7. The apparatus according to claim 1, wherein the operating members include direction buttons,
    wherein the key designating unit is assigned to up and down buttons, and
    wherein the group designating unit is assigned to left and right buttons.

8. The apparatus according to claim 1, wherein the image switching unit is assigned to a wheel member.

9. The apparatus according to claim 1, wherein a function, which is performed when an operation is performed by the image switching unit, is changed according to the key designated by the key designating unit.

10. The apparatus according to claim 9, wherein the key designating unit is configured to designate a moving image file as a key, and wherein, when a moving image file is designated as the key, the image switching unit causes the image display unit to sequentially display frames of a moving image.

11. The apparatus according to claim 1, further comprising a key storing unit configured to store the key designated by the key designating unit when a mode for searching for an image is terminated.

12. The apparatus according to claim 1, wherein the operating members include direction buttons and a wheel member, wherein the key designating unit is assigned to up and down buttons, wherein the group designating unit is assigned to left and right buttons, and wherein the image switching unit is assigned to the wheel member.

13. A method using a processor or a computer to perform the following:

displaying a list of keys for searching for an image;

designating the key among the list of keys;

acquiring attribute information based on the designated key and information on an image having the attribute information;

displaying, information of images classified into a group corresponding to the attribute information based on the acquired attribute information and the acquired image information as a group information;

designating at least one of a plurality groups into which images are classified; and automatically displaying, when a group is designated, at least one of a plurality of images belonging to the designated group, switching the image to be displayed, wherein, when the image to be displayed is switched, another image belonging to the group designated is displayed, wherein the designating step, switching step and the automatic displaying step are performed by different operating members.

14. A non-transitory computer-readable storage medium storing a computer-executable process, the computer-executable process causing an apparatus to perform the method according to claim 13.

* * * * *